(12) United States Patent
Meyer et al.

(10) Patent No.: US 6,354,542 B1
(45) Date of Patent: Mar. 12, 2002

(54) MODULAR CABLE TRAY ASSEMBLY

(75) Inventors: J. Scott Meyer, Cordova, TN (US); Mohammed Ghaeli, Oakville (CA); Kirk H. Thorne, Germantown, TN (US)

(73) Assignee: Thomas & Betts Corporation, Memphis, TN (US)

( * ) Notice: Subject to any disclaimer, the term of this patent is extended or adjusted under 35 U.S.C. 154(b) by 0 days.

(21) Appl. No.: 09/028,370

(22) Filed: Feb. 24, 1998

Related U.S. Application Data

(60) Provisional application No. 60/038,315, filed on Feb. 25, 1997.

(51) Int. Cl.[7] .................................................. E21F 17/02
(52) U.S. Cl. .................................................. 248/58; 248/68.1
(58) Field of Search ........................... 248/58, 68.1, 49, 248/72

(56) References Cited

U.S. PATENT DOCUMENTS

| | | | |
|---|---|---|---|
| 2,345,650 | 4/1944 | Attwood | 403/21 |
| 2,375,513 | 5/1945 | Bach | 248/59 |
| 2,915,272 | 12/1959 | Sislik | 248/222.12 |
| 3,145,962 | 8/1964 | Kindorf | 248/68.1 |
| 3,226,069 | 12/1965 | Clarke | 248/73 |
| 3,243,754 | 3/1966 | Miller | 439/207 |
| 3,295,805 | 1/1967 | Girard | 248/68.1 |
| 3,363,048 | 1/1968 | Vaughn | 174/72 A |
| 3,486,726 | 12/1969 | Kindorf et al. | 248/72 |
| 3,521,842 | 7/1970 | Opperthauser | 248/74.2 |
| 3,618,882 | 11/1971 | Podedworny | 248/68.1 |
| 3,851,378 | 12/1974 | Dessert | 29/523 |
| 4,119,285 | 10/1978 | Bisping et al. | 248/72 |
| 4,185,802 | 1/1980 | Myles et al. | 248/74.4 |
| 4,410,298 | 10/1983 | Kowalski | 411/112 |
| 4,429,440 | 2/1984 | Laughlin et al. | 24/486 |
| 4,516,296 | 5/1985 | Sherman | 206/233 |
| 4,542,871 | 9/1985 | Fortsch | 248/73 |
| 4,645,393 | 2/1987 | Pletcher | 411/84 |
| 4,662,590 | 5/1987 | Hungerford, Jr. | 248/72 |
| 4,757,965 | 7/1988 | Allen | 248/74.4 |
| 4,770,378 | 9/1988 | Onishi et al. | 248/68.1 |
| 4,784,552 | 11/1988 | Rebentisch | 411/85 |
| 4,790,060 | 12/1988 | Council et al. | 29/525.08 |
| 4,830,531 | 5/1989 | Condit et al. | 403/348 |
| 4,950,099 | 8/1990 | Roellin | 403/348 |
| 4,960,253 | 10/1990 | Perrault et al. | 248/68.1 |
| 5,022,614 | 6/1991 | Rinderer | 248/62 |
| 5,067,863 | 11/1991 | Kowalski | 411/85 |
| 5,100,086 | 3/1992 | Rinderer | 248/49 |
| 5,123,618 | 6/1992 | Guterman et al. | 248/49 |
| 5,141,186 | 8/1992 | Cusic | 248/73 |
| 5,154,385 | 10/1992 | Lindberg et al. | 248/255.11 |
| 5,163,644 | 11/1992 | Kowalski | 248/74.4 |
| 5,165,628 | 11/1992 | Todd et al. | 248/62 |
| 5,209,619 | 5/1993 | Rinderer | 411/85 |
| 5,271,586 | 12/1993 | Schmidt | 248/58 |
| 5,323,988 | 6/1994 | Handler | 248/49 |
| 5,372,341 | 12/1994 | Witherbee et al. | 248/49 |
| 5,375,798 | 12/1994 | Hungerford, Jr. | 248/58 |
| 5,564,658 | 10/1996 | Rinderer | 248/58 |
| 5,704,571 | 1/1998 | Vargo | 248/58 |

FOREIGN PATENT DOCUMENTS

| | | |
|---|---|---|
| A-20263/88 | 3/1989 | (AU) . |
| WO 91/06799 | 5/1991 | (WO) . |
| WO 94/19580 | 9/1994 | (WO) . |

OTHER PUBLICATIONS

Catalogue, Cable Trays, Mono–Systems, Inc., Jericho, NY, undated.

*Primary Examiner*—Anita M. King
(74) *Attorney, Agent, or Firm*—Hoffman & Baron, LLP

(57) ABSTRACT

A cable tray assembly for supporting cables, wires and the like. The assembly includes an elongate rail including an open channel extending along the length thereof. The assembly further includes at least one support member. Finally, the assembly includes a locking connector cooperating with the support member. The connector is sized and configured for insertion into the channel whereby insertion of the connector into the channel simultaneously locates the member at a position along the rail and fixedly secures the arm to the rail in the absence of fastening hardware.

35 Claims, 51 Drawing Sheets

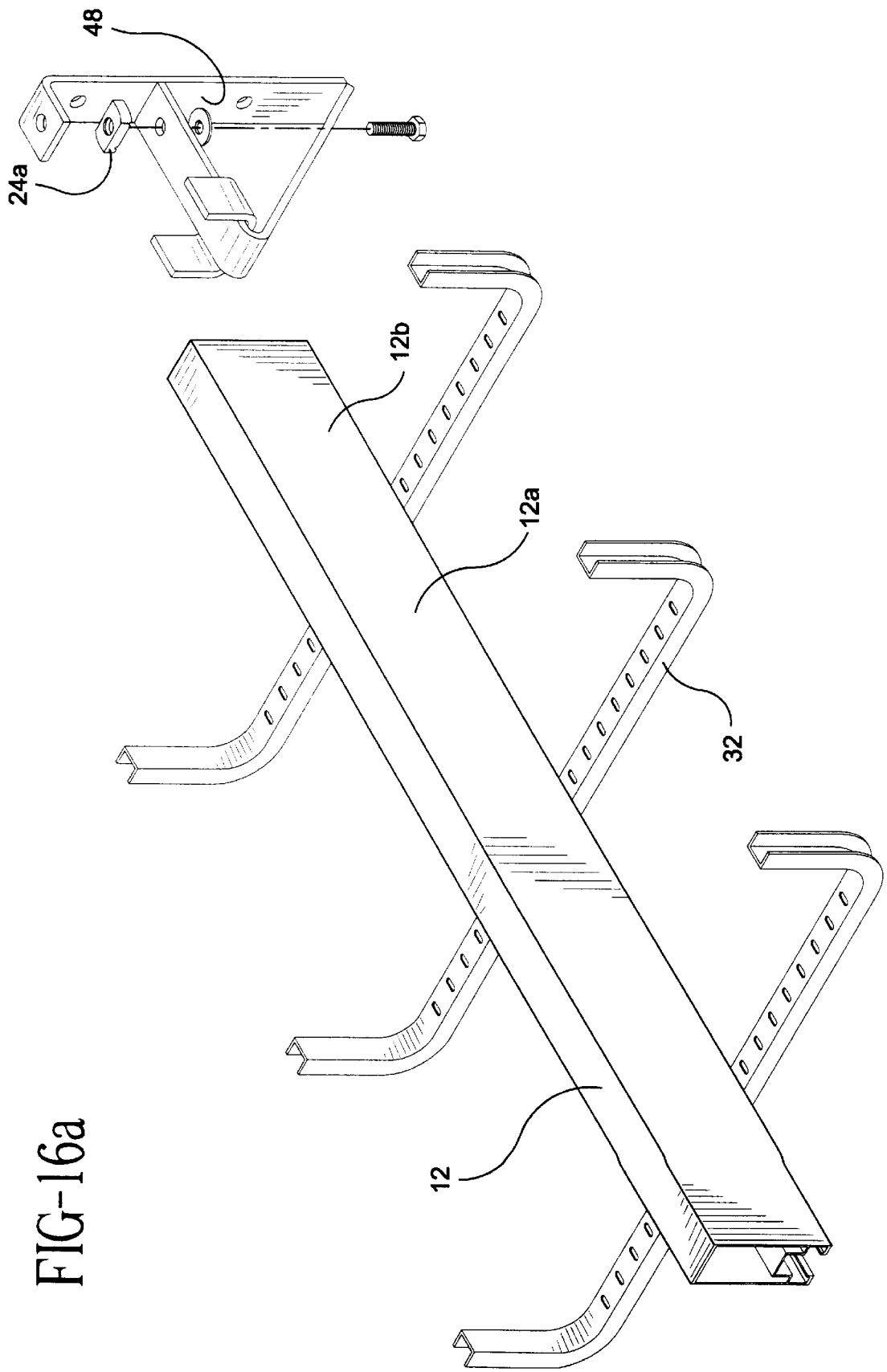

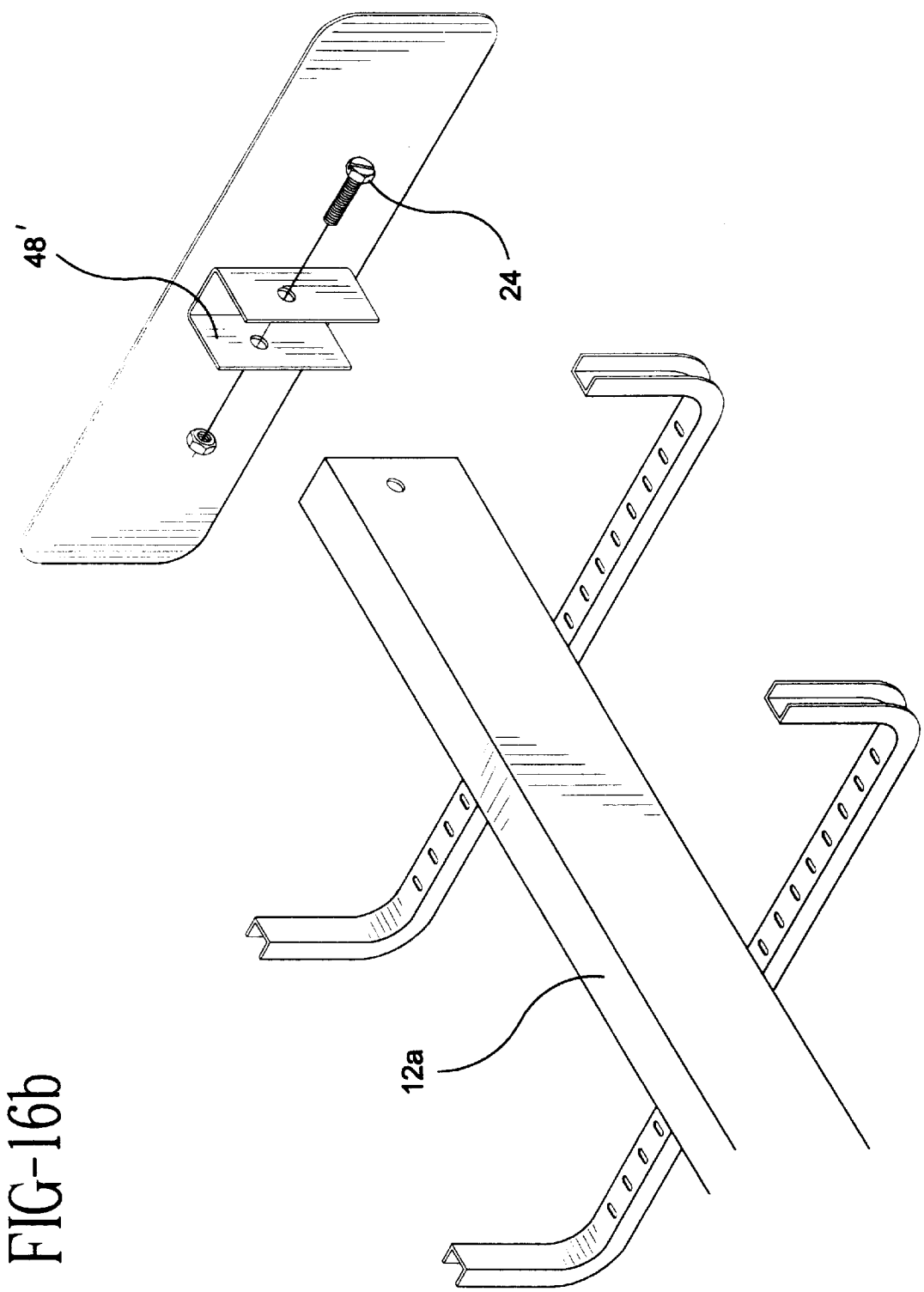

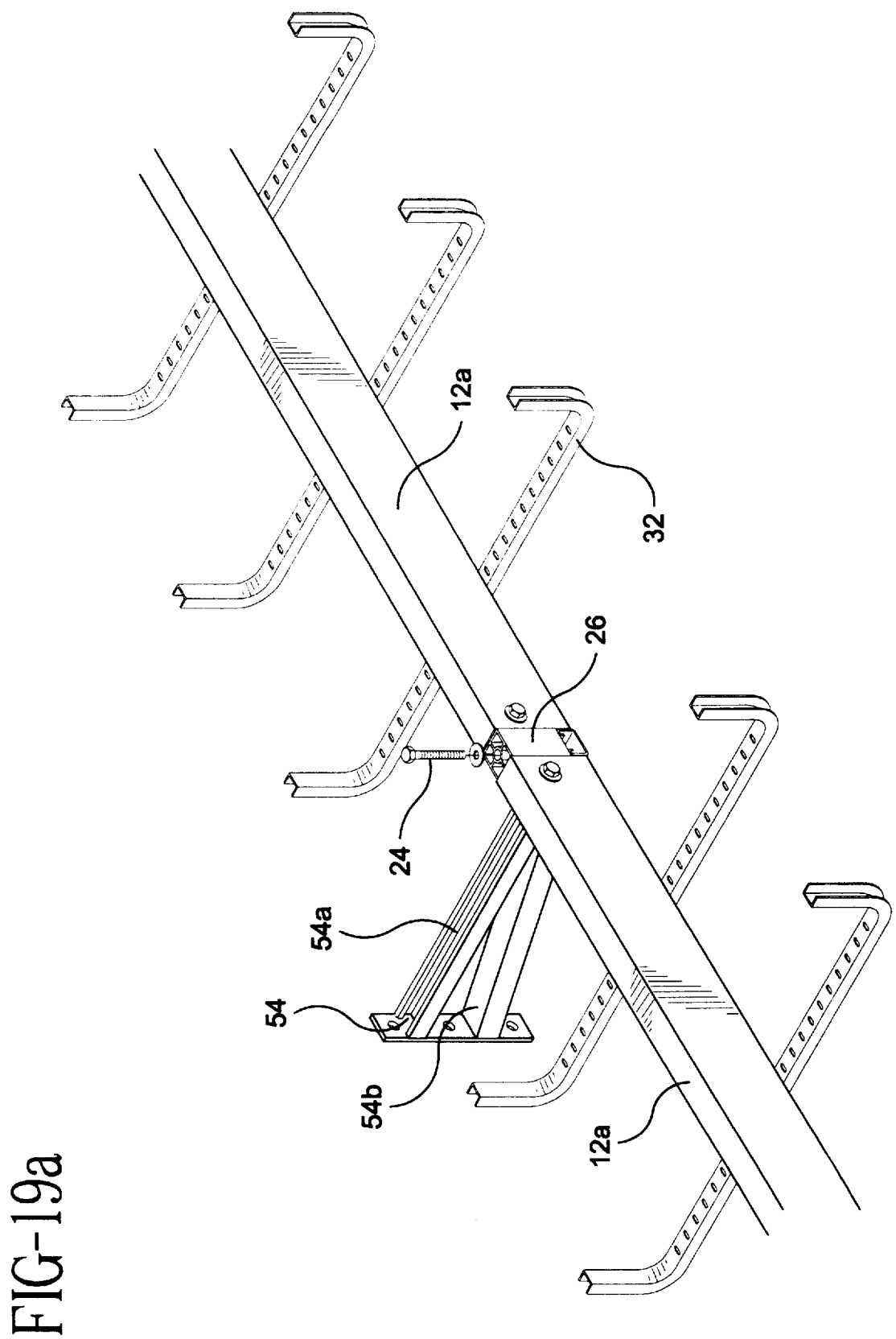

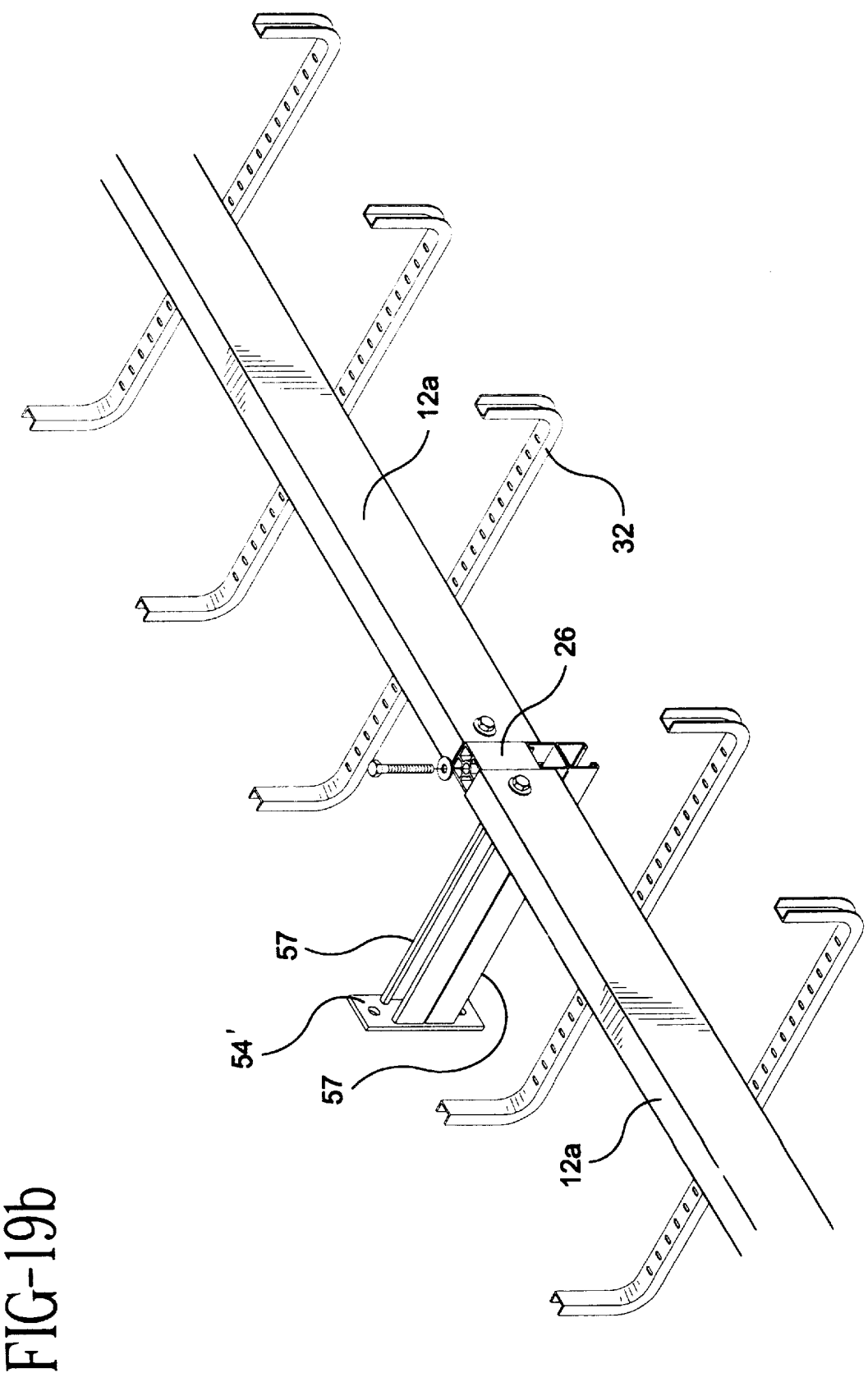

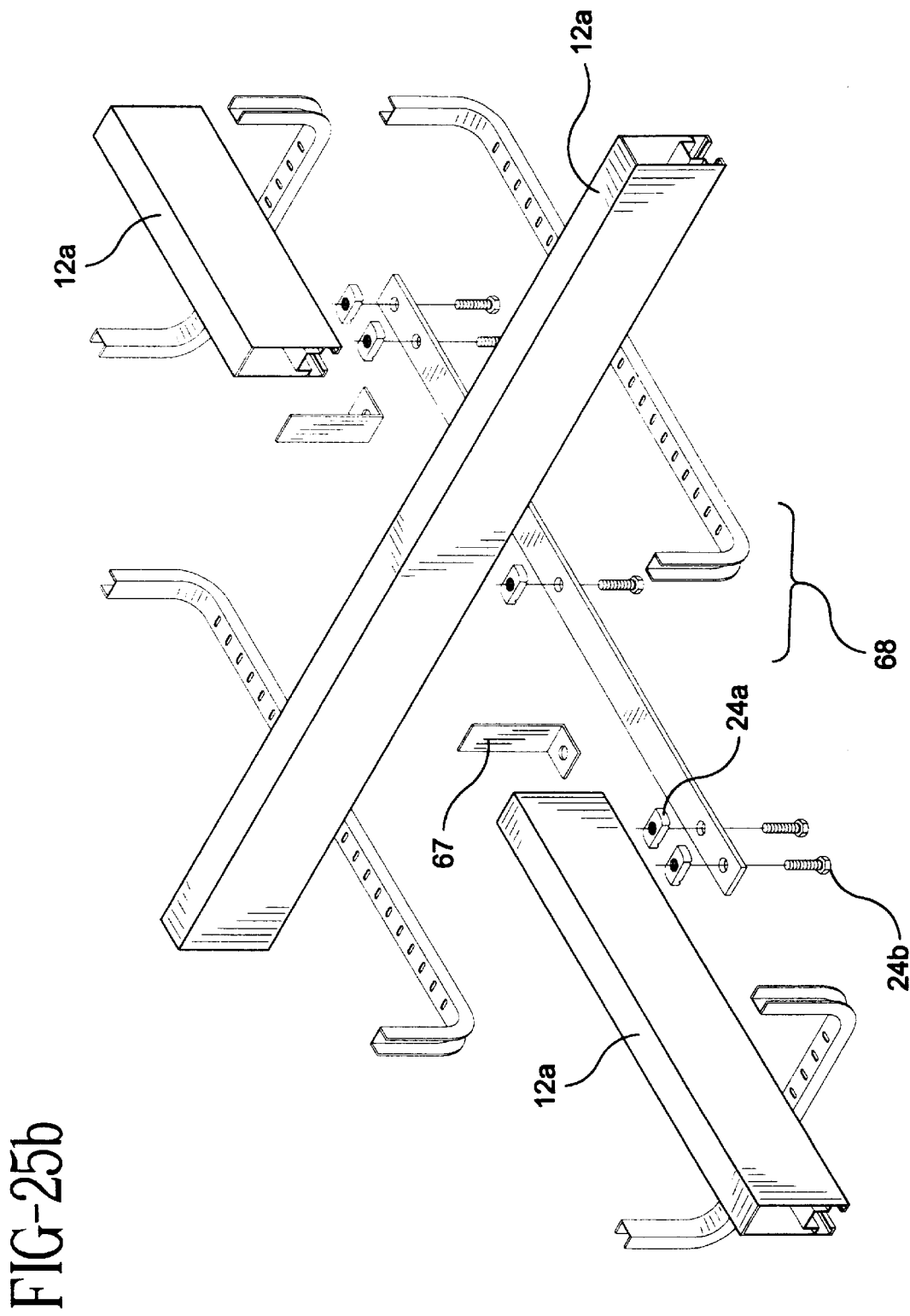

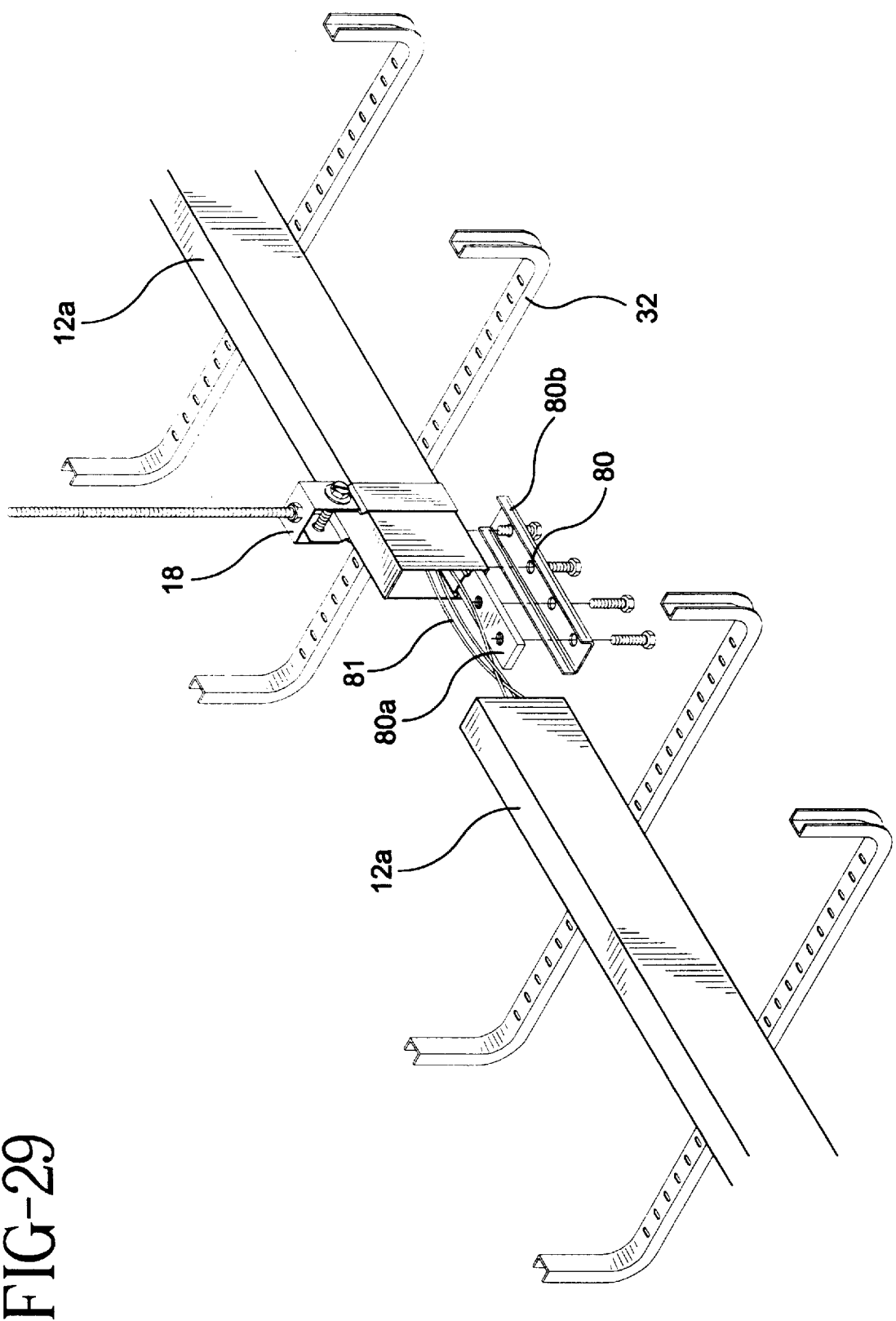

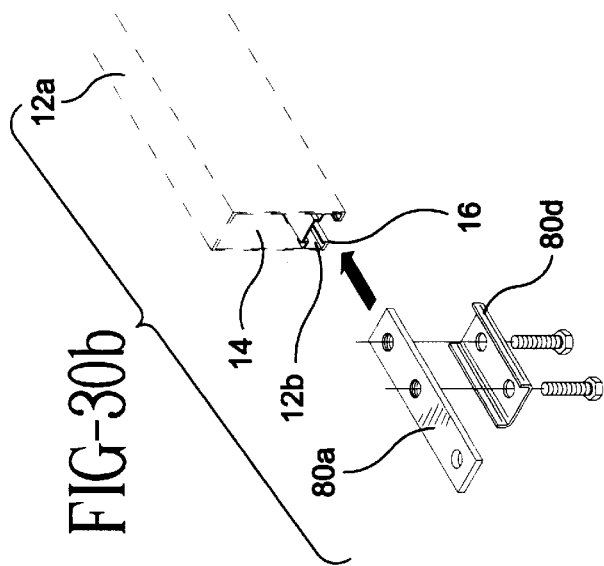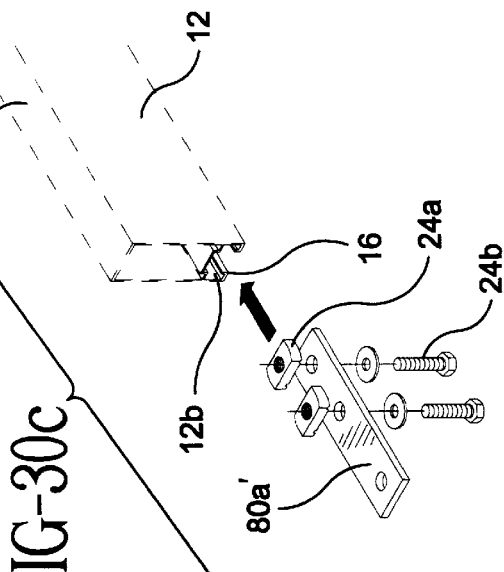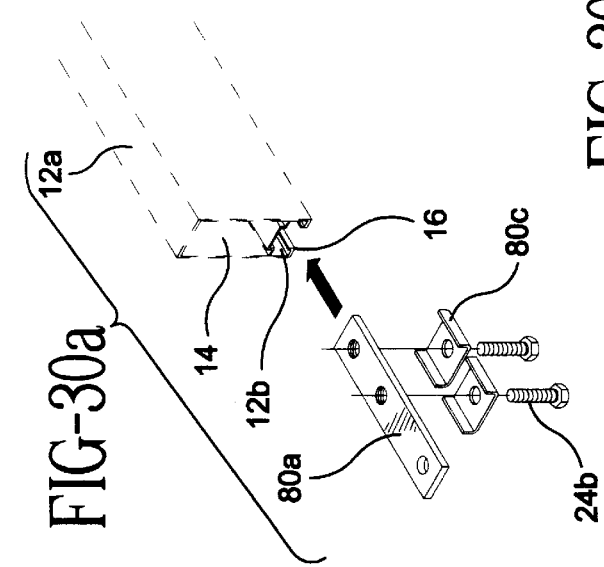

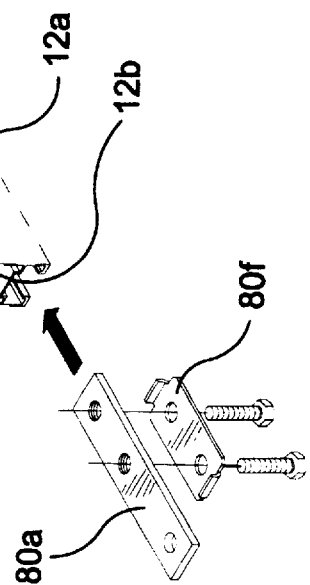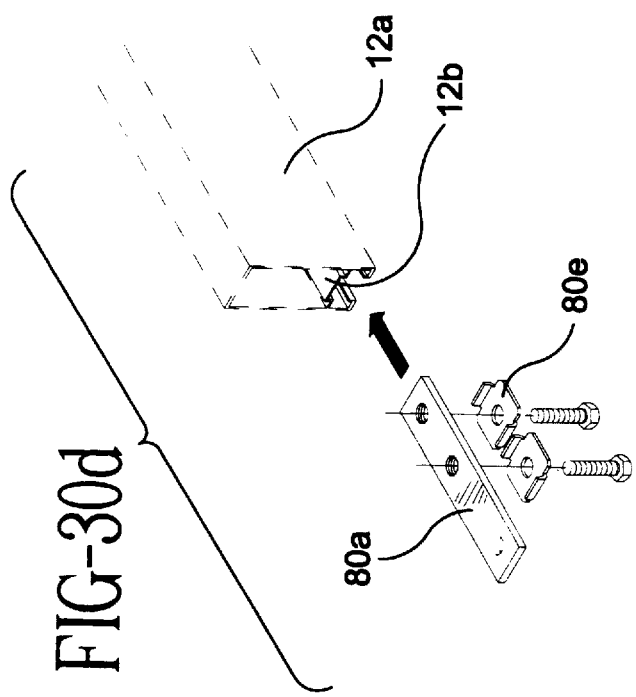

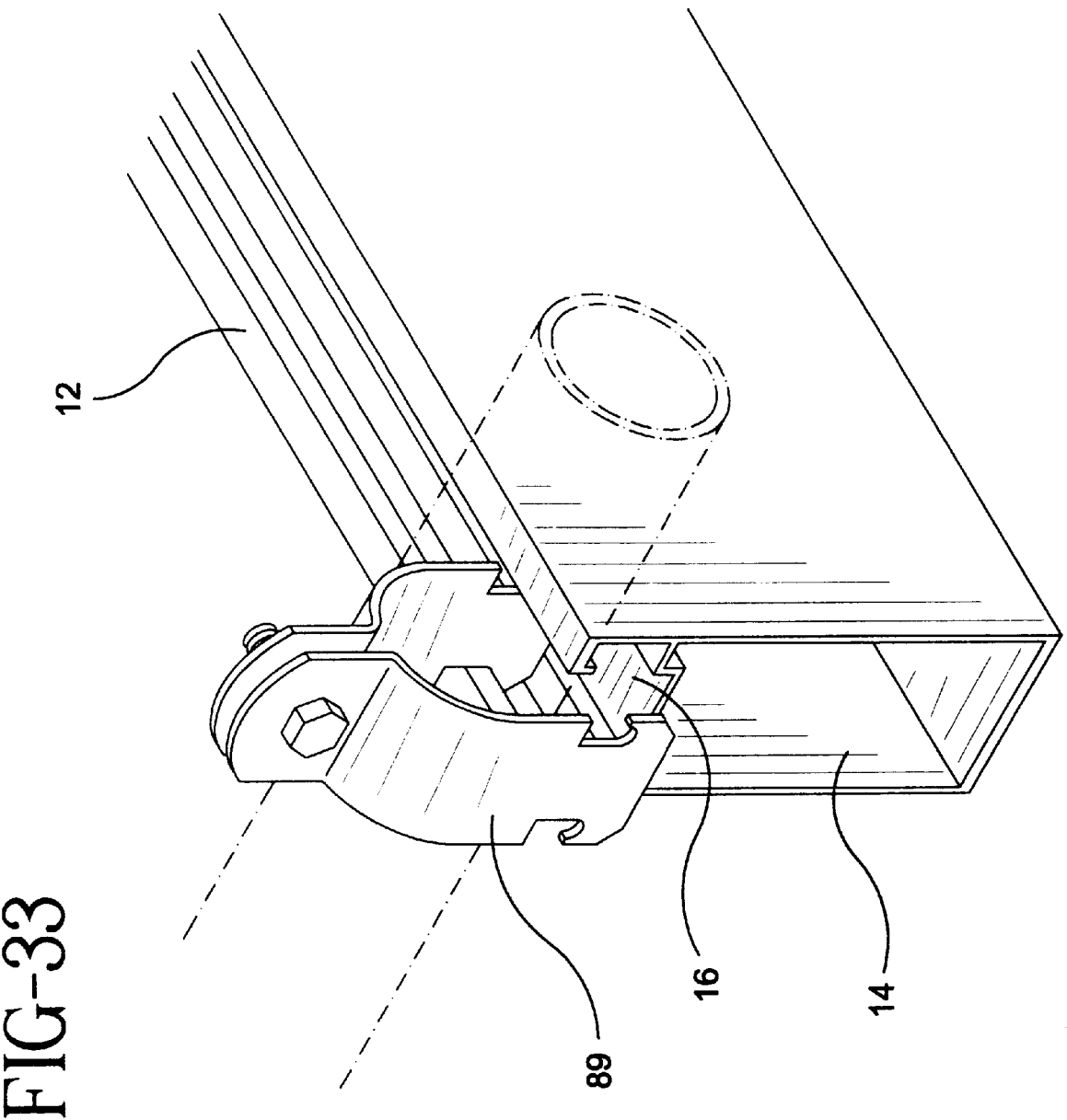

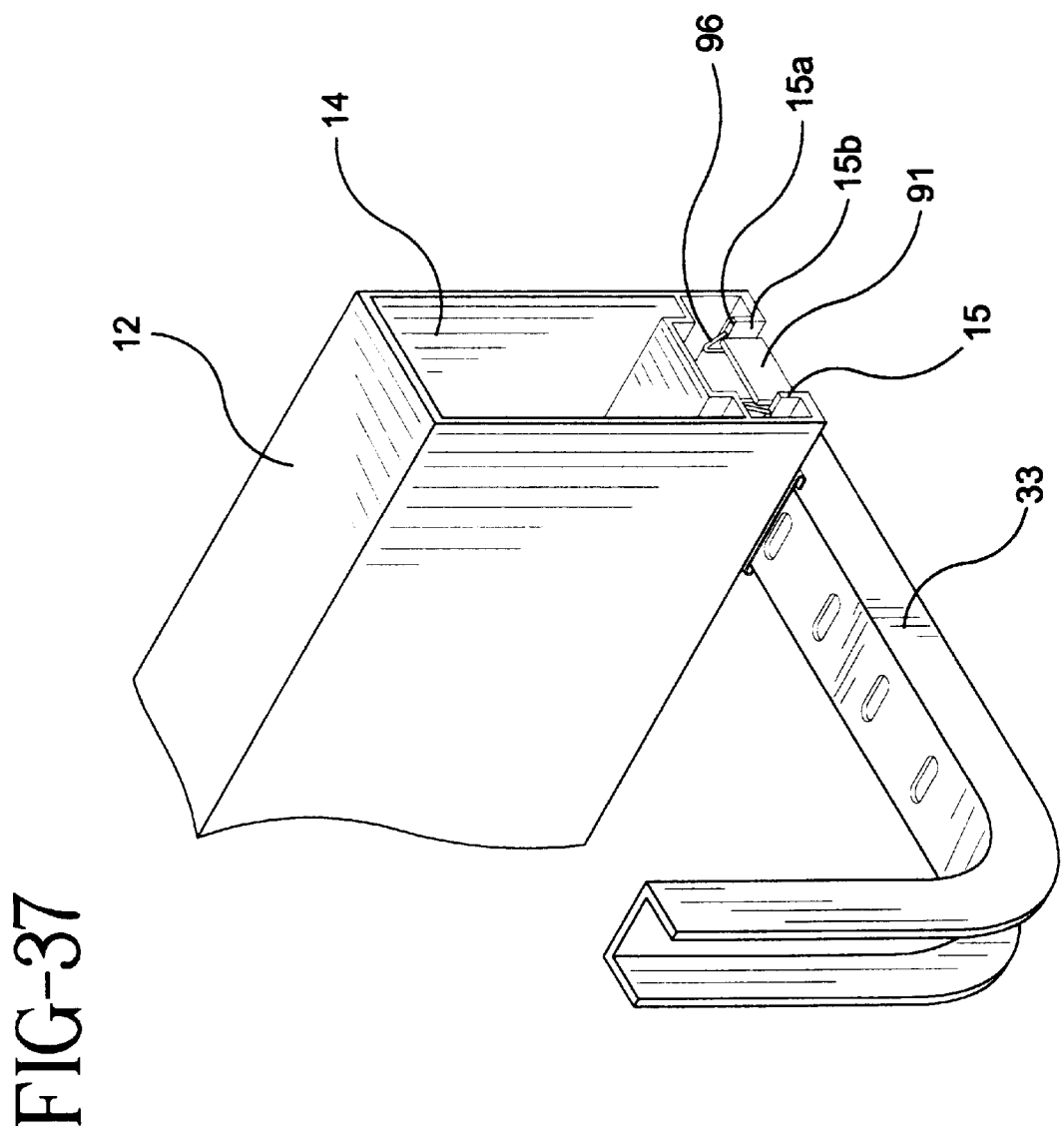

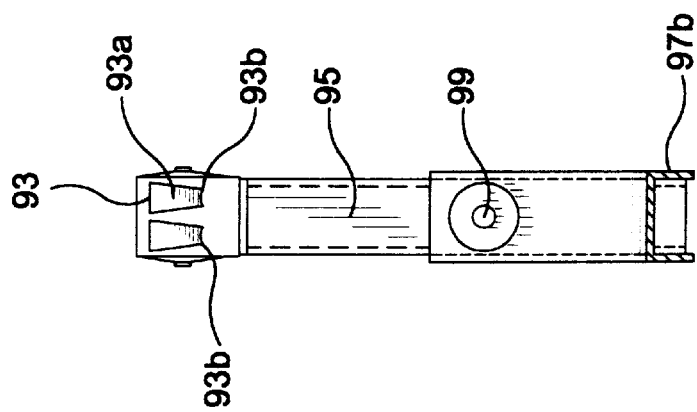
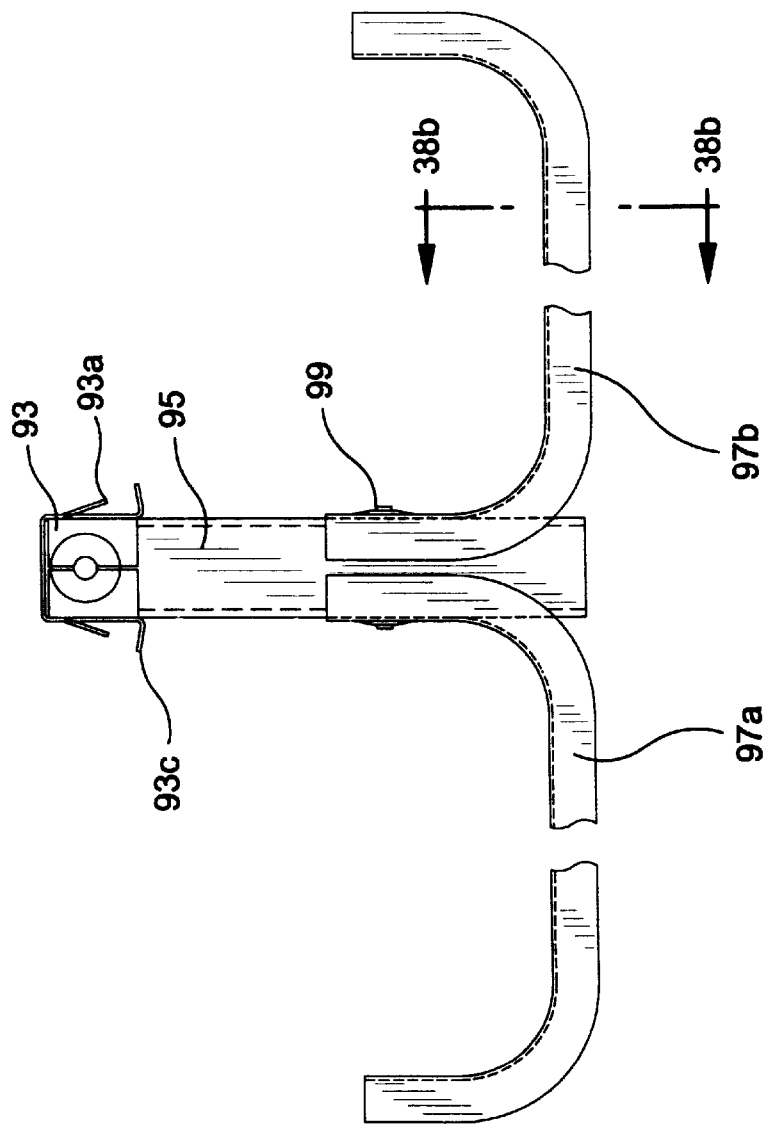
FIG-38b
FIG-38a

MODULAR CABLE TRAY ASSEMBLY

This application claims the benefit of U.S. Provisional Application No. 60/038,315 filed Feb. 25, 1997.

BACKGROUND OF THE INVENTION

The present invention relates to cable tray assemblies for supporting electrical wires, cables and the like, and more particularly, to modular components for forming a cable tray assemblies which are easy to manufacture, ship and assemble.

Cable tray assemblies are well known for use as a support system for carrying electrical cables, wires, tubing, piping or other conduits over various distances in buildings and other commercial structures. The cable tray assembly provides a support for running the wires throughout various locations in the facility. Cable trays are typically suspended from the ceiling or walls in order to provide a non-intrusive path for the cable with full use of the work spaces below. Due to the amount of cable and conduits running through modem facilities, cable trays are also available which support cables at multiple elevations.

Traditional cable trays arc bulky, cumbersome devices which are difficult to manufacture, ship and assemble. Improvements in cable tray construction provide for the manufacture of various modular interfitting components which allow the user flexibility in assembling a cable tray system for a particular design. Such components are also easier to manufacture and ship.

Two examples of such modular cable tray assemblies are shown in U.S. Pat. No. 5,123,618 to Guterman, et al. and U.S. Pat. No. 5,564,658 to Rinderer, the disclosures of which are incorporated by reference herein for all purposes. By way of example, Rinderer discloses a support system having a plurality of supports vertically extending from a rail. Each support has a series of horizontally extending arms which support transmission cables. The supports are inserted into cutouts formed in the rail. There are therefore only a limited (and predefined) number of locations where a support may be placed. This limitation can lead to difficulty in assembling support systems in applications where flexibility in placement is desired.

Other prior art tray assemblies require the use of various mechanical fasteners to attach the support arms to the support rail. These mechanical fasteners generally require the use of installation tools. The need to install a mechanical fastener at the location of each support arm/rail interface is quite labor intensive, resulting in increased installation time and increased costs.

Accordingly, it would be desirable to provide a cable tray system which is easily field assembleable and which provides more assembly options to the user so as to make the cable tray assembly more adaptable to each user's particular cable tray needs.

SUMMARY OF THE INVENTION

The present invention, which addresses the needs of the prior art, relates to a cable tray assembly for supporting cables, wires and the like. The assembly including elongate rail including an open channel extending along the length thereof. The assembly further includes at least one support member. Finally, the assembly includes a locking connector cooperating with the support member. The connector is sized and configured for insertion into the channel whereby insertion of the connector into the channel simultaneously locates the member at a position along the rail and fixedly secures the arm to the rail in the absence of fastening hardware.

In one preferred embodiment of the present invention, the channel includes a pair of opposing side walls, each of the side walls defining a top edge. The connector includes a saddle body and a pair of deflectable spring clips, the saddle body defining a plane. The spring clips extend perpendicularly from the plane whereby insertion of the connector into the channel causes engagement between the clips and the side walls.

In an alternative embodiment of the present invention, the channel includes a pair of opposing side walls, each of the side walls defining a top edge. The assembly further includes a trunk for spacing a support member a distance from the rail. Finally, the connector includes a generally closed body having bottom and side walls thereby defining a trunk-receiving cavity for receipt of the trunk. The connector includes opposing cantilevered spring clips sized to engage the side walls when the connector is inserted into the channel.

As a result, the present invention provides a cable tray system which is easily field assembleable and which provides more assembly options for the user so as to make the cable tray assembly more adaptable to each user's particular cable tray needs. Particularly, the present invention provides a cable tray system wherein the support members are locateable at any position along the length of the rail, and may be attached to the rail in the absence of fastening hardware or use of installation tools. As a result, installation of the present cable tray system requires reduced installation time thereby resulting in decreased costs.

BRIEF DESCRIPTION OF THE DRAWINGS

FIG. 16a is an exploded perspective view of a rail section and end wall bracket;

FIG. 16b is an exploded perspective view of an alternative embodiment of an end wall bracket;

FIG. 19a is a perspective view of a spaced wall support;

FIG. 19b is a perspective view of an alternative embodiment of the spaced wall support;

FIG. 25b is an exploded perspective view of an elongate crossover bracket;

FIG. 29 is an exploded perspective view of rail sections joined by an outboard coupling assembly;

FIGS. 30a–30e illustrate various alternative embodiments of the outboard coupling assembly;

FIGS. 32–33 illustrate the various embodiments of support hardware securable to the rail;

FIG. 34b is a top elevational view of the rung with the spring clip connector of FIG. 34a;

FIG. 34c is a sectional view taken along line 34c—34c of FIG. 34a;

FIG. 37 is a perspective view of a rail having a further alternative embodiment of the rung attached thereto;

FIG. 38a is a front elevational view of a rung having a truck extending therefrom;

FIG. 38b is a partial sectional view of the rung of FIG. 38a taken along line 38b—38b thereof;

FIG. 38c is a front elevational view of the spring clip of FIG. 38a;

DETAILED DESCRIPTION OF THE INVENTION

Figure 1:
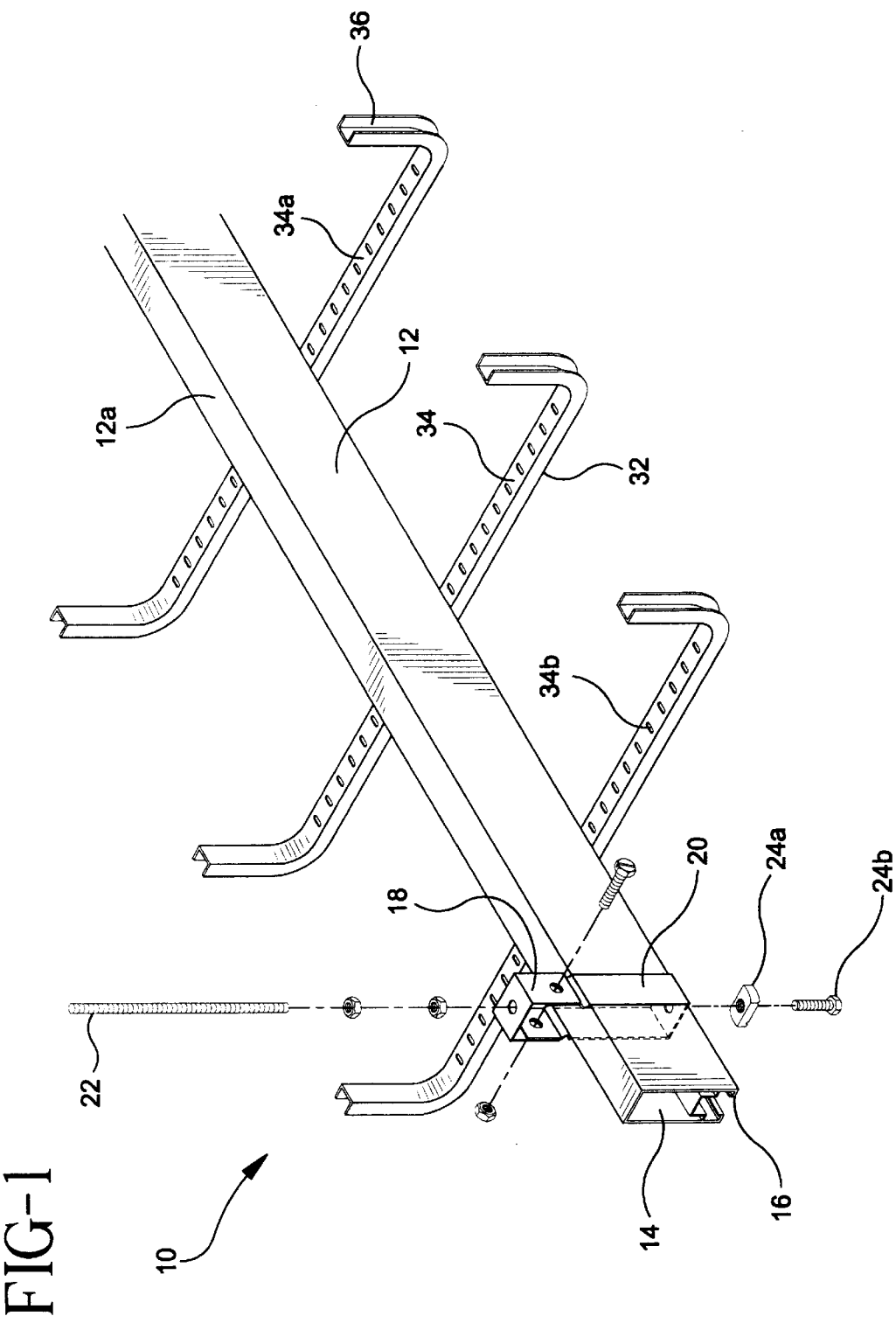
FIG. 1 is a perspective view of the cable tray assembly of the present invention.
Figure 2:
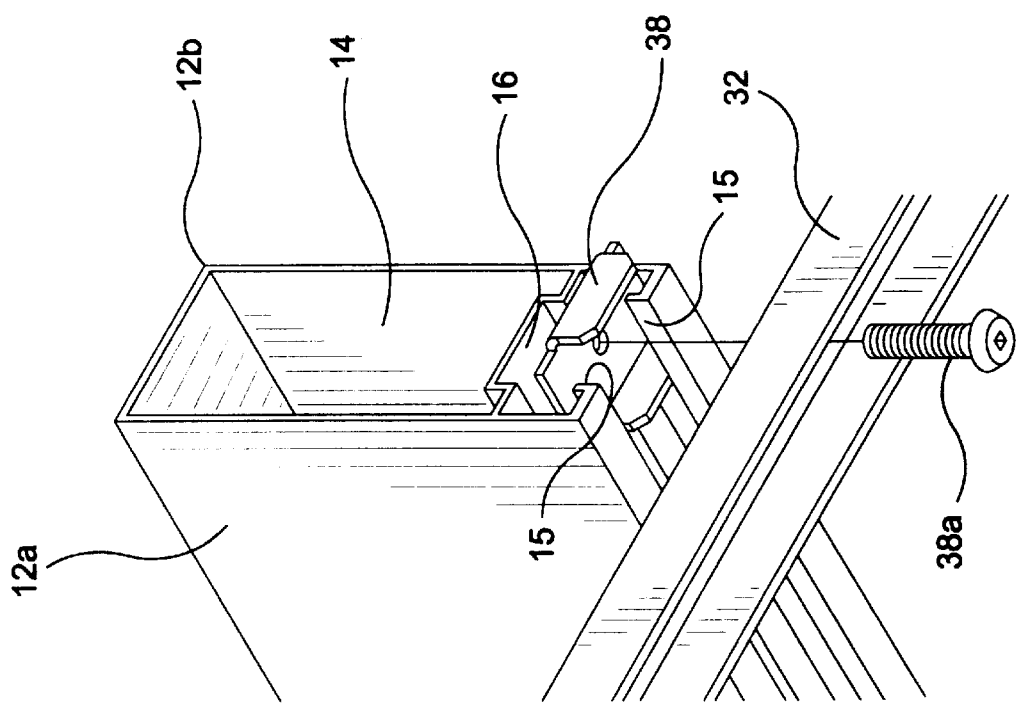
FIG. 2 is a partial perspective view showing an attachment clip.
Figure 3:
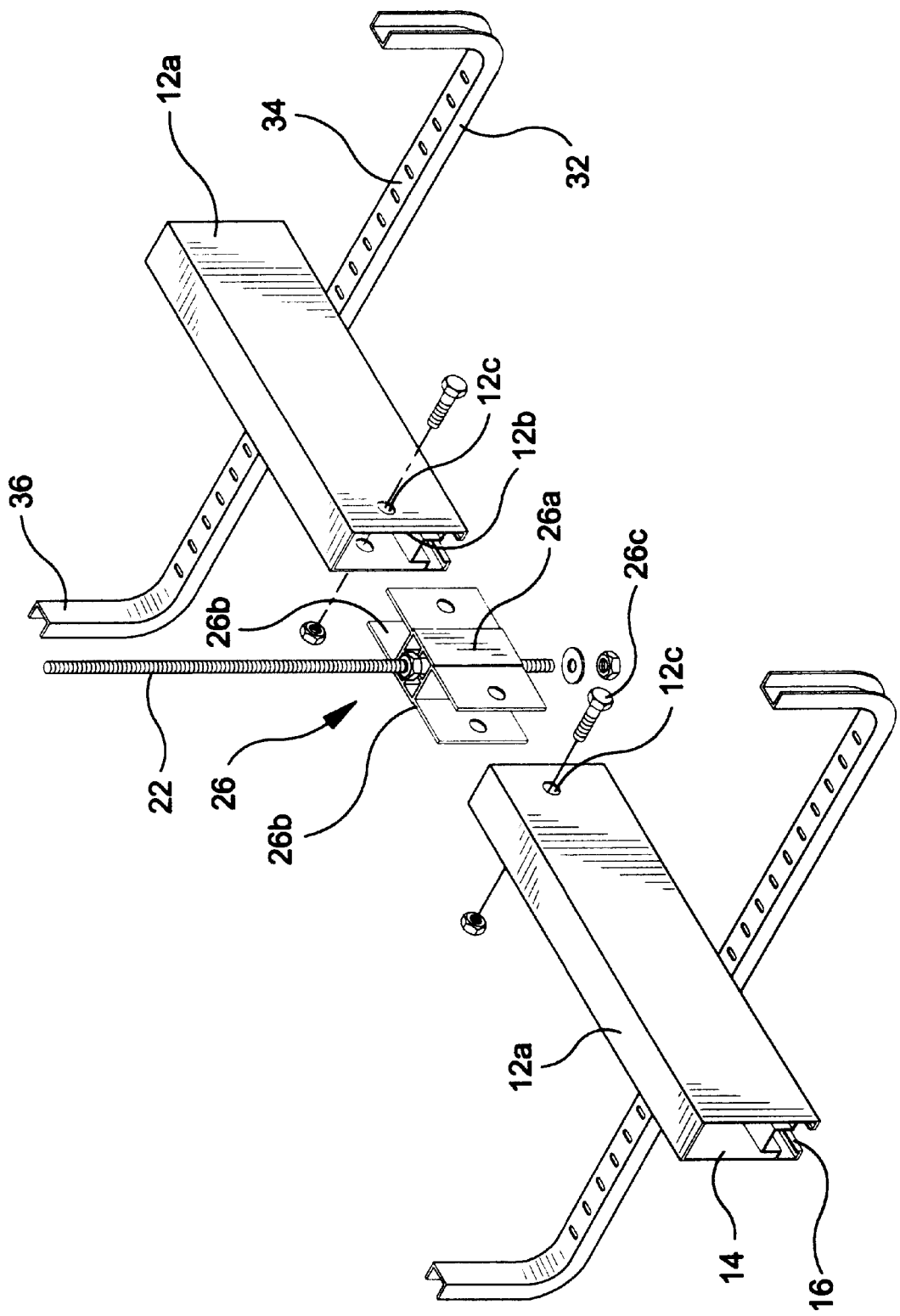
FIG. 3 is a perspective view of a splice connector for securing together rail sections.

Referring to FIGS. 1–3 herein, the cable tray assembly 10 of the present invention includes a spine or rail 12 which is an elongate generally rectangularly-shaped member which may be formed of extruded aluminum, steel, rigid plastic or any other material well known in the art. Rail 12 includes a generally closed rectangular channel 14 therethrough and a open ended channel 16 thereadjacent running the length of rail 12. The opening to the channel is defined by a pair of spaced walls 15. A plurality of support members, preferably rungs 32, are secured to rail 12 adjacent open channel 16. The rungs define a plane in which the cables, conduits and the like may be supported.

In the present illustrative embodiment, rail 12 is provided in discrete rail sections 12a which are provided in various lengths. Preferably, the rail sections 12a are provided in either 10 or 12 foot lengths. Moreover, each rail section 12a may be cut by the end user to a desired length to assemble, in longitudinal succession, a plurality of rail sections of any desirable length. Rail sections 12a may be joined together in a variety of ways to form a support system of almost any desired length.

One or more rail sections 12a may be supported from a ceiling or other overhead structure by a clevis hanger 18, as shown in FIG. 1. Clevis hanger 18 includes a rail support member 20 for accommodating rail 12 and a threaded rod 22 extending upwardly therefrom. Threaded rod 22 may be attached to a beam clamp secured to an I-beam (not shown) so as to effectively hang the rail 12 from the ceiling at a preselected distance therefrom. Appropriate hardware 24 may be used to secure the clevis hanger 18 to the rail 12, e.g., nut member 24a may be positioned within channel 16 to provide a member for threadedly engaging screw 24b. As may be appreciated, one or more clevis hangers 18 may be employed for each rail section 12a to support the assembly of rail sections to the ceiling.

Rail sections 12a support a plurality of rungs 32 at spaced locations therealong. Rungs 32 are designed to hold or carry the electrical wires or cables (not shown) at a location laterally offset from rail 12. Each rung 32 includes an elongate extent 34 having a planar surface 34a on which the wires or cables may be supported. The planar surface 34*a* includes a plurality of spaced apertures 34*b* extending therethrough which permit securement devices (not shown) to be threaded therethrough to secure the wires and cables supported by the rungs. Devices such as cable ties and pipe straps may be used in combination with the rungs to support the wires and cable thereto. Preferably, the rungs include at opposed ends thereof, upturned sections 36. The upturned sections provide a U-shaped configuration to the rungs which generally help contain the wires supported by the rungs. Rungs 32 are rigidly securable to rail section 12*a* in a manner set forth below.

Referring to FIG. 2, one technique for attaching rungs 32 to rail 12 is shown. Rungs 32 are attached to the undersurface of rail 12 adjacent open ended channel 16 and may be selectively positioned along the length of rail 12. An attachment clip 38 may be inserted into open ended channel 16 through end 12*b* of rail section 12*a*. Clip 38 is slidably movable along the length of rail section 12*a*, thus the longitudinal position of each rung 32 may be readily adjusted. Accordingly, the spacing between rungs 32 may be adjusted as desired. In order to secure a rung to rail 12, rung 32 is placed up against open ended channel 16 and a conventional bolt 38*a* is inserted through the rung and through the open end of the channel and into threaded engagement with attachment clip 38. Securement of the bolt 38*a* to the attachment clip 38 clamps a portion of channel side walls 15 between rung 32 and clip 38, thereby securely fixing the rung to the rail to prevent longitudinal movement of the rung once it is attached.

Figure 4:
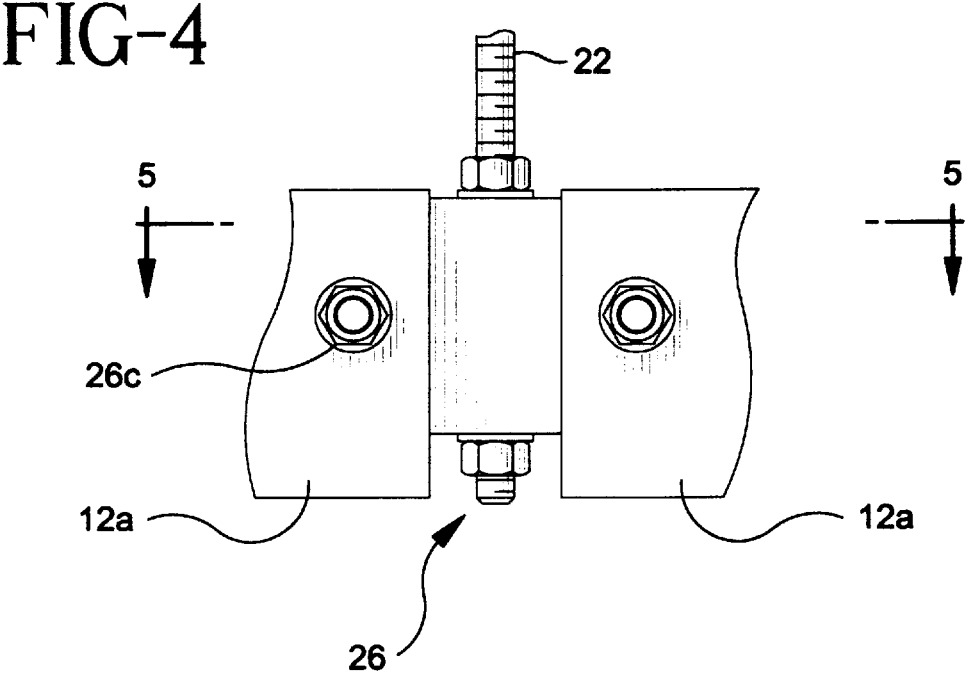
FIG. 4 is a elevational view of two rail sections connected together with the splice connector of FIG. 3.
Figure 5:
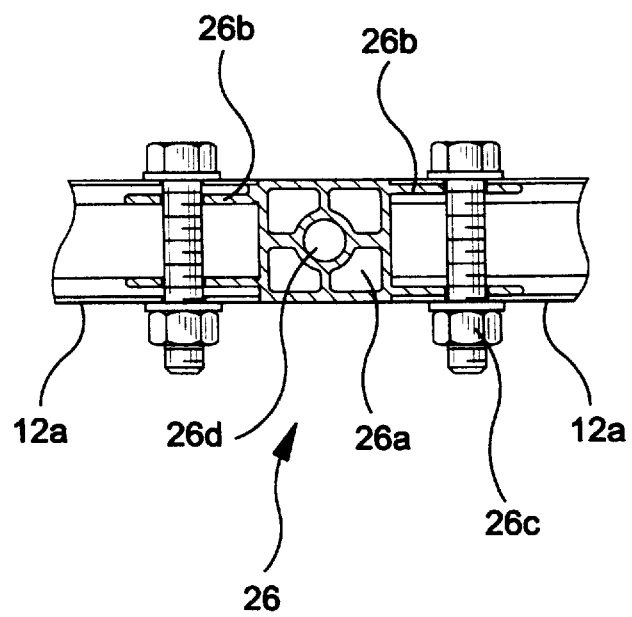
FIG. 5 is a sectional view of the splice connector and rail section taken along line 5—5 of FIG. 4.

In order to adjust the length of the rail 12, individuals rail section 12*a* may be joined together to create a suitable run. Referring to FIG. 3, a splice connector 26 is shown which connects together a pair of rail sections 12*a* in longitudinal succession. Connector 26 includes a central connector body 26*a* and a pair of oppositely extending wings 26*b*. Wings 26*b* are insertable into closed channel 14 at each end 12*b* of rail section 12*a* to support adjacent rail sections 12*a* together. Appropriate fastening hardware 26*c* may be used to secure splice connector 26 to the ends of rail sections 12*a* which may be provided with through holes 12*c* to accommodate fastening hardware 26*c*. Furthermore, connector body 26*a* may include a central aperture 26*d* to support threaded rod 22 therethrough so that the connector 26 may be used to hang or support the rail sections from an overhead support. FIGS. 4 and 5 show in further detail the interconnection of a pair of rail sections 12*a* in longitudinal succession employing connector 26.

Figure 6:
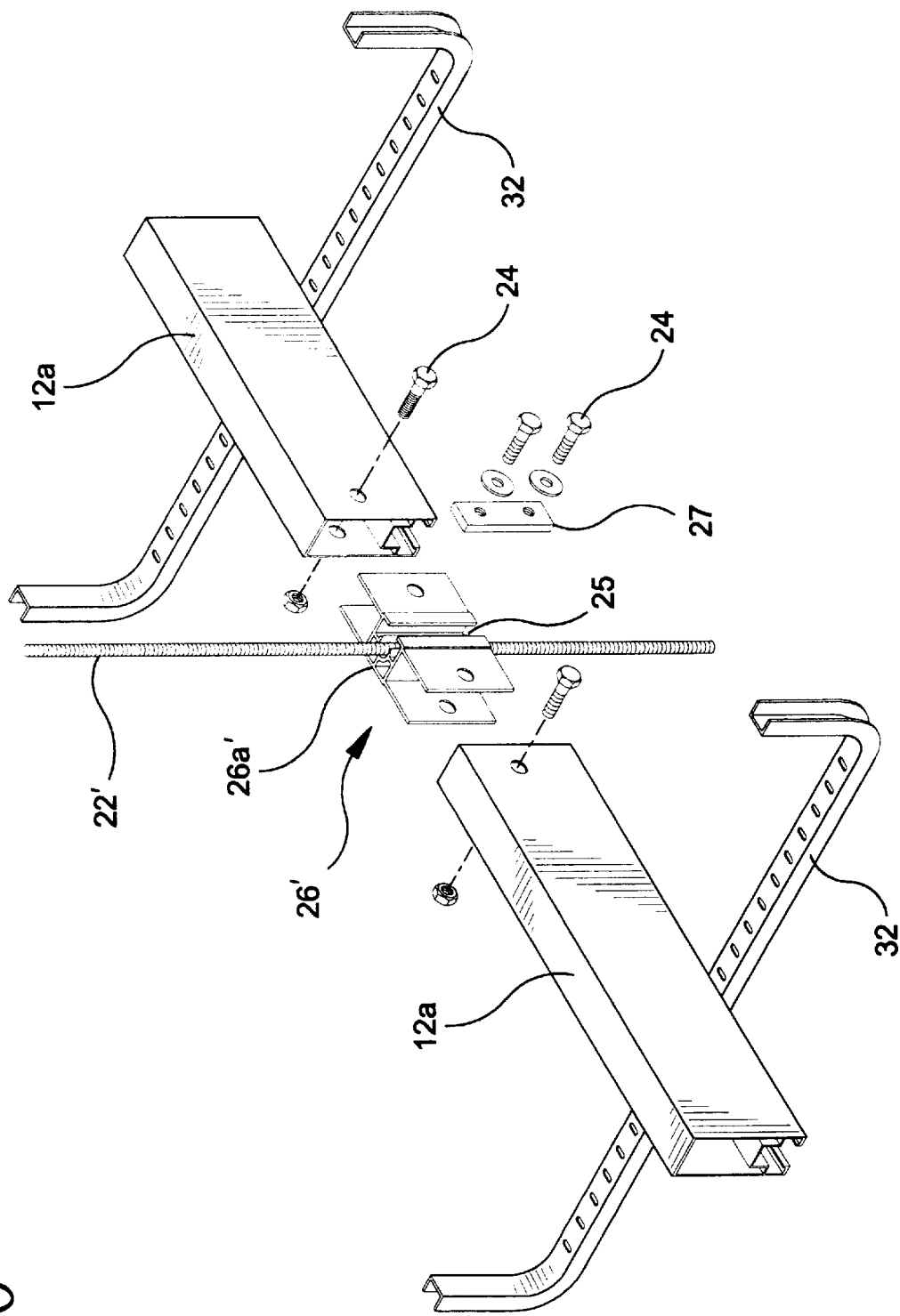
FIG. 6 is an exploded perspective view of an alternative embodiment of the splice connector.
Figure 7:
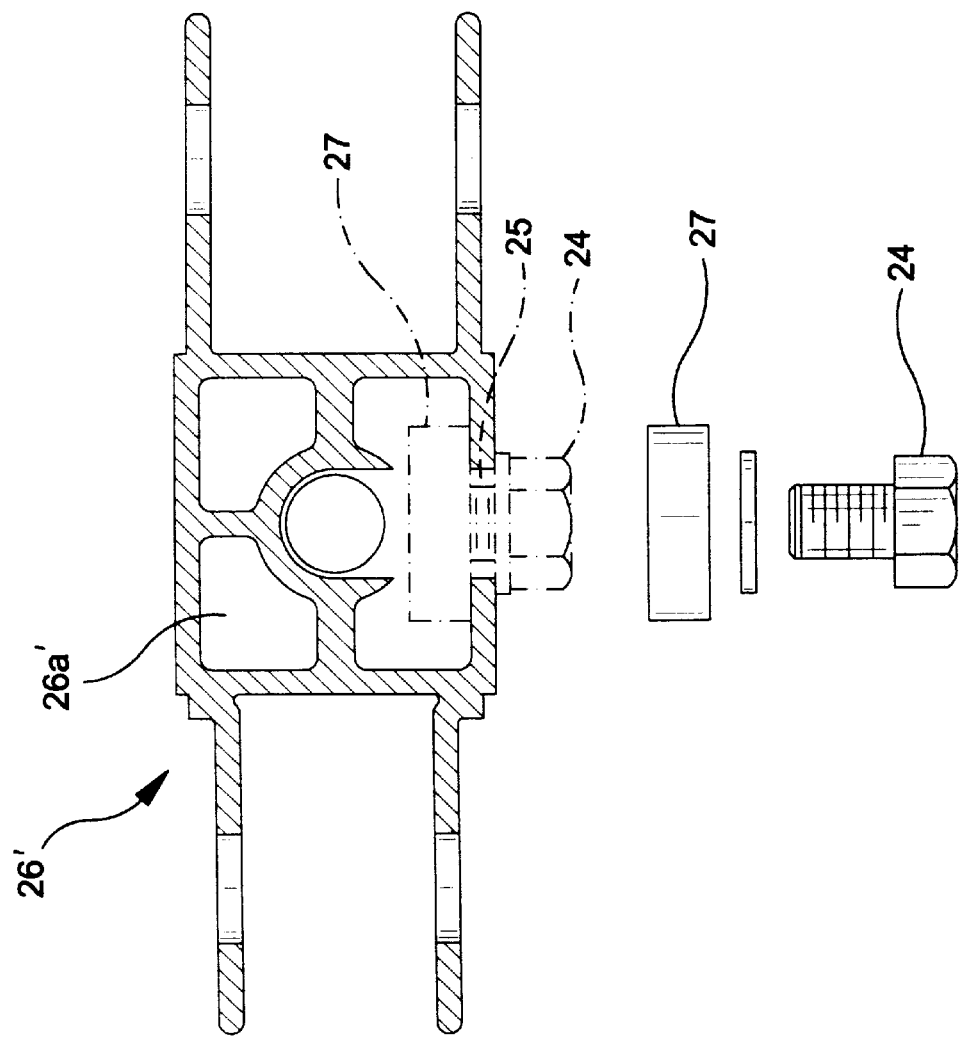
FIG. 7 is a elevational view of the splice connector of FIG. 6.

With reference to FIGS. 6 and 7, an alternative embodiment of a splice connector is shown. Splice connector 26' is formed similarly to connector 26 but further includes an axially extending slot 25 formed in connector body 26*a'*. Slot 25 permits threaded rod 22' to be radially inserted into splice connector 26', thereby permitting the rails to be secured to elongate rods which have been previously installed. A plate 27 may be inserted within connector 26' overlying slot 25 and secured to splice connector 26 by a pair of fasteners 24 threadably engaged therewith as shown in FIG. 6.

Figure 8:
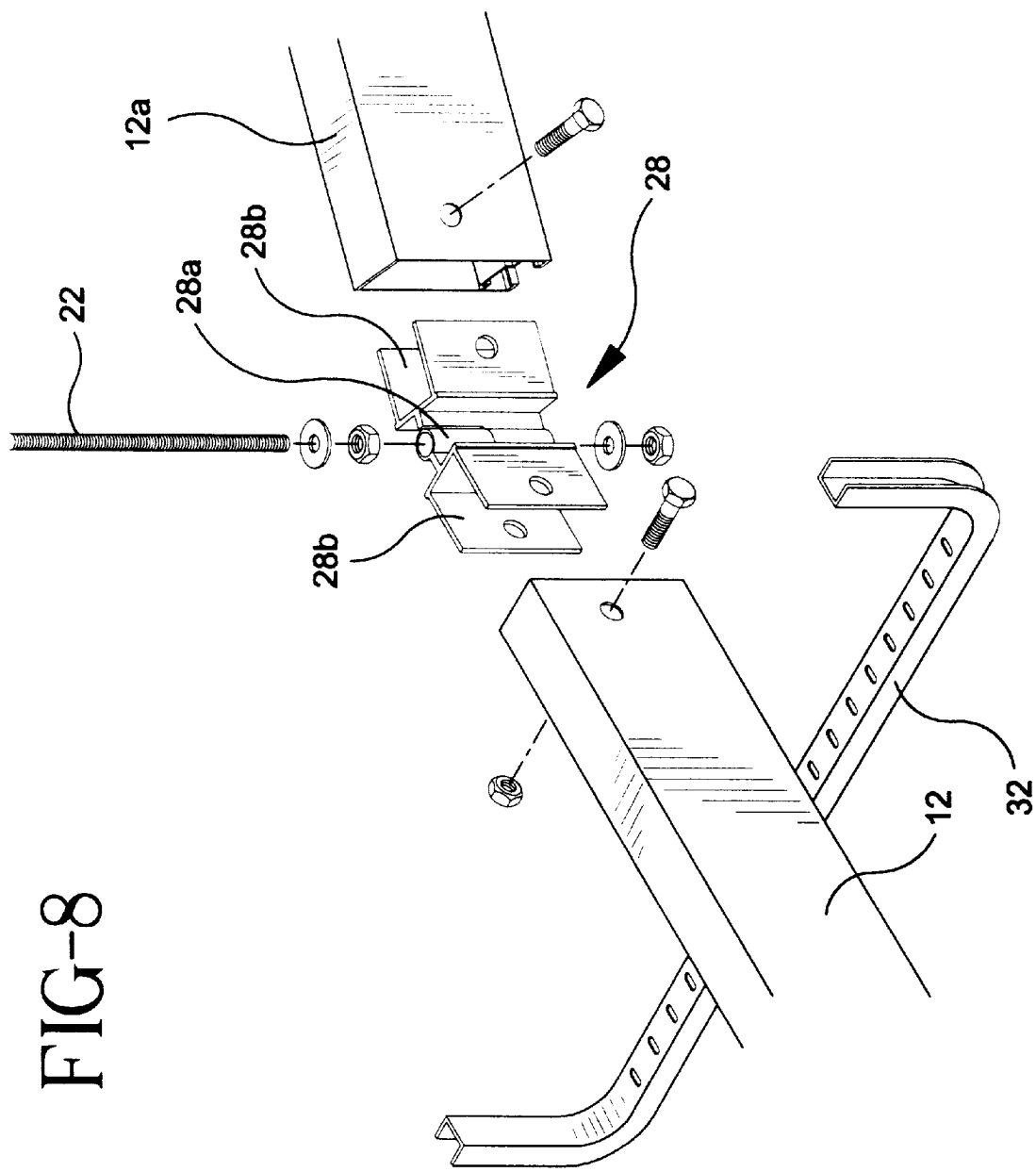
FIG. 8 is an exploded perspective view of a modified connector secured together with a threaded rod.

Referring to FIG. 8, a modified connector 28 is shown. Connector 28 functions in a manner similar to connector 26 in that it supports and fixedly joins a pair of rail sections 12*a* together in longitudinal succession. However, connector 28 is modified in that wings 28*b* thereof are interconnected at a central pivotal location 28*a* so that the wings may rotate or pivot with respect to each other. This allows splicing or connection of two rail sections to take place at an adjustable angle enabling the assembled rails 12 to negotiate a turn allowing the wires supported thereby to be routed in various directions.

Figure 9:
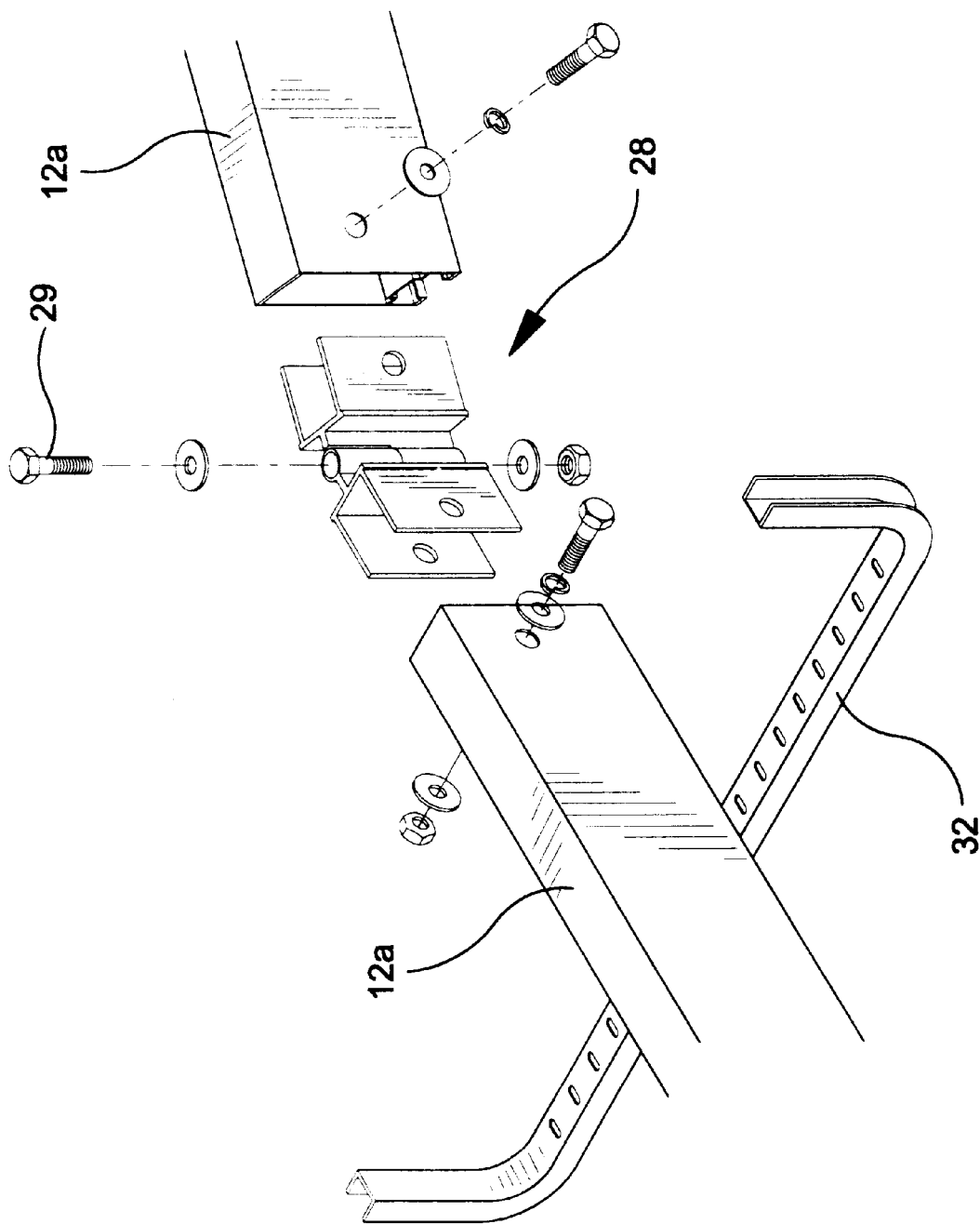
FIG. 9 is an exploded perspective view of the connector of FIG. 8 secured together by a nut and bolt assembly.

Connector 28 may be employed with threaded rod 22 to support rail sections 12*a* from an overhead support. Threaded rod 22 may also act as a hinge pin about which the elements of connector 28 may rotate. Once the desired angle between rail sections 12*a* is obtained, the fastening hardware may be tightened to lock the rails in a fixed orientation. In situations where there is no need to provide such overhead support at each location, the threaded rod may be substituted for by a conventional nut and bolt assembly 29 such as shown in FIG. 9.

Figure 10:
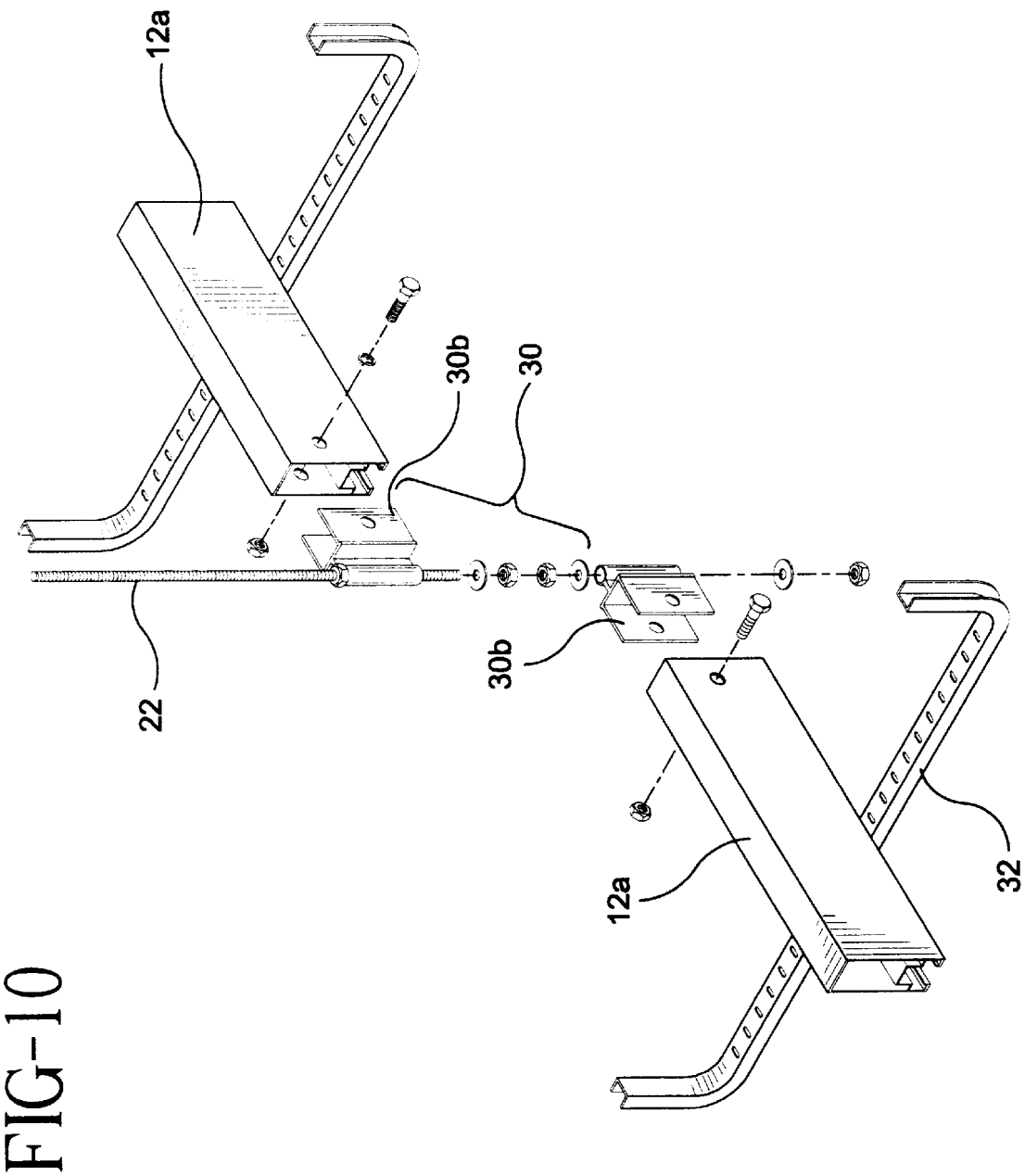
FIG. 10 is an exploded perspective view of an alternative connector for joining rail sections at vertically spaced locations.

Referring now to FIG. 10, a further connector 30 is shown. Although connector 30 is substantially similar to connector 28 described above, the opposed wings 30*b* are positioned at vertically spaced locations. Thus, interconnection between adjacent rail sections 12*a* can be accomplished not only at varied angles but also at different heights. The adjustment in vertical separation between rail section 12*a* may be achieved by securing each connector element 30*b* between two nut fasteners. Therefore, each connector element may be independently fixed on rod 22. Such positioning allows the rails to be vertically offset and permits cables supported by the cable tray assembly to be routed over and under various obstacles such as piping, HVAC ducts and the like. As with connector 28, a threaded rod 22 may be used in combination with connector 30 to support the rail sections 12*a*, or a standard nut and bolt combination (not shown) may be employed where no support is required.

Figure 11:
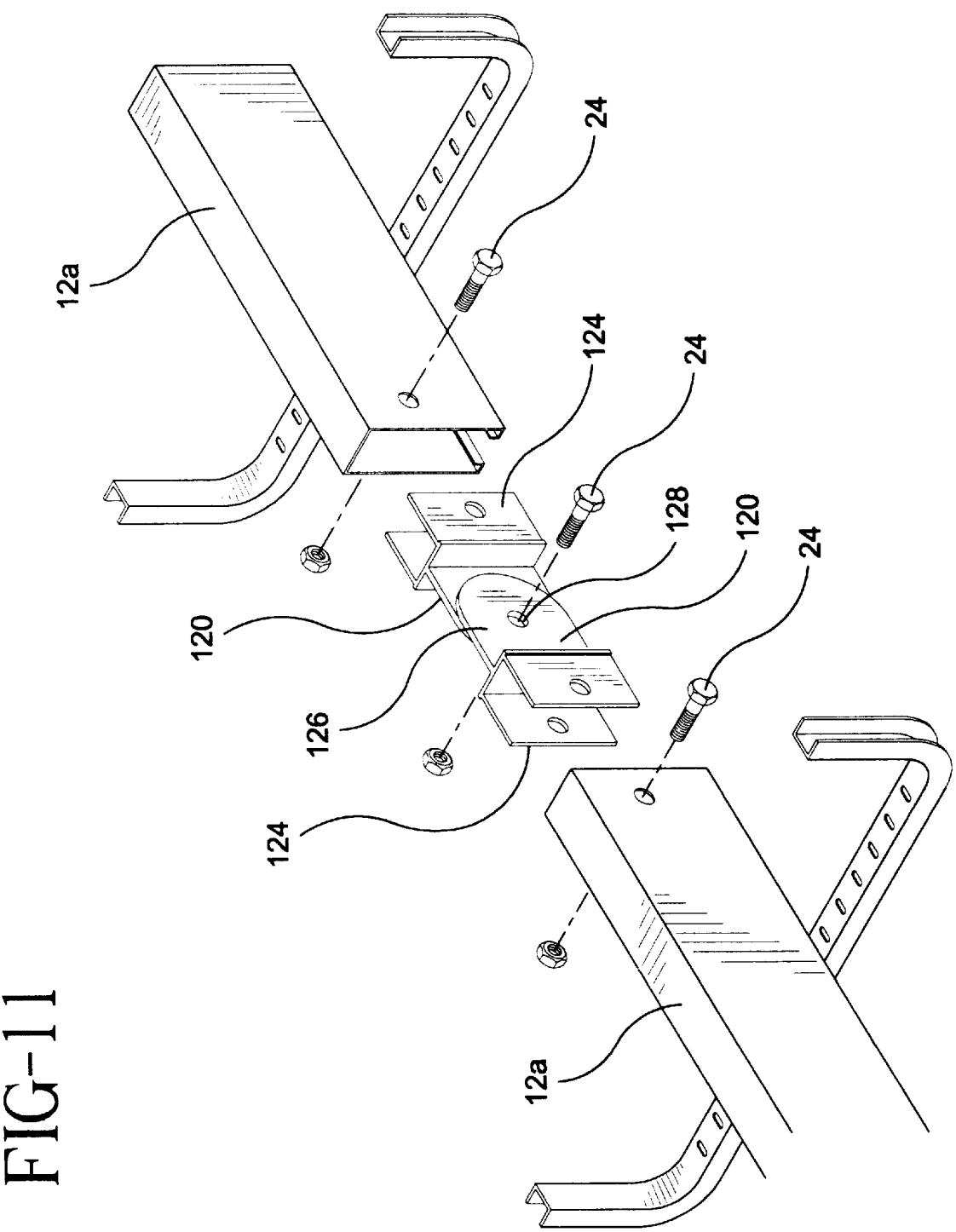
FIG. 11 is an exploded perspective view of an alternative embodiment of a connector which allows for rail sections to be angularly adjusted to an axially vertical plane.

As shown in FIG. 11, in addition to providing a connector which permits rail sections 12*a* to be angularly adjusted in a longitudinal plane, the present invention includes a connector 120, which permits rail sections to be angularly adjusted in a vertical plane. Connector 120 includes a winged portion 124 similar to that of connector 26. The winged portion 124 is insertable within the rail section 12*a*. The opposing end of connector 120 includes a tang 126 having a throughhole 128 formed therethrough. Throughhole 128 of one connector may be aligned with a throughlhole of an adjacent connector and rotatably secured thereto by fastening hardware 24. Once the desired angles between rail sections 12*a* is achieved, the hardware can be tightened thereby locking the rail sections at a set angle.

Figure 12:
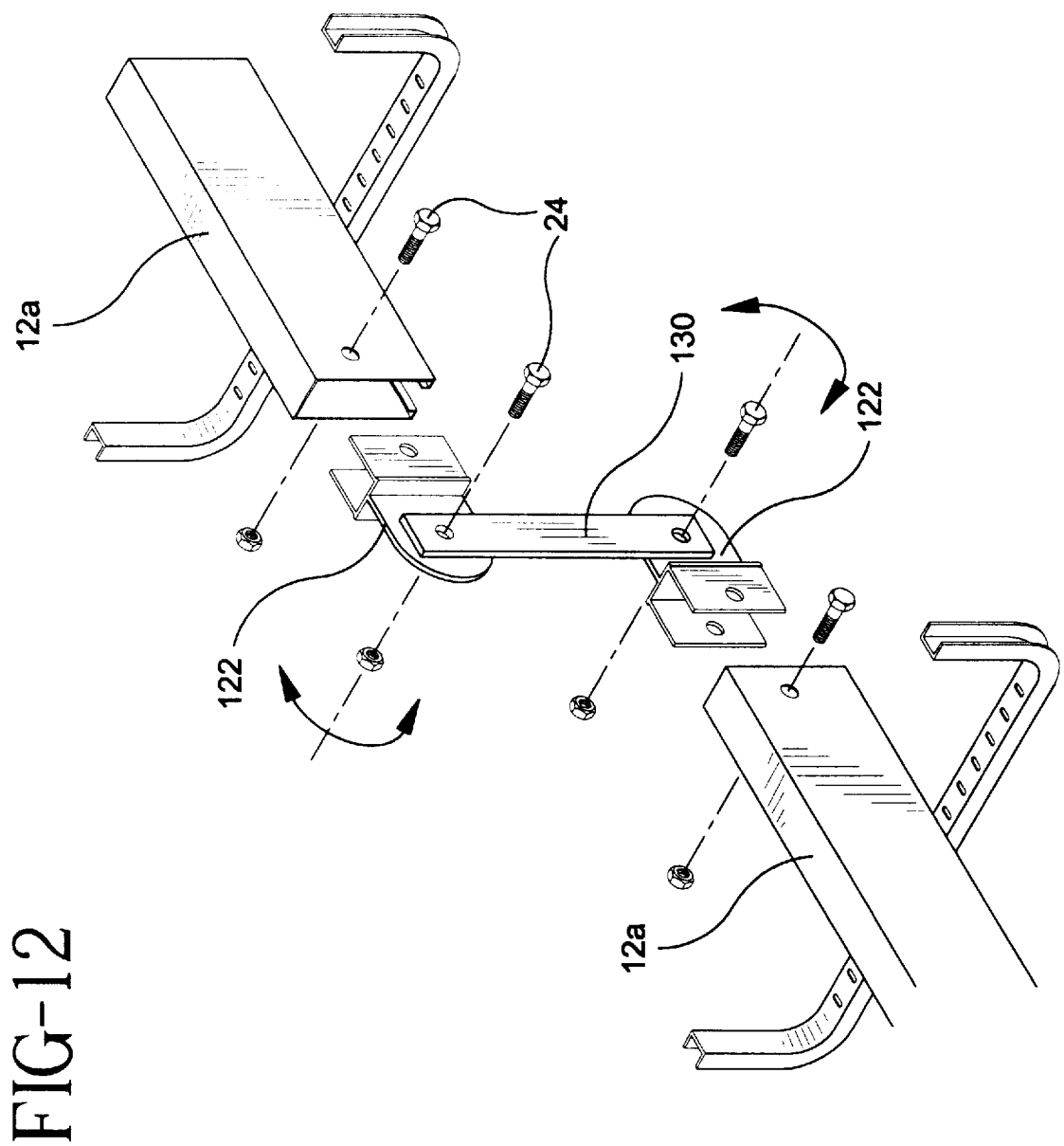
FIG. 12 is an exploded perspective view of the connector of FIG. 11 including an offset bar.

As shown in FIG. 12, connectors 122 of adjacent rails 12*a* may incorporate an offset bar 130 extending therebetween. Such a configuration permits adjacent rail sections 12*a* to be vertically offset in addition to being angularly offset.

Figure 13:
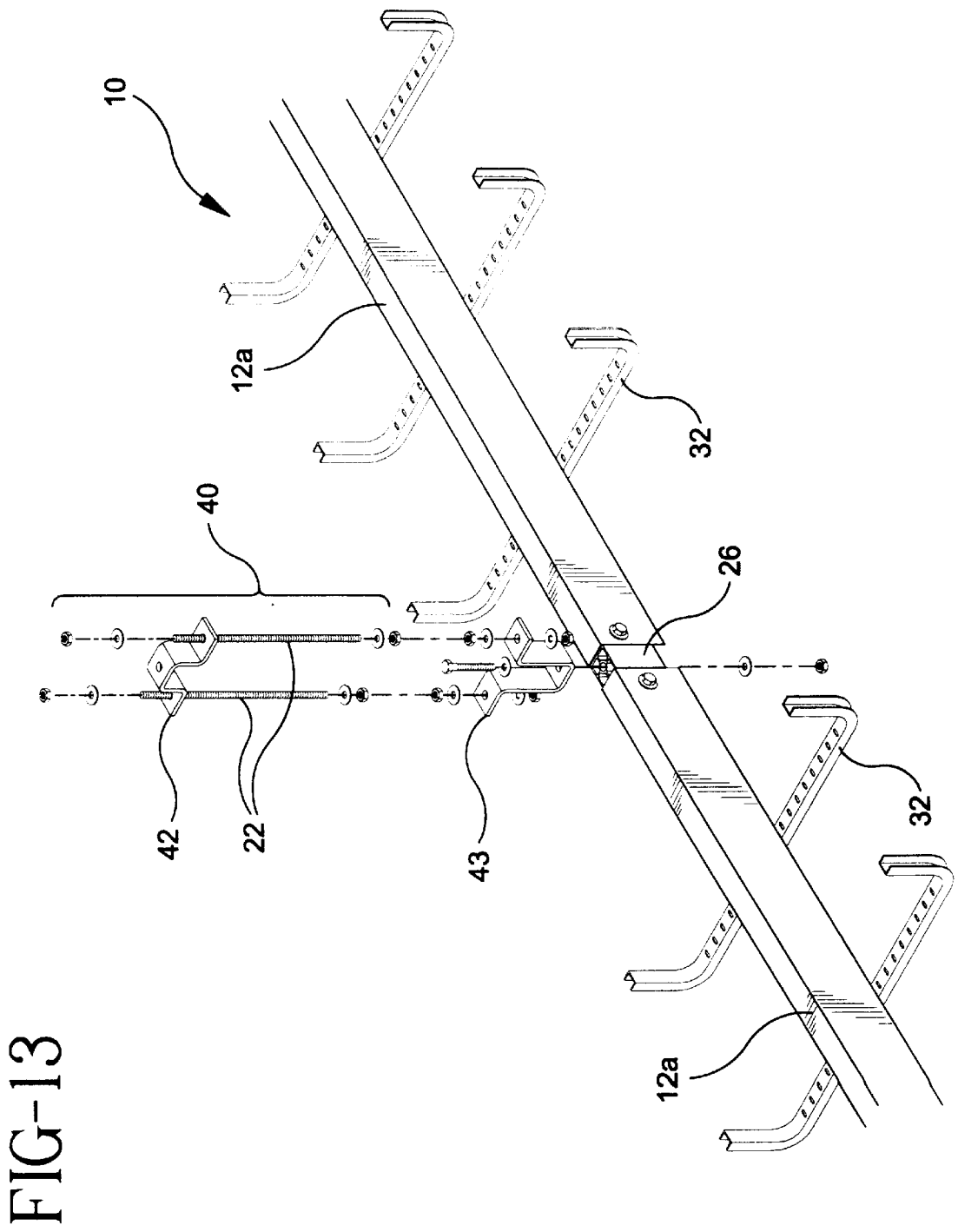
FIG. 13 is an exploded perspective view of a rail and ceiling attachment assembly.

The cable tray assembly of the present invention, due to its modular design, further allows the use of various accessories to provide greater flexibility in the mounting of the cable tray as well as the routing of wires in a given location. Referring to FIG. 13, a ceiling attachment assembly 40 is shown. Ceiling attachment assembly 40 may be used in conjunction with connector 26 shown in FIG. 3 to provide more stability to the longitudinally extending rail 12. Ceiling attachment assembly 40 employs a pair of threaded rods 22 mounted to connector 26 by upper and lower saddle U-shaped assemblies 42 and 43. The upper saddle assembly 42 may be mounted directly to an overhead structure or may employ a further threaded rod 22 for hanging purposes.

Figure 14:
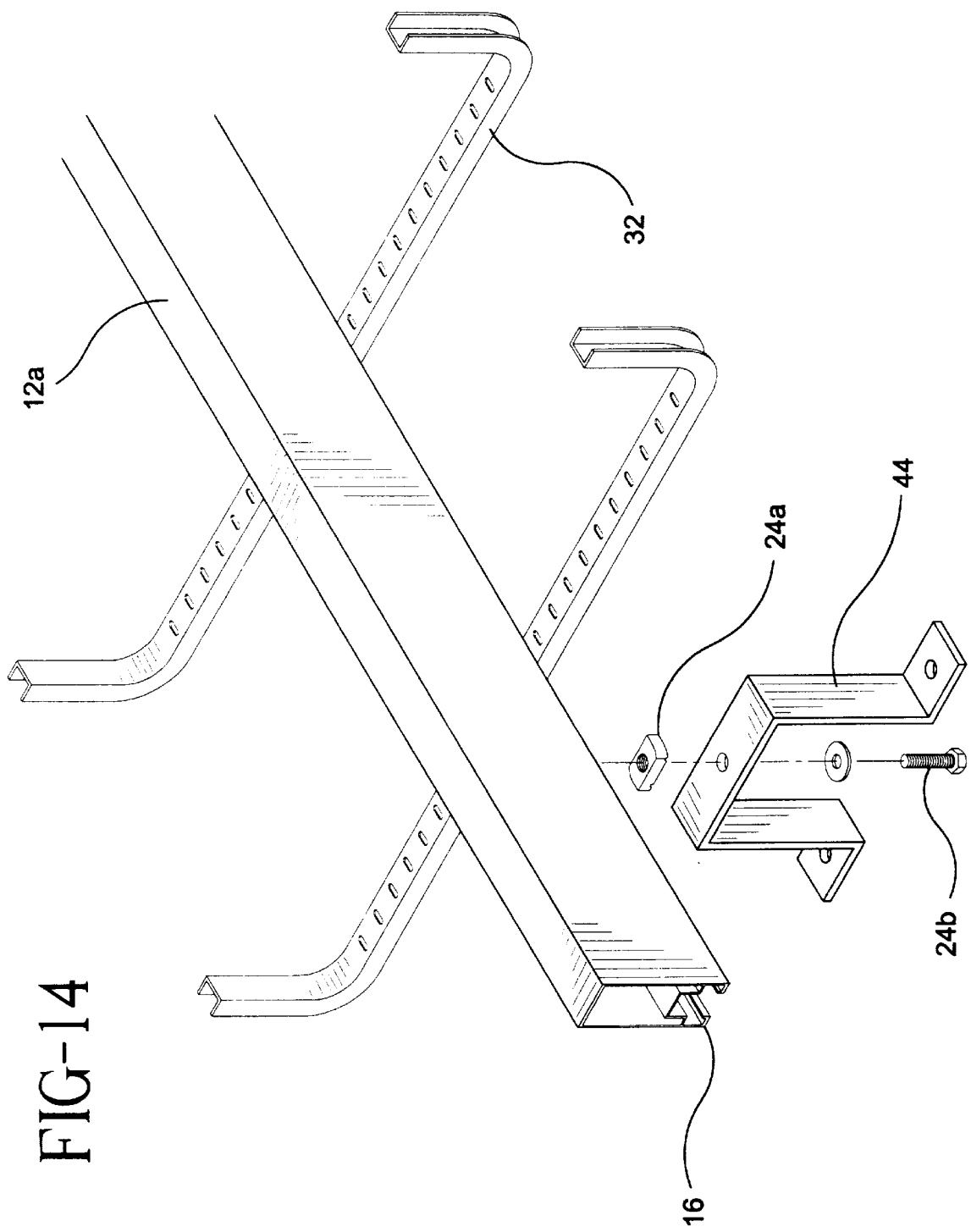
FIG. 14 is an exploded perspective view of a rail and floor bracket assembly.

FIG. 14 shows rail section 12*a* employed with a lower floor bracket 44 which allows the rail to be mounted spaced from a floor or other horizontal support in situations where wire routing in this manner is necessary. A nut fastener 24*a* may be positioned within slot 16 and engaged by fastening bolt 24b. Tightening of the nut and bolt combination will positionally fix floor bracket to rail section 12a.

Figure 15:
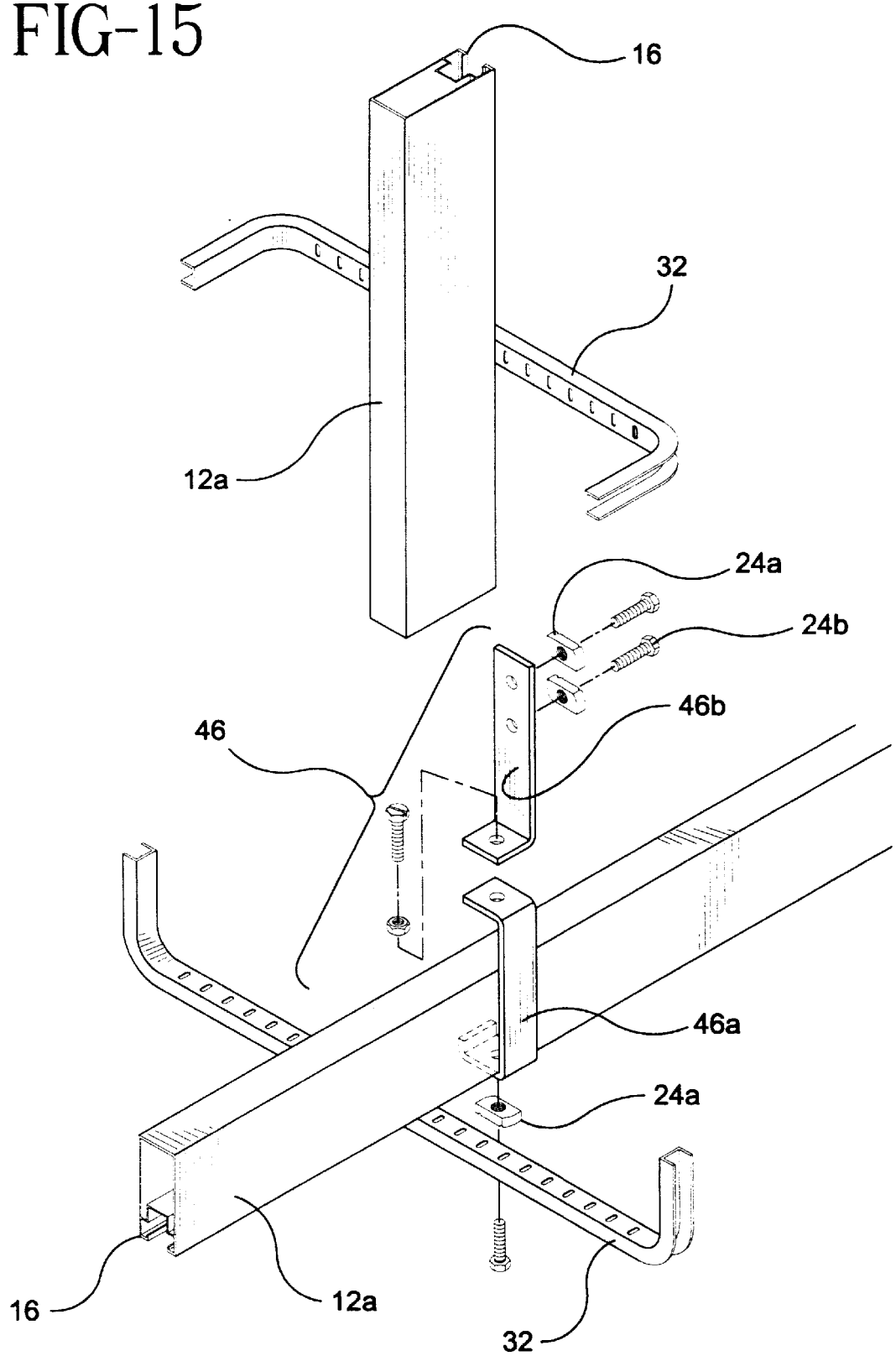
FIG. 15 is an exploded perspective view of a vertical coupling assembly.

FIG. 15 shows a vertical coupling assembly 46 which allows rail sections 12a to be interconnected at a right angle to one another. Assembly 46 includes a first bracket 46a mountable to a central location of one rail 12a and a second bracket 46b which is mountable to the end of a orthogonally extending rail section 12a. Nut fasteners 24a are slidably positionable within rail channel 16 and secure the first and second brackets 46a and 46b to their corresponding rail sections 12a. The slidable nut fastener permits one rail section 12b to be joined at substantially any longitudinal position along the length of the other rail section 12b.

Figure 16C:
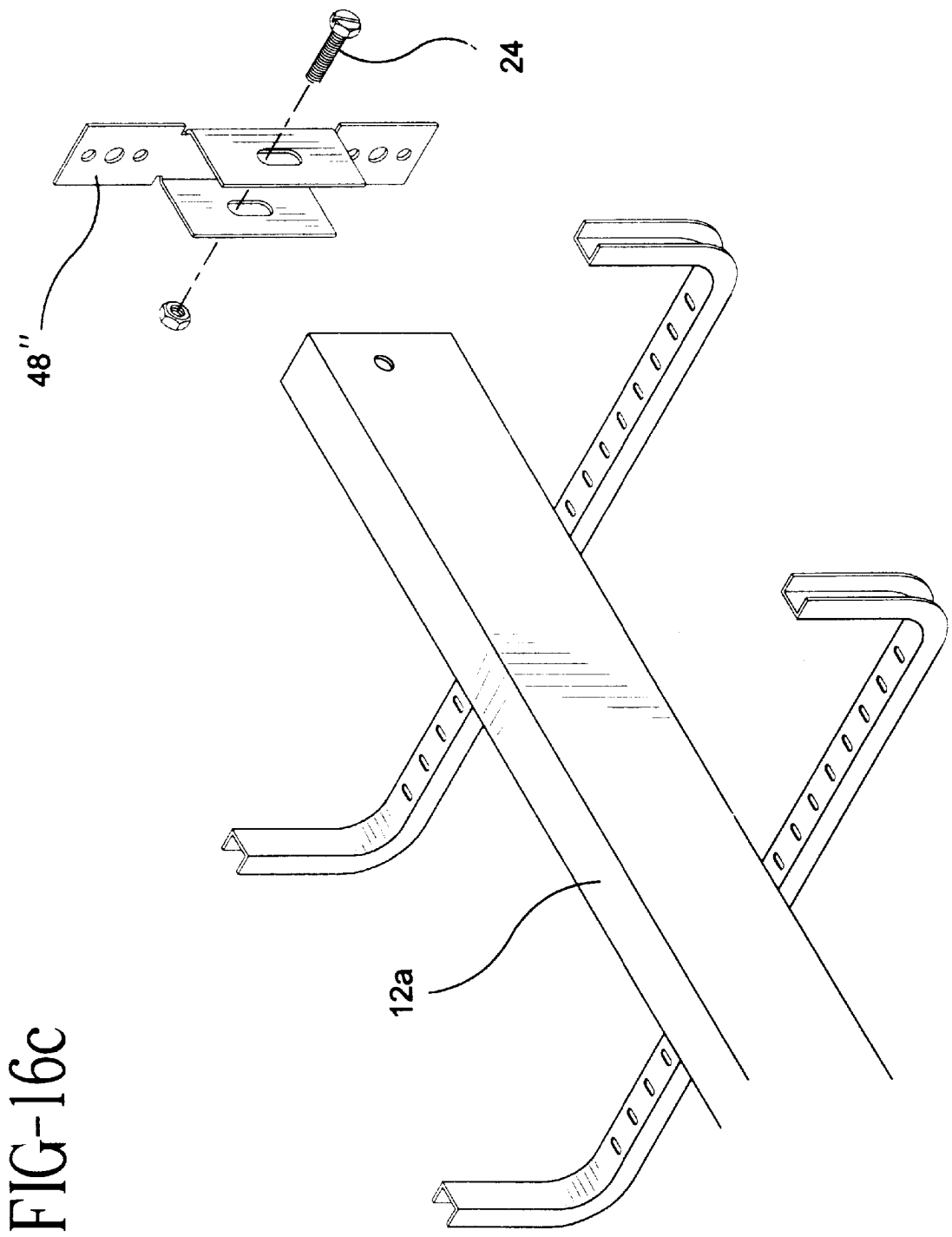
FIG. 16c is an exploded perspective view of a further alternative embodiment of an end wall bracket.
Figure 16D:
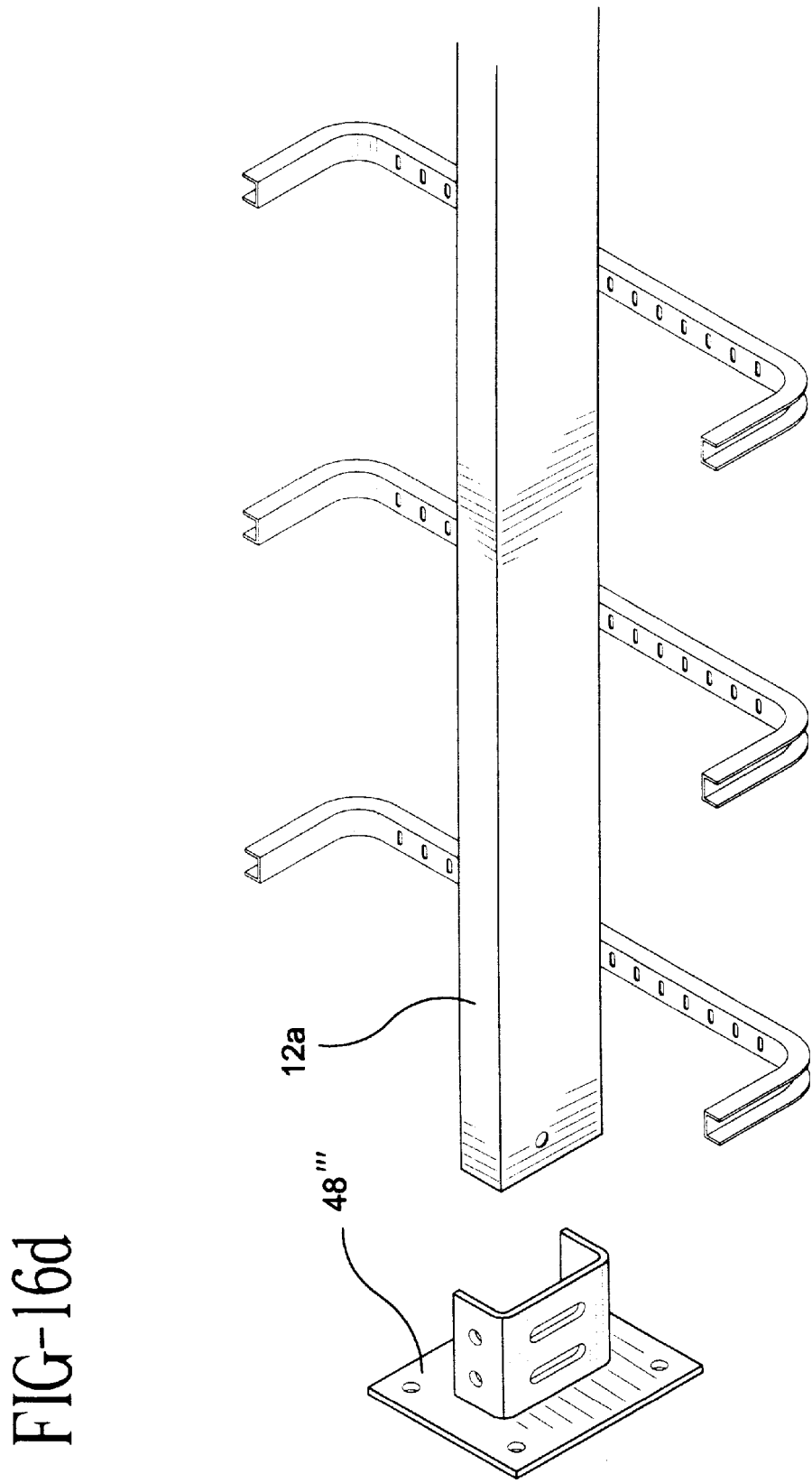
FIG. 16d is an exploded perspective view of a further alternative embodiment of an end wall bracket.

FIG. 16a illustrates an end wall bracket 48 which allows the last rail section 12a to be mounted directly to a wall where the rail section terminates. Wall bracket 48 has a U-shaped portion which engages the side walls 12d of rail section 12a and helps support and maintain the rail 12 in proper alignment. Nut fasteners 24a and bolts may be used to secure rail section 12a to wall bracket 48. Additional embodiments of an end wall bracket are shown in FIGS. 16b–d. End wall brackets 48', 48" and 48'" may be secured to rail sections 12a with fastening hardware 24.

Figure 17:
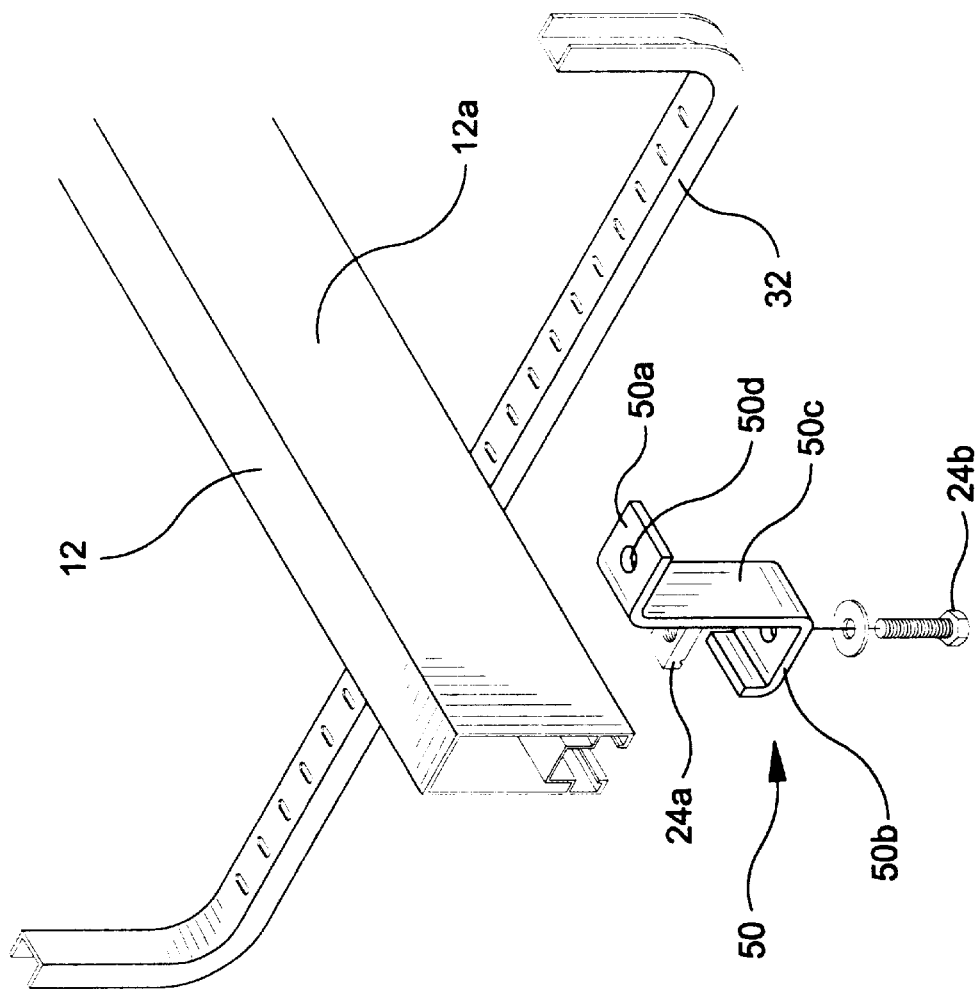
FIG. 17 is an exploded perspective view of a multi-purpose bracket of the present invention.

A multi-purpose bracket 50 which may be used to secure rail 12 to various support structures found in commercial construction is shown in FIG. 17. Bracket 50 preferably includes a S-shaped configuration with a top flange 50a and a bottom flange 50b extending from a central member 50c. A throughhole 50d may be provided on top flange 50a in order to permit bracket 50 to be secured to a structure. Additionally, by way of a nut fastener 24a inserted in open channel 16 and bolt 24b, bracket 50 may position at substantially any location along the length of rail section 12a.

Figure 18:
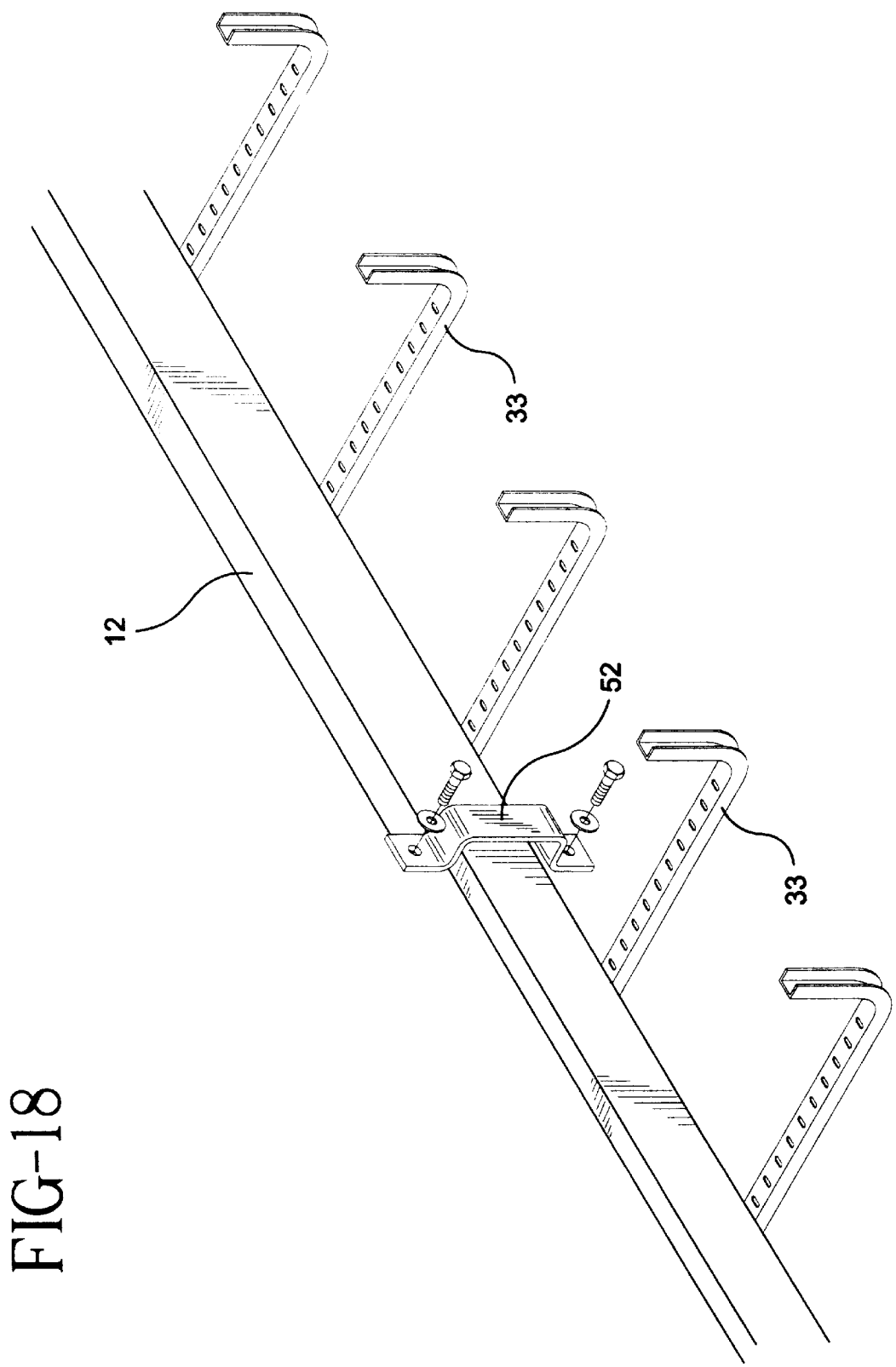
FIG. 18 is a perspective view of a wall mounted saddle and rail.

FIG. 18 shows a wall mounted saddle 52 which may be used to mount rail 12 directly onto a vertical wall or the like. In such situations, modified rungs 33 are provided. Rungs 33 are substantially similar to rungs 32 but only extend to one side of rail 12 thus allowing the rail to be mounted directly onto a vertically extending wall.

In situations where wall mounting is desired and use of standard rung 32 is also desired, a spaced wall support 54 such as shown in FIG. 19a may be provided. Spaced wall support 54 may be mechanically secured to a wall or other vertical surface and includes outwardly extending arms 54a and 54b terminating at a connection point to connector 26. Thus, the rail 12 may be mounted to a wall at a spaced location therefrom to enable standard rungs 32 to be employed. In an alternative embodiment shown in FIG. 19b, wall support 54' may include a pair of back to back slotted channel members 57 which are securable to connector 26.

Figure 20:
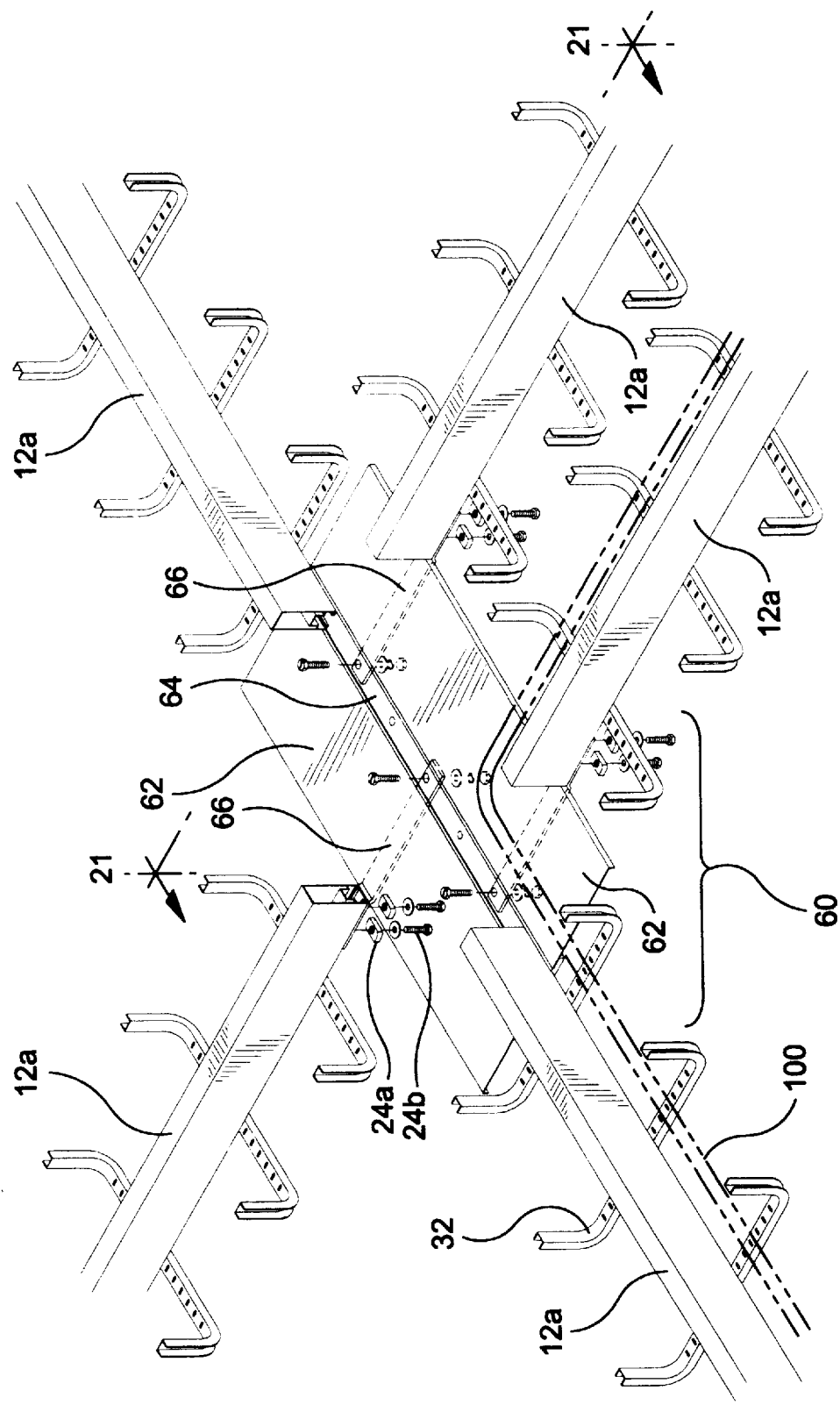
FIG. 20 is a perspective view of a central intersection assembly.
Figure 21:
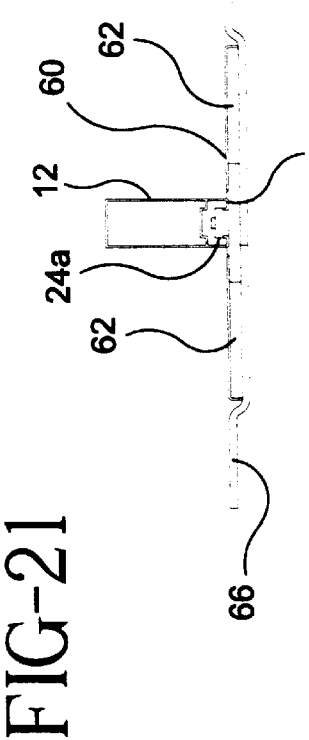
FIG. 21 is a partial cross-sectional view taken along line 21—21 of FIG. 20.
Figure 22:
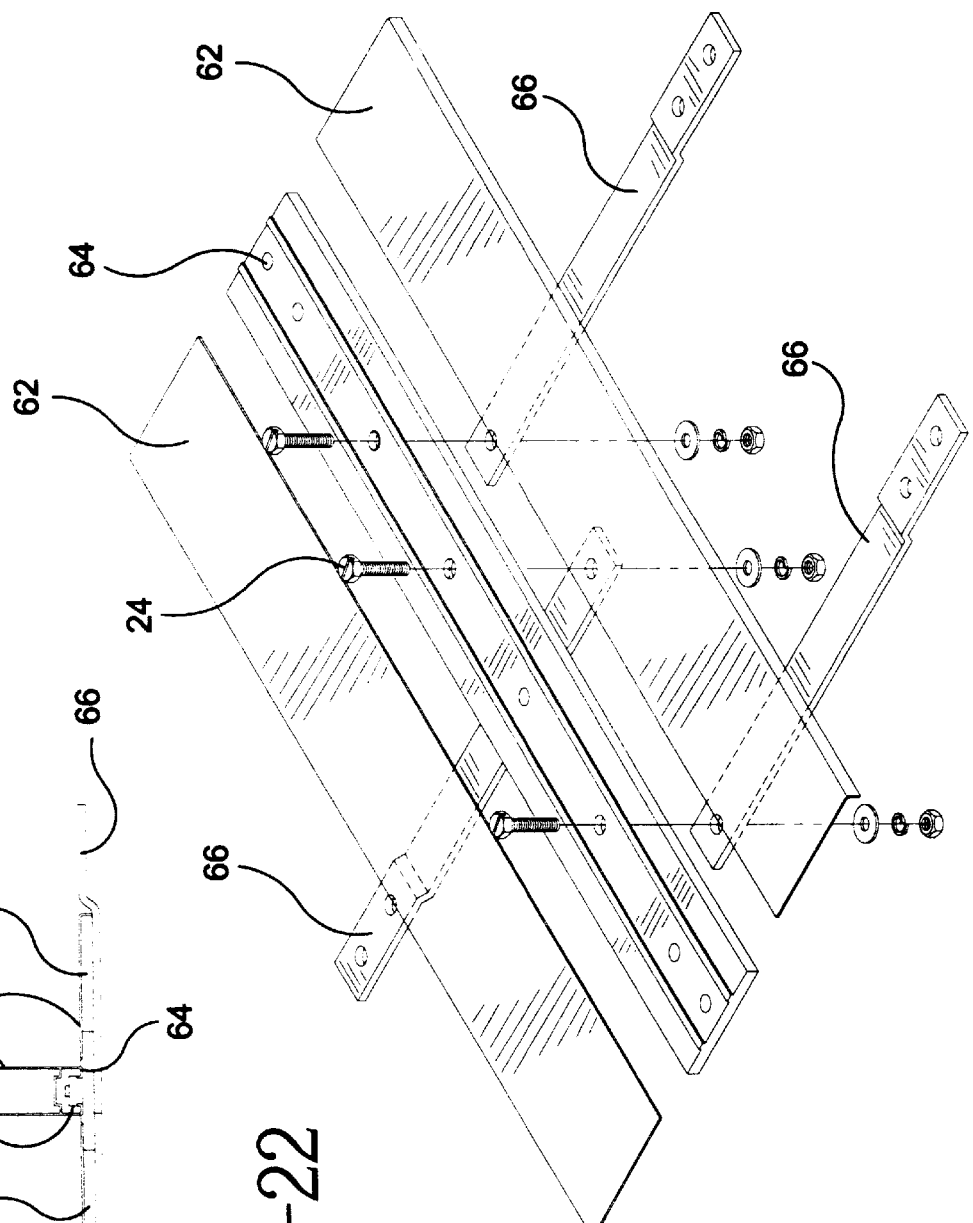
FIG. 22 is an exploded detail of the intersection assembly of FIG. 20.

The cable tray assemblies may be arranged in various configurations so as to provide versatility in the running of wires or cables. Referring now to FIGS. 20–23, various components which allow for different arrangements of cable tray assemblies are shown. Specifically with respect to FIGS. 20–22, a central intersection assembly 60 is shown. Intersection assembly 60 allows the truncation of various rail sections 12a thereat so that wire bundles may be routed to different locations within a facility. Intersection assembly 60 is shown in exploded view in FIG. 22 and includes a pair of plate members 62 mounted to a central support 64. Elongate brackets 66 are used to secure the planar members 62 to the central support 64. As shown in FIG. 20, brackets 66 are attached below the ends of rail sections 12a via nut fasteners 24a inserted within rail open channel 16 and bolts 24b to support rail sections 12a to the intersection assembly 60. In addition the rail section 12a longitudinally aligned with central member 64 may be directly attached thereto.

Figure 23:
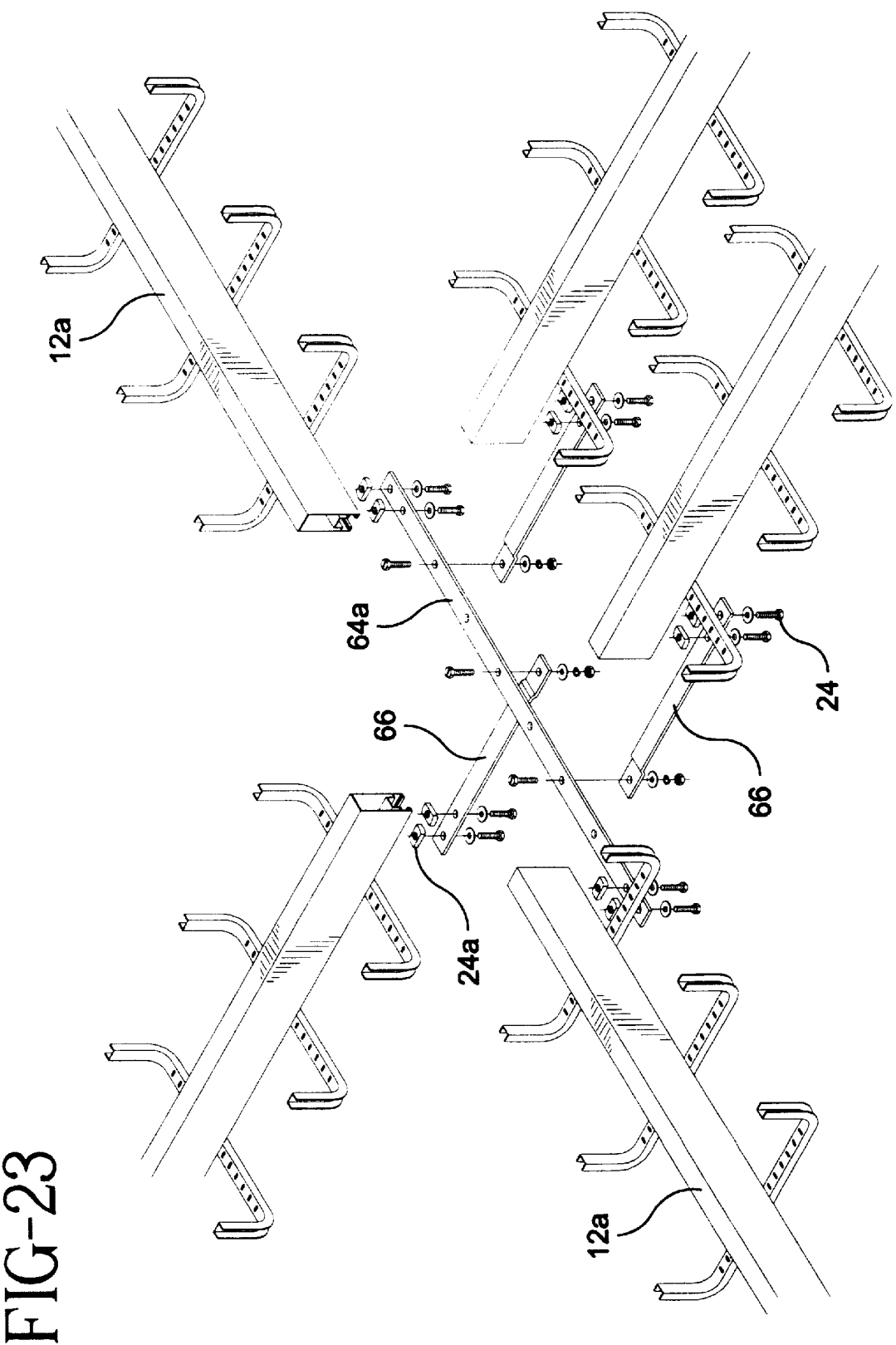
FIG. 23 is an exploded perspective view of an alternative embodiment of the intersection assembly of FIG. 20 without the use of planar members.

It is contemplated that bundles of wire or cable may be brought to the intersection assembly 60 by one or more cable tray assemblies whereupon various combinations of wires and cables may be routed in different directions employing other cable tray assemblies attached at the intersection assembly 60. It is also contemplated that intersection assembly 60 may be employed without planar members 62 and with a relatively narrow central member 64a as shown in FIG. 23.

Figure 24:
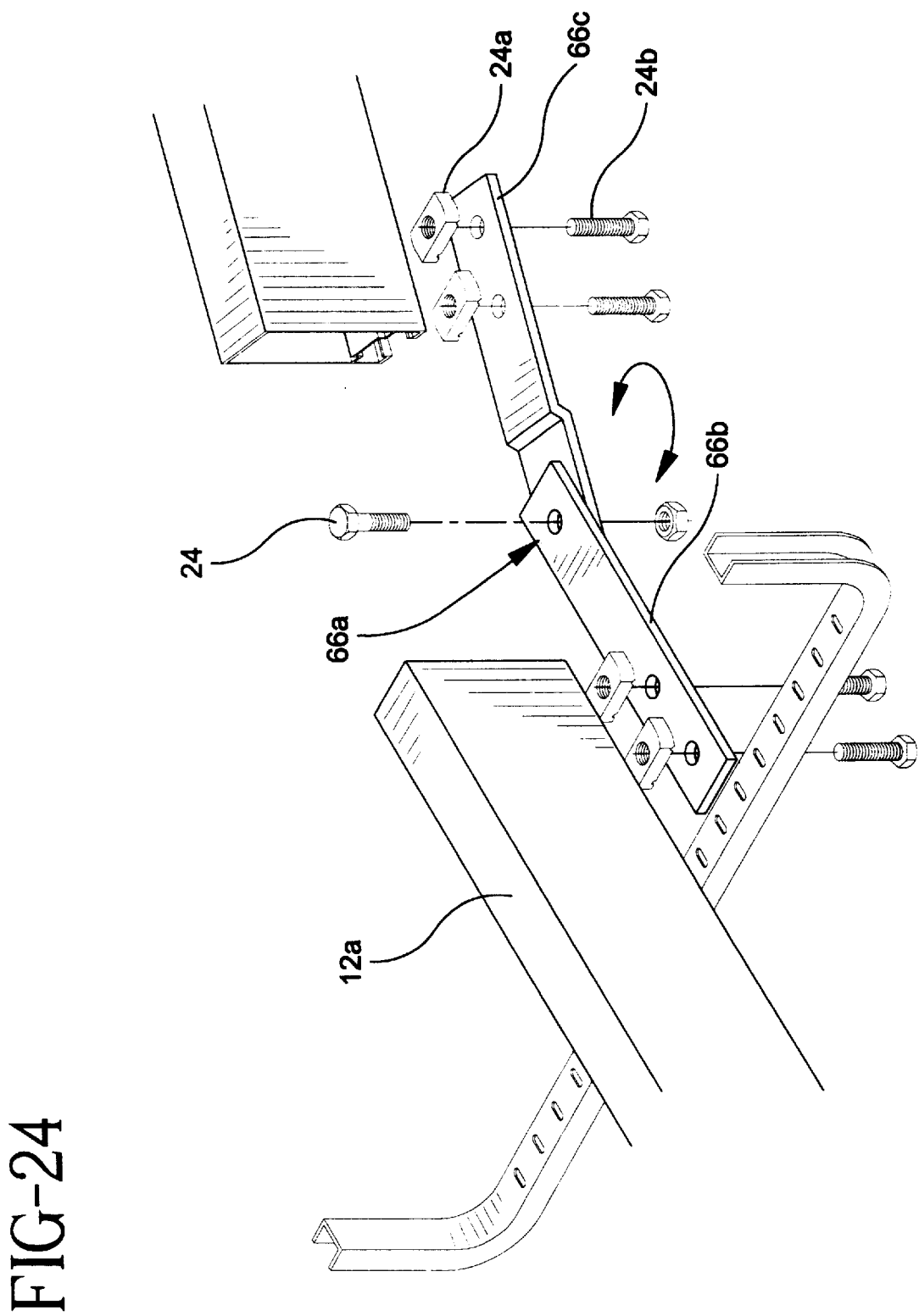
FIG. 24 is an exploded perspective view of an angularly adjustable bracket connector.

In FIG. 20, various cable tray assemblies are shown intersecting at substantially right angles. However, as shown in FIG. 24 appropriate adjustable brackets 66a may be employed so that rail sections may intersect at angles other than 90°. Bracket 66a may include a first and second bracket element 66b and 66c that are joined together about a piece of fastening hardware such as a bolt 24b. Once the desired angle between interconnected rail sections 12a is obtained, the fastening hardware 24 may then be tightened in order to fix the angle. Various other techniques used to arrange rail assemblies with respect to one another may be also employed.

Figure 25A:
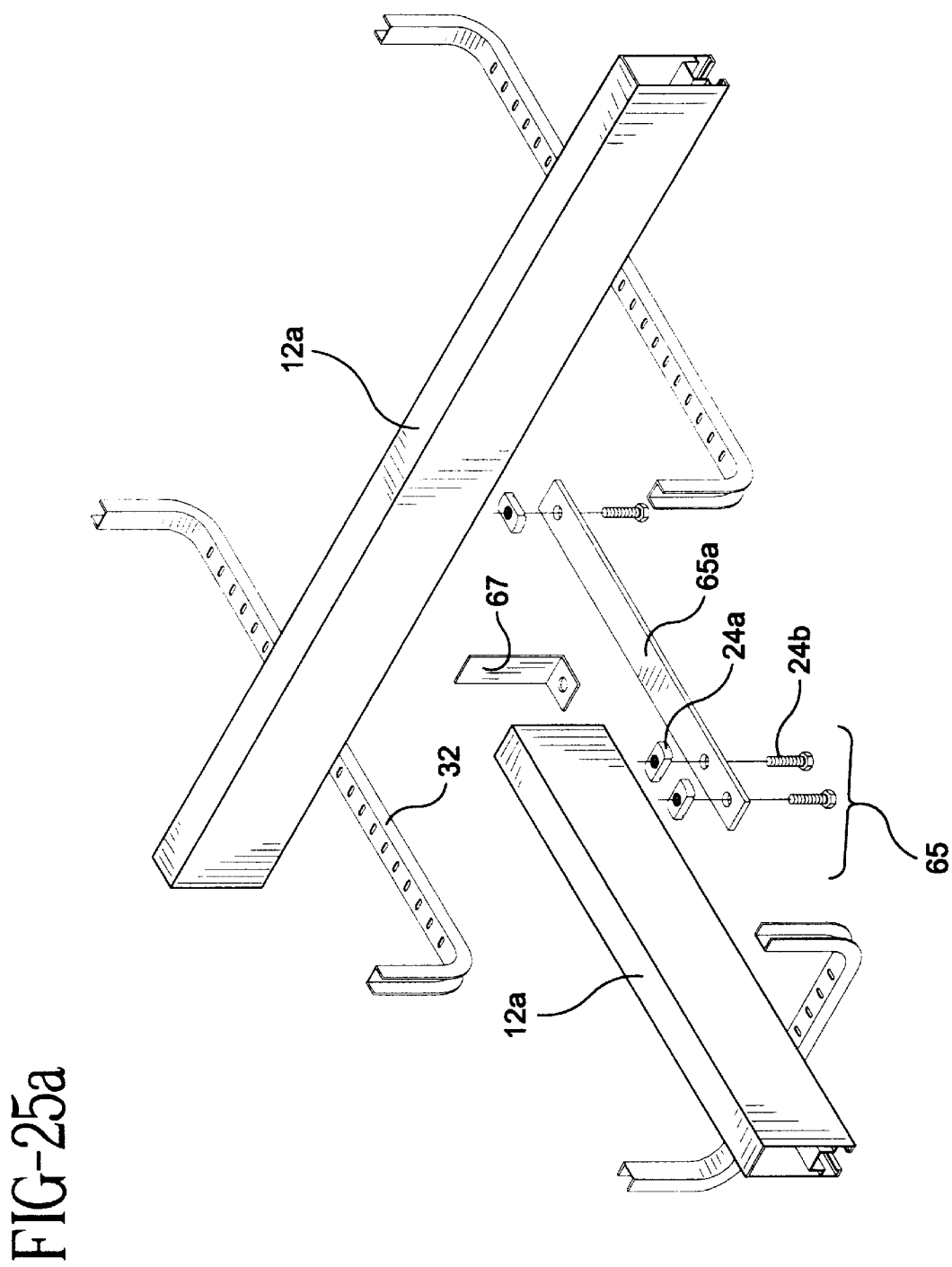
FIG. 25a is an exploded perspective view of a T-coupler.

As shown in FIG. 25a, two rails 12a may be abutted in a T-shaped fashion employing a T-coupler 65. T-coupler 65 includes a straight bracket 65a to secure one rail section 12a to another rail section 12a perpendicular thereto. Also an end cap 67 is provided to cover the end of one of the rail sections 12a. As shown in FIG. 25b, three sections 12a may be interconnected in a cross configuration employing an elongate cross-over bracket 68.

Figure 26:
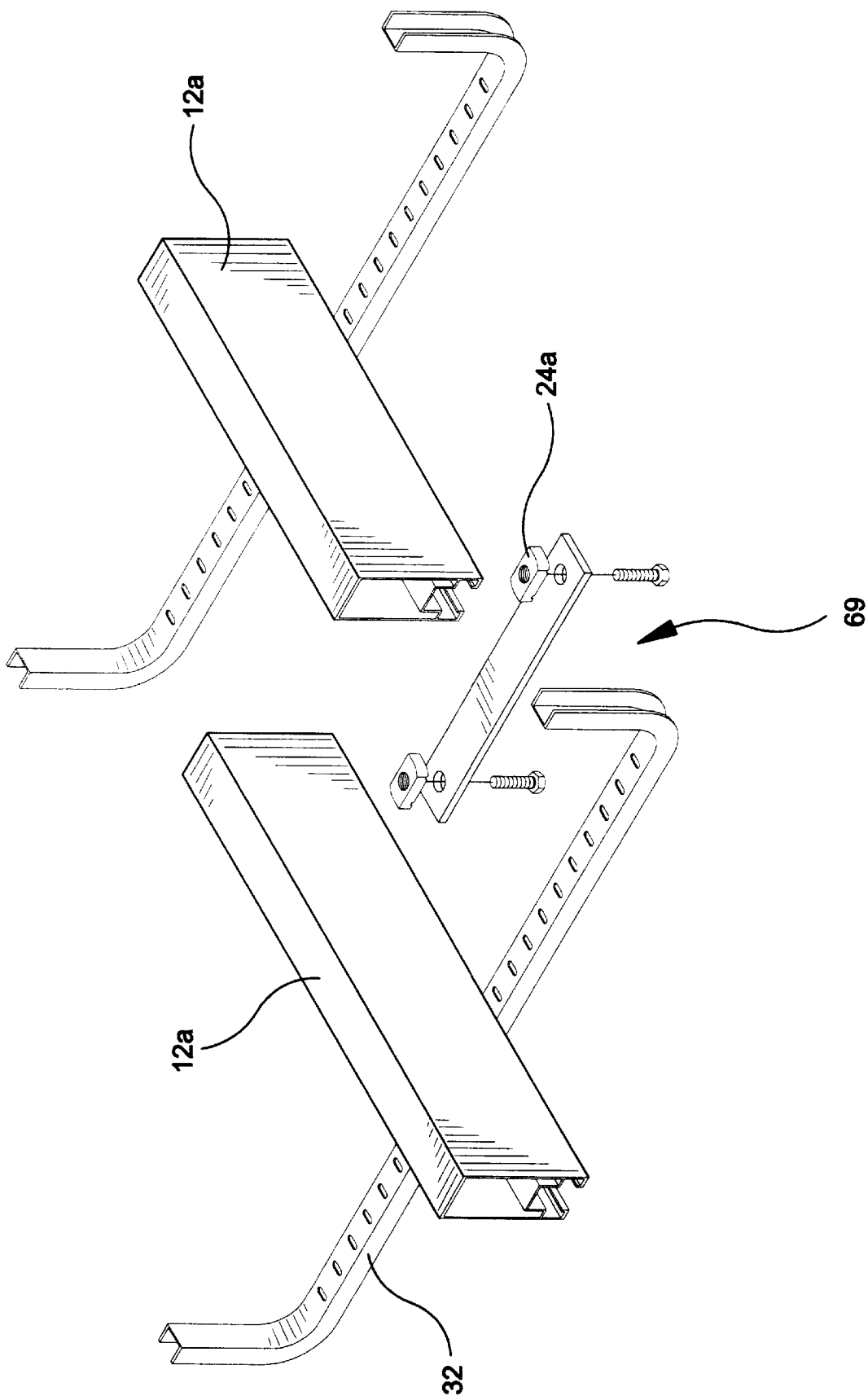
FIG. 26 is an exploded perspective view of an offset bracket.

Referring now to FIG. 26, two rails sections 12a may be interconnected in longitudinally successive fashion but horizontally offset from one another by using an offset bracket 69. One end of offset bracket 69 may include an elongate slot to permit adjustment in the offset distance.

Figure 27:
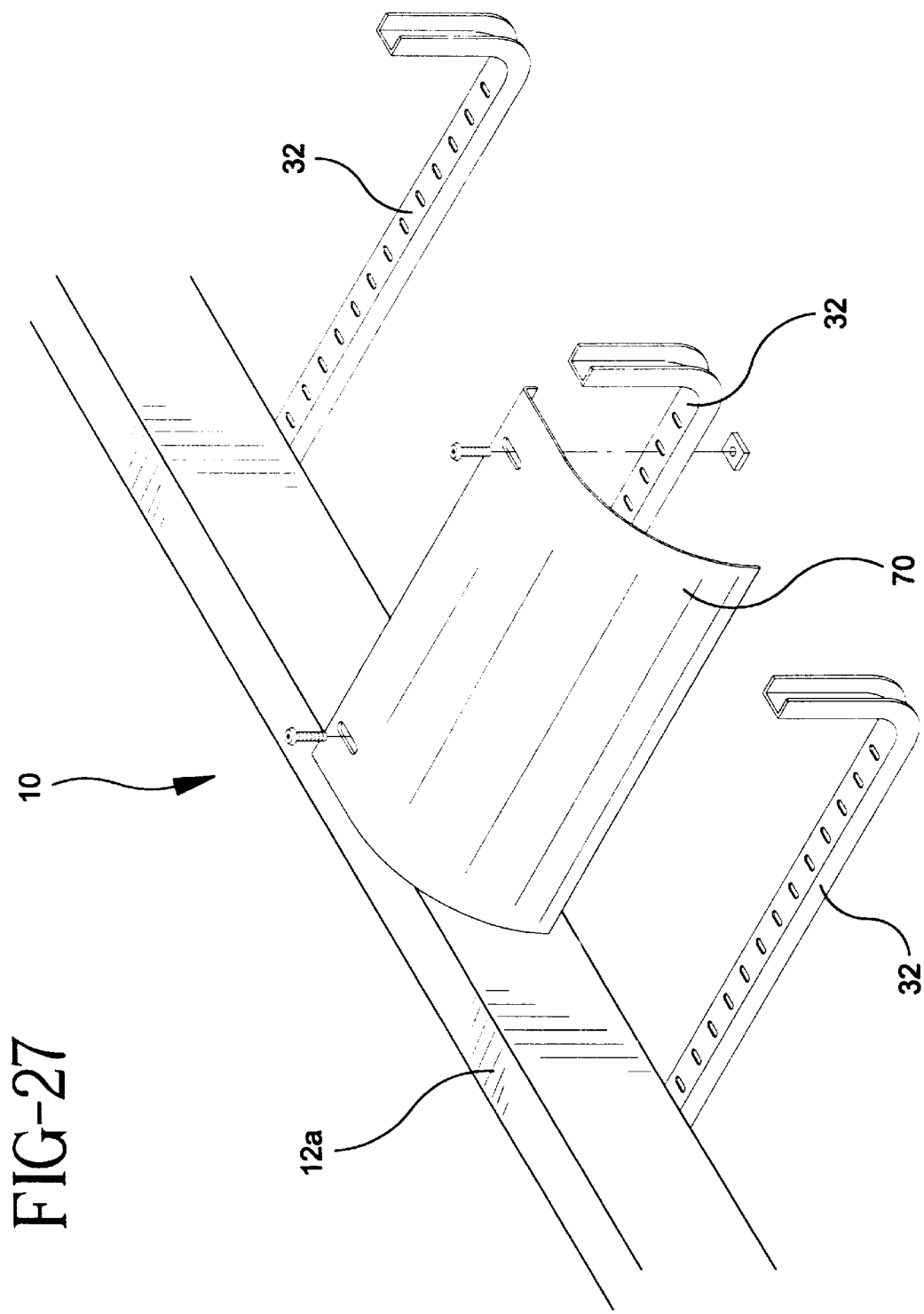
FIG. 27 is an exploded perspective view of a rail section and curved drop shield.

Additional accessory components may be used in combination with rail 12 of the present invention. As shown in FIG. 27, a generally curved drop shield 70 is provided. Drop shield 70 may be attached to rung 32 in a manner shown in FIG. 27 so as to permit cables to be taken out of the bundle and dropped downwardly for use. In certain situations, especially with fiber optic cable, it is necessary to assure that a large radius of curvature is provided when dropping cables from the bundle. Drop shield 70 provides such gradual radius of curvature when dropping cables from the bundle held by rung 32.

Figure 28:
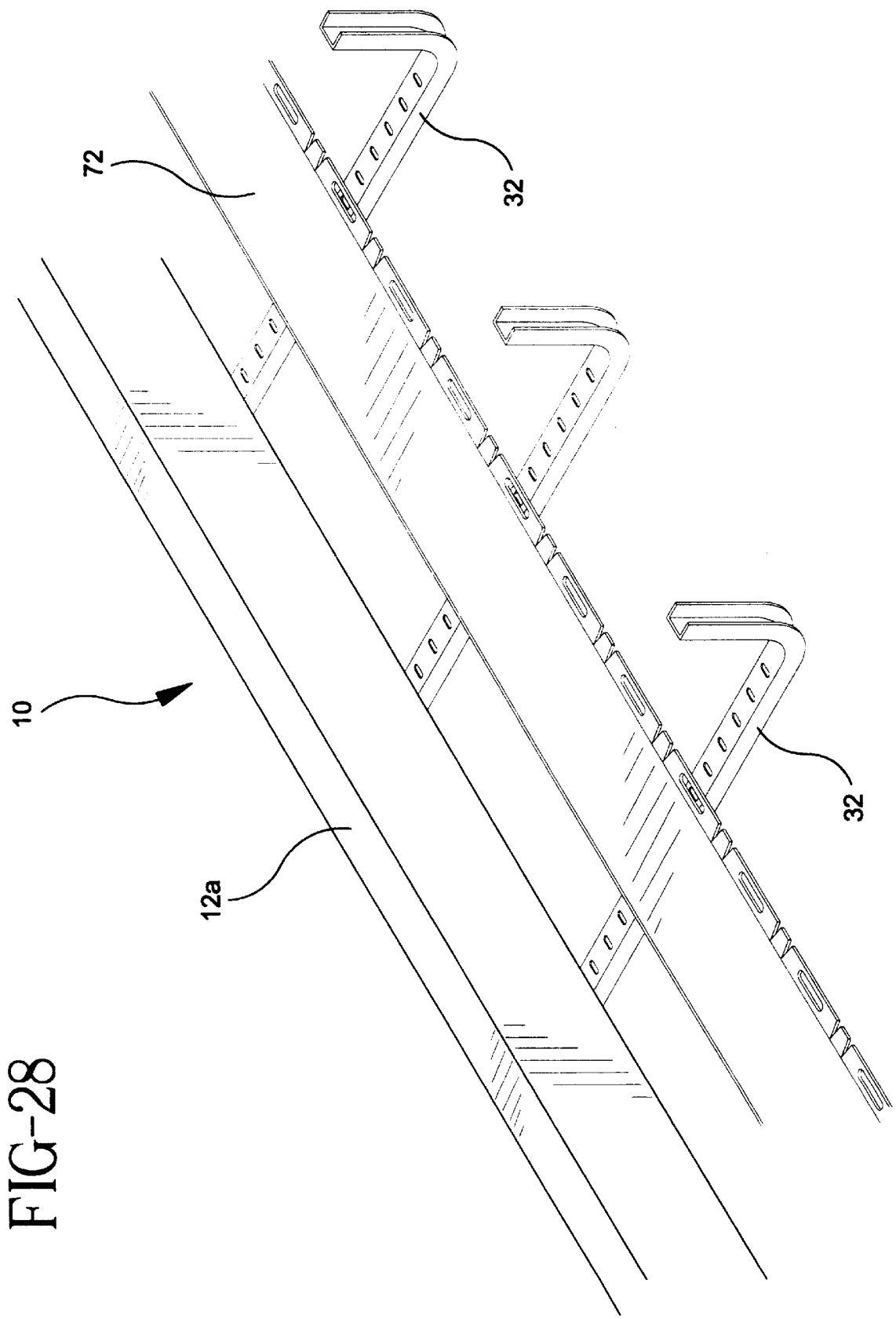
FIG. 28 is a perspective view of a rail section including an upstanding barrier.

A further accessory which may be provided for use with cable tray assembly 10 is a upstanding barrier 72 shown in FIG. 28. Barrier 72 is secured to and across several rungs 32. Barrier 72 may be used to separate cables of one type from cables of another type being carried by cable tray assembly 10. Such separation may be required for separating power cables from other types of transmission cables.

In an alternative embodiment, as shown in FIGS. 29 and 30, rail 12 may be used as an electrical raceway to carry power conductors within. FIG. 29 shows a pair of rail sections 12a interconnected by an outboard coupling assembly 80. The various contemplated embodiments of coupling assembly 80 are more fully shown in FIGS. 30a–30e. In all the embodiments shown, a portion of a coupling bracket 80a is inserted into the open ended channel 16 of rail 12 at an end 12b thereof. Coupling bracket 80a may be secured to rail section by a variety of bracket elements 80b to 80f. These bracket elements are positioned outside channel 16 and provide a throughhole for a bolt to pass therethrough and threadedly engage coupling bracket 80*a*. In an alternative embodiment shown in FIG. 30*c*, nut fasteners 24*a* may be inserted within channel 16 above coupling bracket 80*a*'. Bracket 80*a*' is substantially similar to bracket 80*a* but includes clearance holes instead of threaded holes. Thus, the ends of two rail sections 12*a* may be coupled together in longitudinal fashion leaving the closed channel 14 unobstructed so as to function as a cable raceway. As shown in FIG. 28, electrical cables 81 may be routed through closed channel 14 of rail 12 which thereby functions as the electrical cable raceway.

Figure 31:
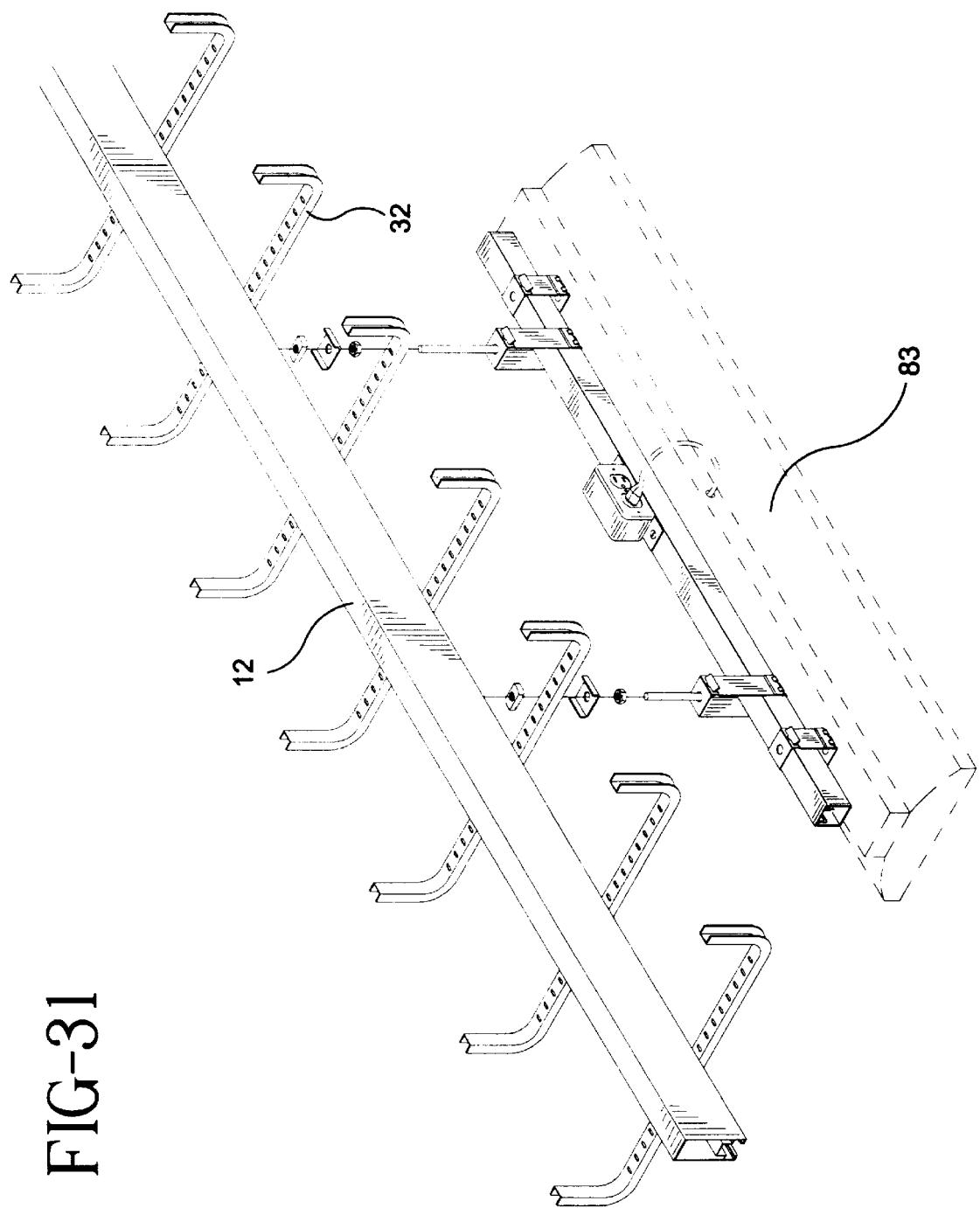
FIG. 31 is an exploded perspective view in an electrical fixture mountable to a rail.

As shown in FIG. 31, an electrical fixture such as a light fixture 83 may be supported from the cable tray assembly and the wires (not shown) housed by the raceway may be electrically connected to fixture 83. Thus, the cable tray assembly not only routes wires but also supports electrical fixtures or other electrical devices.

Figure 32:
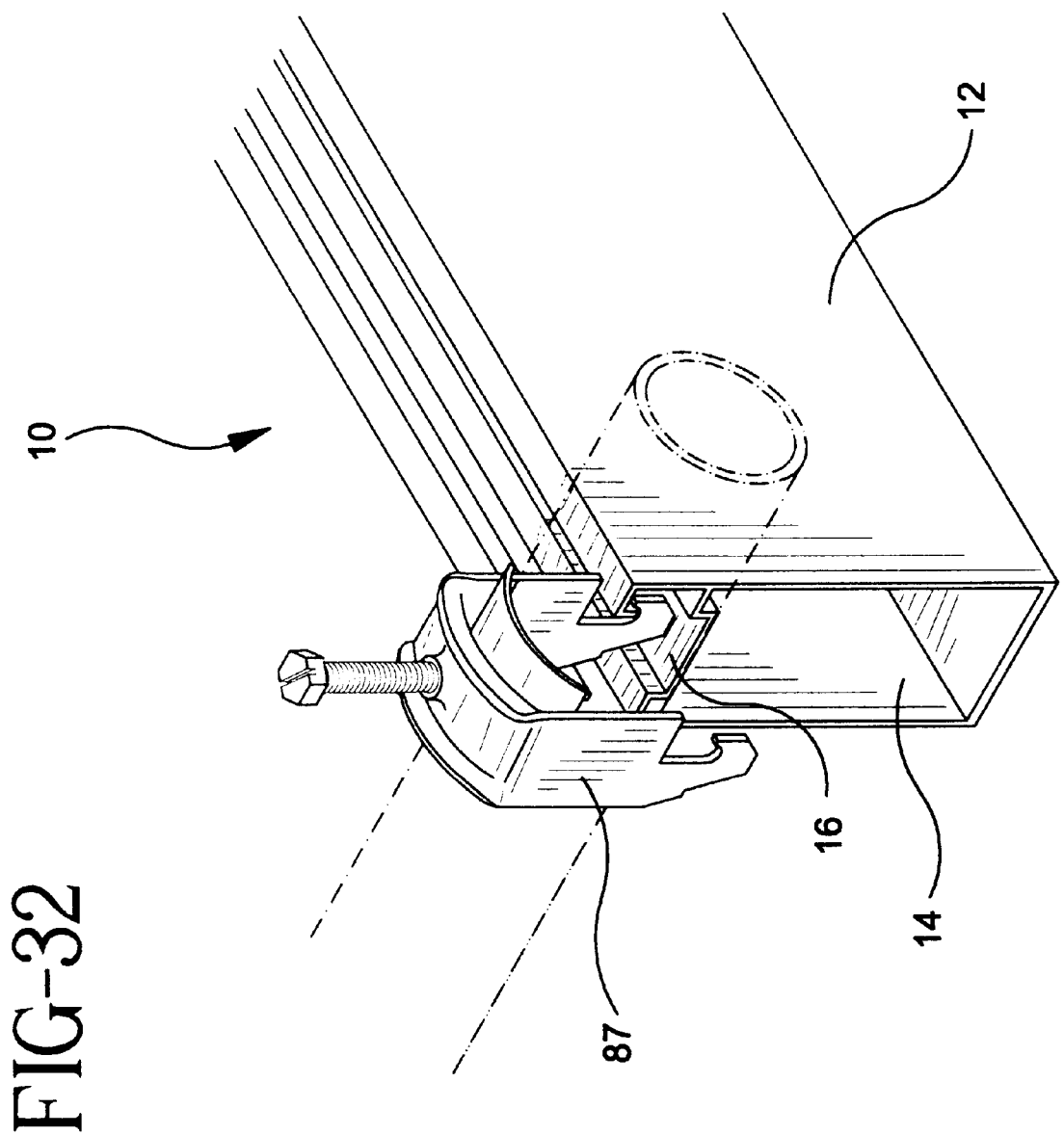

The versatility of the cable tray assembly of the present invention is further shown by other accessories which may be employed therewith. Open ended channel 16 of rail 12 is formed to have a configuration which closely approximates conventional struts manufactured by the assignee herein. Such construction allows the open ended channel to accommodate conventional support hardware for supporting pipes and other structures to rail 12. As shown in FIGS. 32–33, various pipe clamps may be employed in combination with rail 12 to support pipes or other structures to rail 12. Pipe clamps 87 and 89 are secured to the open ended channel 16 of rail 12 in a manner which is substantially similar to the manner in which such clamps are secured to conventional struts. Such struts and accessories may be of the type sold under the trademark SUPERSTRUT by the assignee herein.

Figure 34A:
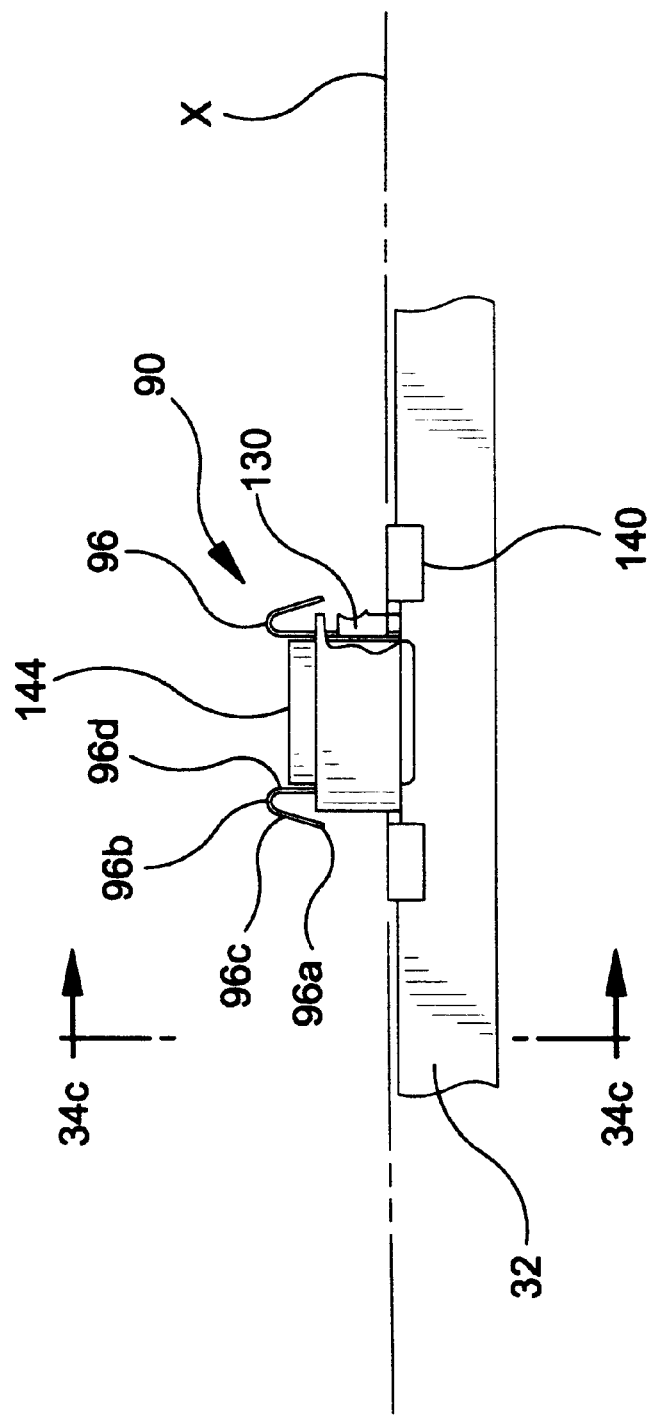
FIG. 34a is an elevational view of a rung and spring clip connector having a portion removed to clearly show a gripping element of the present invention.
Figure 34C:
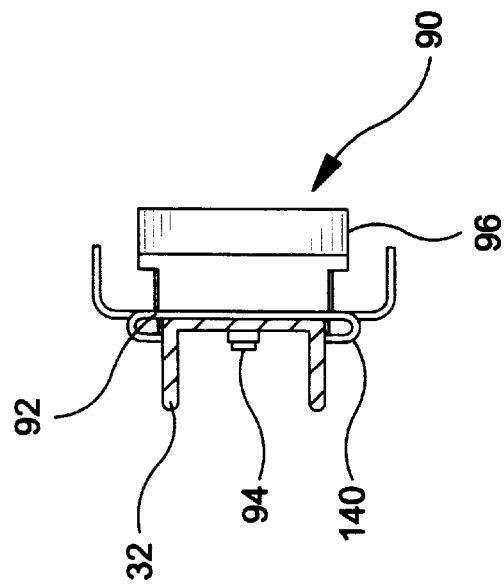
Figure 34B:
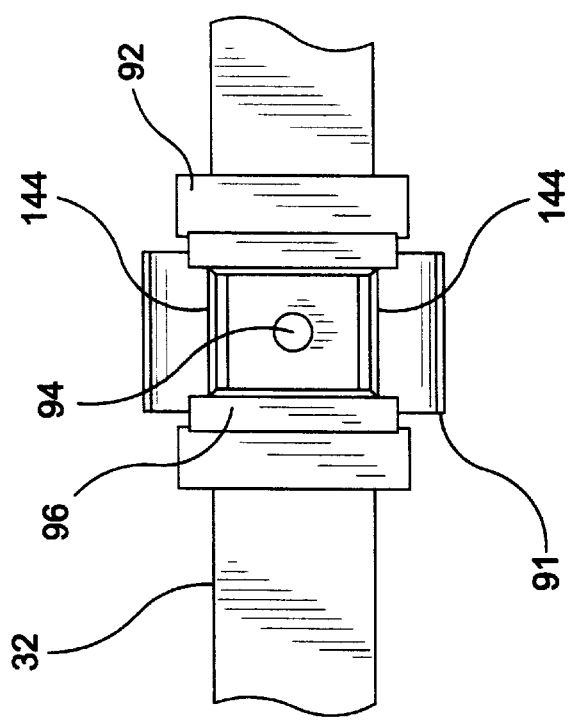

While the above-described rungs may be secured to the rails using attachment clip 38 or other suitable mechanical fasteners, alternative attachment techniques are also provided by the present invention which do not require fastening hardware. As shown in FIG. 34*a*, one particularly preferred embodiment of the present invention utilizes a locking connector for mounting and securing the rungs to the rail. Referring now to FIGS. 34*a*–34*c*, locking connector 90 includes a generally saddle-like body 92 which is sized such that it may be disposed over rung 32. Saddle body 92 includes opposing torque-resisting fingers 140 which engage the sides of the rung to resist relative rotational movement between the connection and the rung. Connector 90 is then secured to the rung by a fastener, e.g., rivet 94.

Extending upwardly from a plane X defined by saddle body 92 are a pair of oppositely directed spring clips 96 (preferably formed of spring steel) which may be inserted into the open ended channel 16 of rail 12. Each of spring clips 96 has a generally inverted V-shaped cross-sectional profile which terminates at edges 96*a*. Connector 90 permits a rung to be snapped into rail 12 and fixedly secured thereto without the need for additional mounting hardware or tools.

Figure 35B:
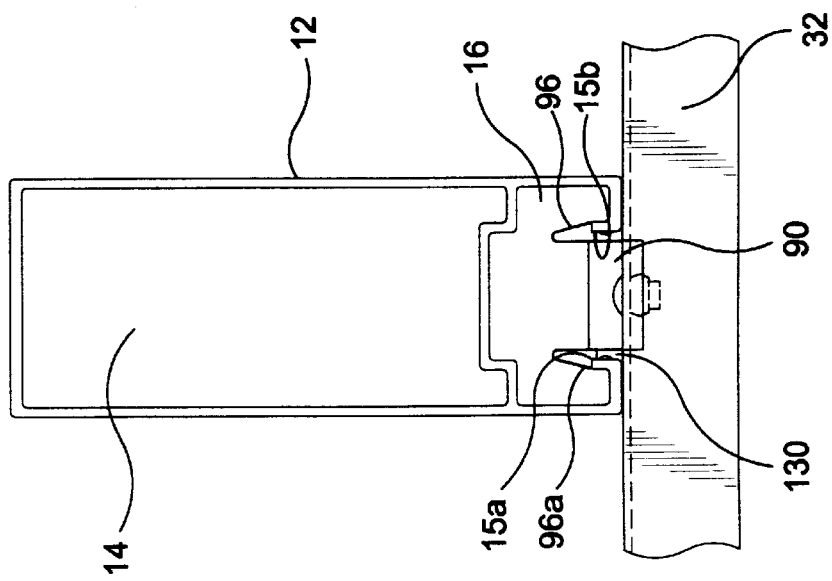
FIG. 35b is an elevational view of the rail and rung with the spring clip engaged in the rail.
Figure 35A:
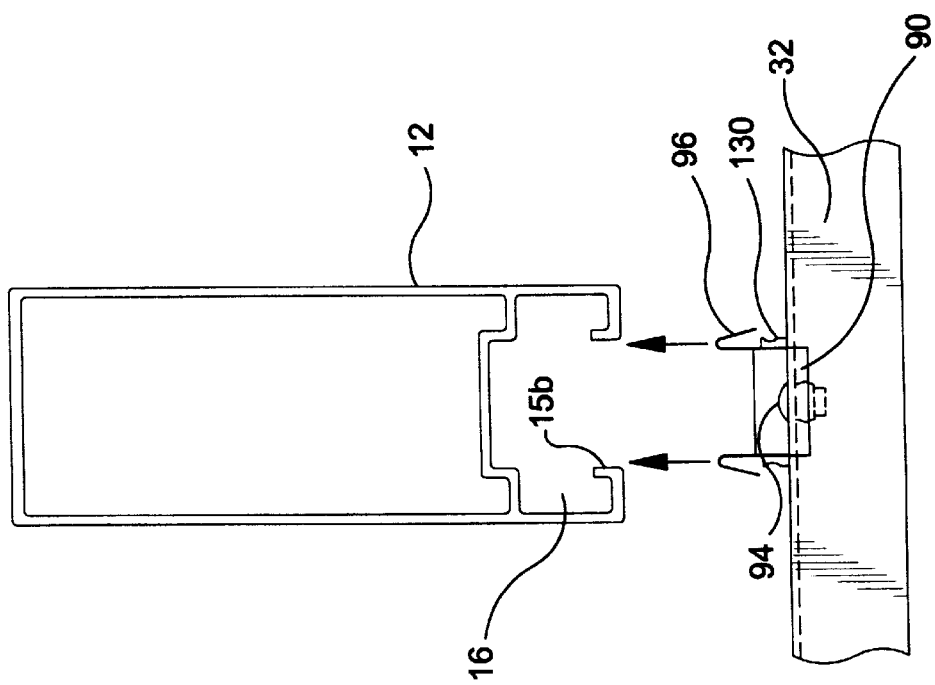
FIG. 35a is a elevational view of the rail section and rung including a spring clip prior to insertion into the rail.
Figure 36:
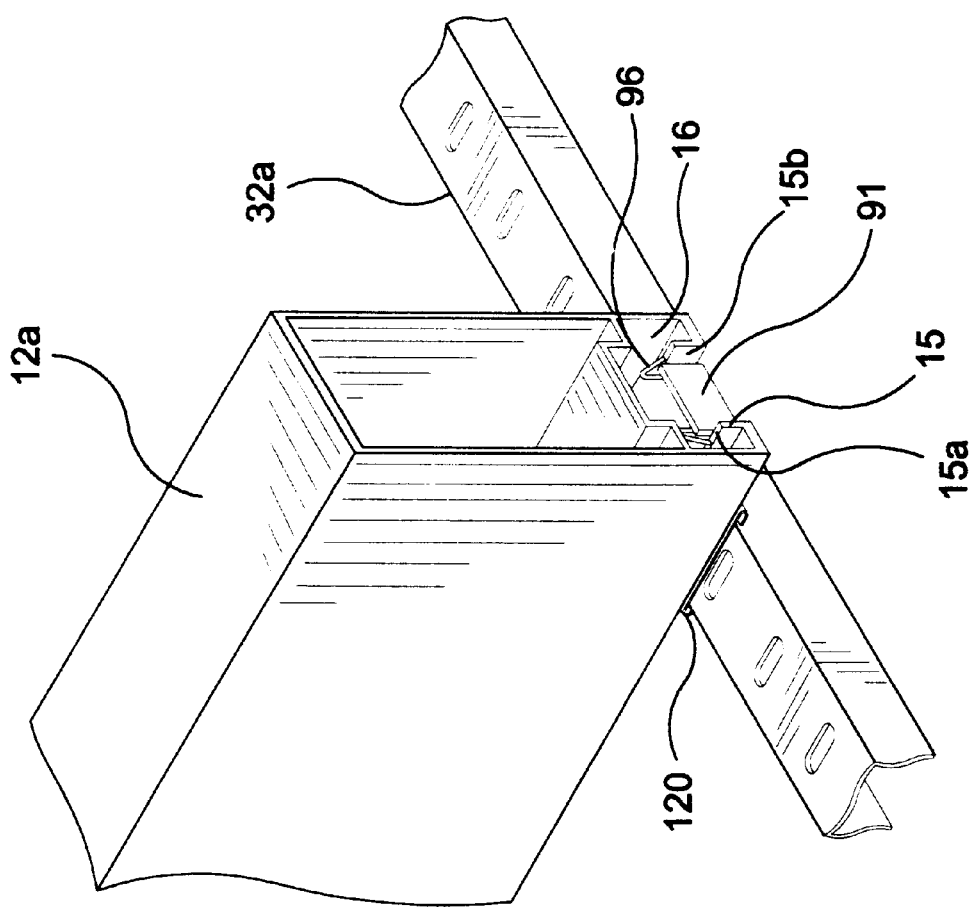
FIG. 36 is a perspective view of a rail having an alternative embodiment of a rung attached thereto.
Figure 38D:
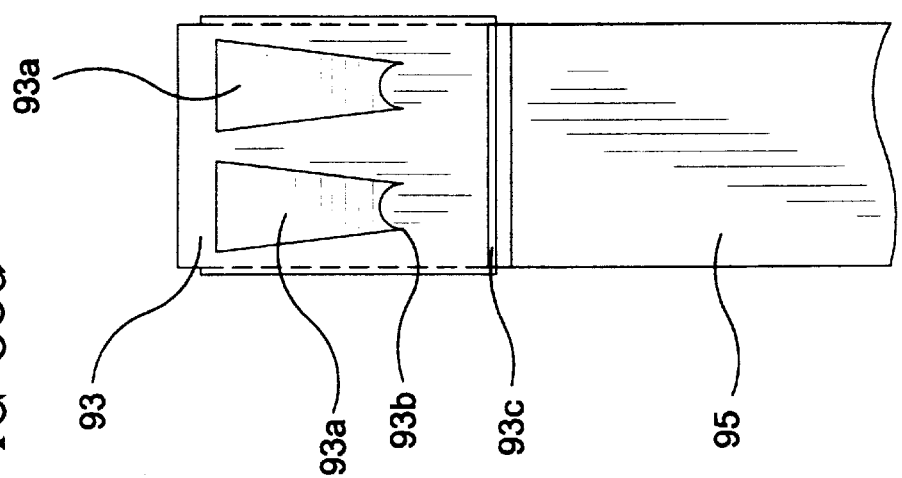
FIG. 38d is a side elevational detail view of the spring clip of FIG. 38b.
Figure 38C:
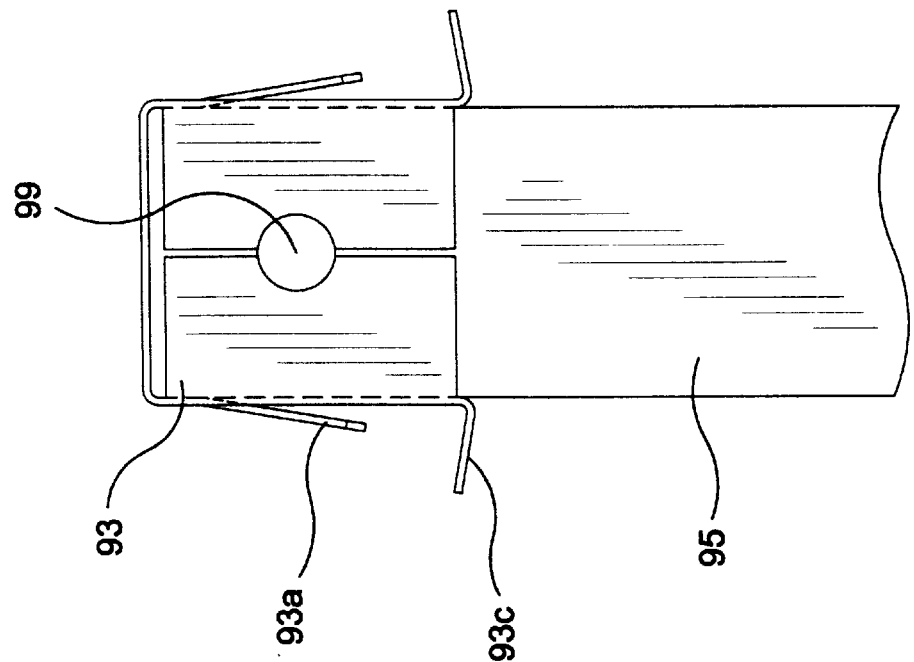

Referring to FIGS. 35*a*, 35*b* and 36, the spring clips 96 will lock into the channel securing the rung 32 thereto at any desired location therealong. As will be appreciated by those skilled in the art, spring clips 96 are sized for insertion into channel 16. In this regard, spring clips 96 are inserted into channel 16 in a direction perpendicular to the plane defined by channel 16. As the spring clips are inserted into channel 16, a living hinge 96*b* allows a flange 96*c* to deflect inward toward a support leg 96*d*. Once the clips are fully inserted into the channel, living hinges 96*b* urge flanges 96*c* outward to their original undeflected orientation. As shown in FIG. 36, edges 96*a* are therefore urged into intimate contact with the top edges 15*a* of side wall 15, thereby preventing withdrawal of the spring clip from the channel. Snap-lock connector 90 may further include a pair of upwardly-extending opposed rigid walls 144 positioned adjacent to support legs 96*d*. Walls 144 prevent legs 96*d* from inward rotational deflection when inserting the rung into channel 16, thus ensuring that deflection during insertion of the connector into the channel is substantially limited to that of flanges 96*c* about living hinges 96*b*. It is to be appreciated that the coupling of connector 90 to channel 16 is accomplished in one operation (i.e., insertion of the connector into the channel) and without the need for fastening hardware or tools. It should be further appreciated that the novel configuration of the present invention allows mounting of the rungs at any location along the length of the channel, not simply at predetermined locations as typically seen in the prior art.

In order to resist forces acting in a direction along the length of the rails, spring clip connector 90 may further include a plurality of gripping elements 130 which are engageable with opposed side walls 15 of the rail. Gripping elements 130 include pointed lugs which frictionally engage a face portion 15*b* of an adjacent side wall 15. In one preferred embodiment, four gripping elements 130 are included on each spring clip connector 90, with one gripping element disposed adjacent each end of each spring clip. A pair of torque-resisting legs 91 which extend upwardly from plane X may also be provided on saddle body 92. Legs 91 are sized to closely fit between side walls 15 and assist the connector 90 in resisting rotational forces imparted thereon.

It will be recognized that spring clip connector 90 may be employed with various rungs, including rungs 32 shown in FIG. 34*a*, rungs 32*a* shown in FIG. 36 and rungs 33 shown in FIG. 37.

Referring to FIGS. 38*a*–42, another preferred embodiment of the present invention utilizes locking connector 93. Connector 93 is particularly adapted for installations wherein the rungs are vertically spaced from the rail. As shown more specifically in FIGS. 38*a*–38*d*, connector 93 is secured to one end of a vertical trunk 95, which is preferably rectangular in cross section. The rungs are then mounted to trunk 95, e.g., half rung members 97*a* and 97*b*. Half rung members 97*a* and 97*b* may be connected to the trunk by rivets 99 or other suitable mechanical fastening means.

Figure 39:
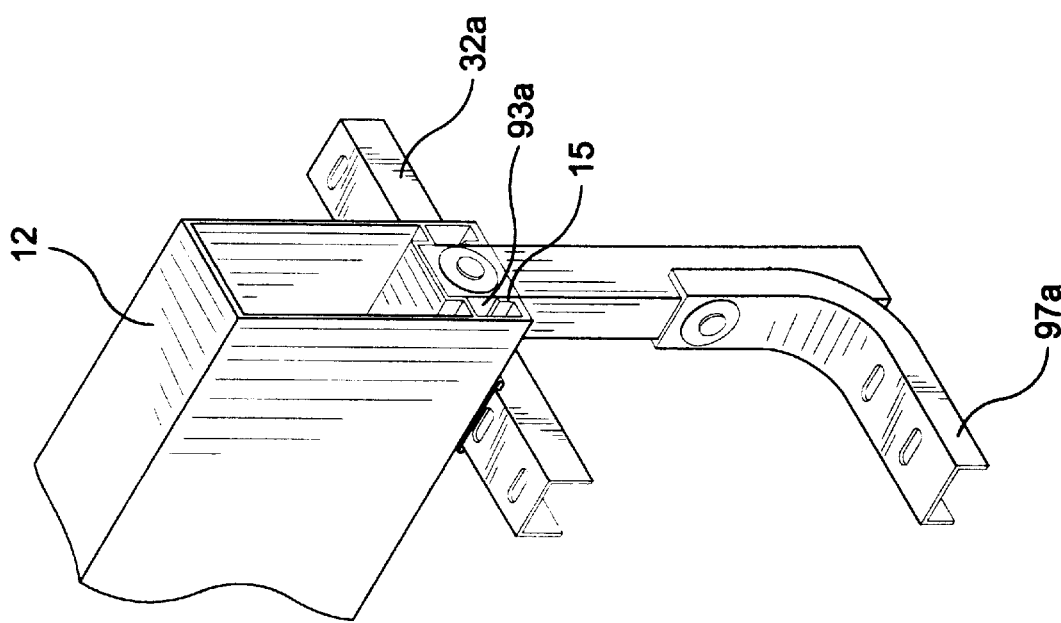
FIG. 39 is a perspective view of a rail having a pair of rungs attached thereto.
Figure 40:
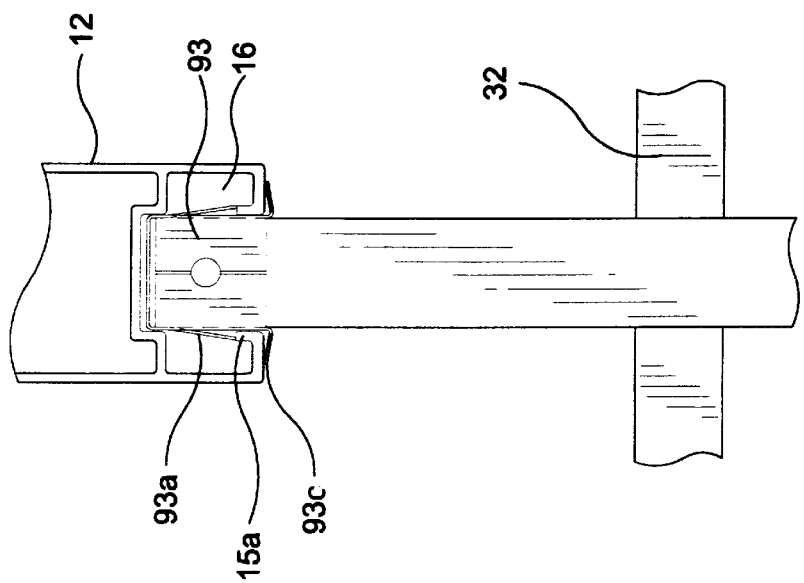
FIG. 40 is an elevational view of the rung of FIG. 38a prior to insertion in the rail.
Figure 41:
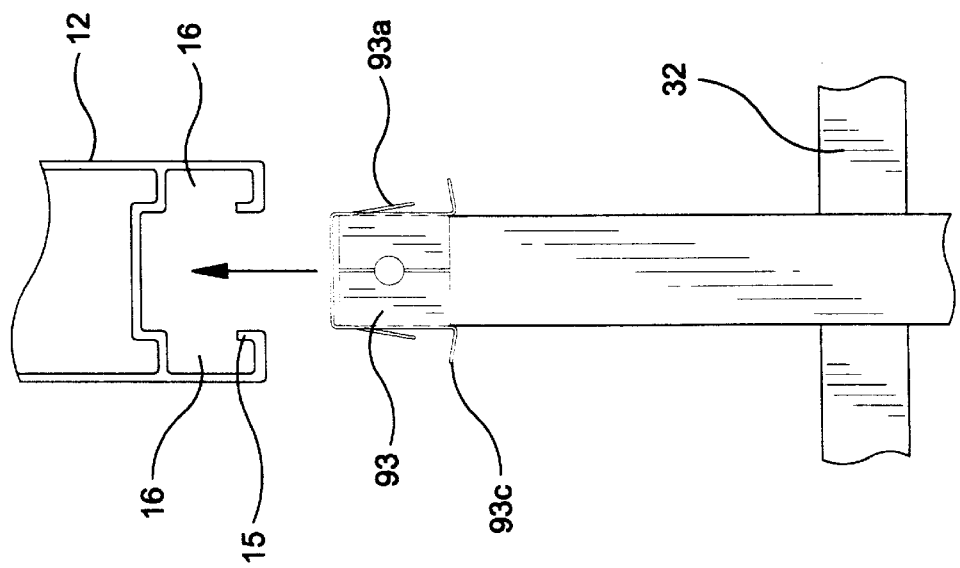
FIG. 41 is a partial elevational view of the rung of FIG. 38a inserted and secured to the rail.

Connector 93 allows the trunk and attached rung to be secured to channel 16 of rail 12. This connection may be achieved without the need for fastening hardware or tools. Connector 93 includes a pair of outwardly directed spring clips 93*a* extending downwardly from two opposed sides thereof. Spring clips 93*a* insertably lock into channel 16 of rail 12, as shown in FIGS. 39, 40 and 41. Each spring clip 93*a* includes a distal end having gripping elements 93*b* formed thereon. Gripping elements 93*b* engage the top edges of side walls 15 when the connector is inserted in open channel 16. To ensure that gripping elements 93*b* engage side walls 15, connector 93 includes a pair of opposing biasing tabs 93*c* extending outwardly and upwardly from the bottom of connector 93. Tabs 93*c* engage rail 12 and are deflected as connector 93 is urged into open channel 16. Tabs 93*c* therefore tend to urge gripping elements 93*b* into top edges 15*a* thus locking the rung in place on rail 12. In one preferred embodiment, spring connector 93 is integrally formed from a single piece of thin steel.

In addition to connectors 90 and 93 described hereinabove, it is contemplated herein that locking connector 90 could be alternatively configured to utilize locking mechanism other than the mentioned spring clips, e.g., a connector utilizing a ¼-turn locking mechanism. In such alternative embodiments, the locking connector allows simultaneous location at any position along the length of the rail and securement thereto with one coupling action and in the absence of fastening hardware or tools.

Figure 42:
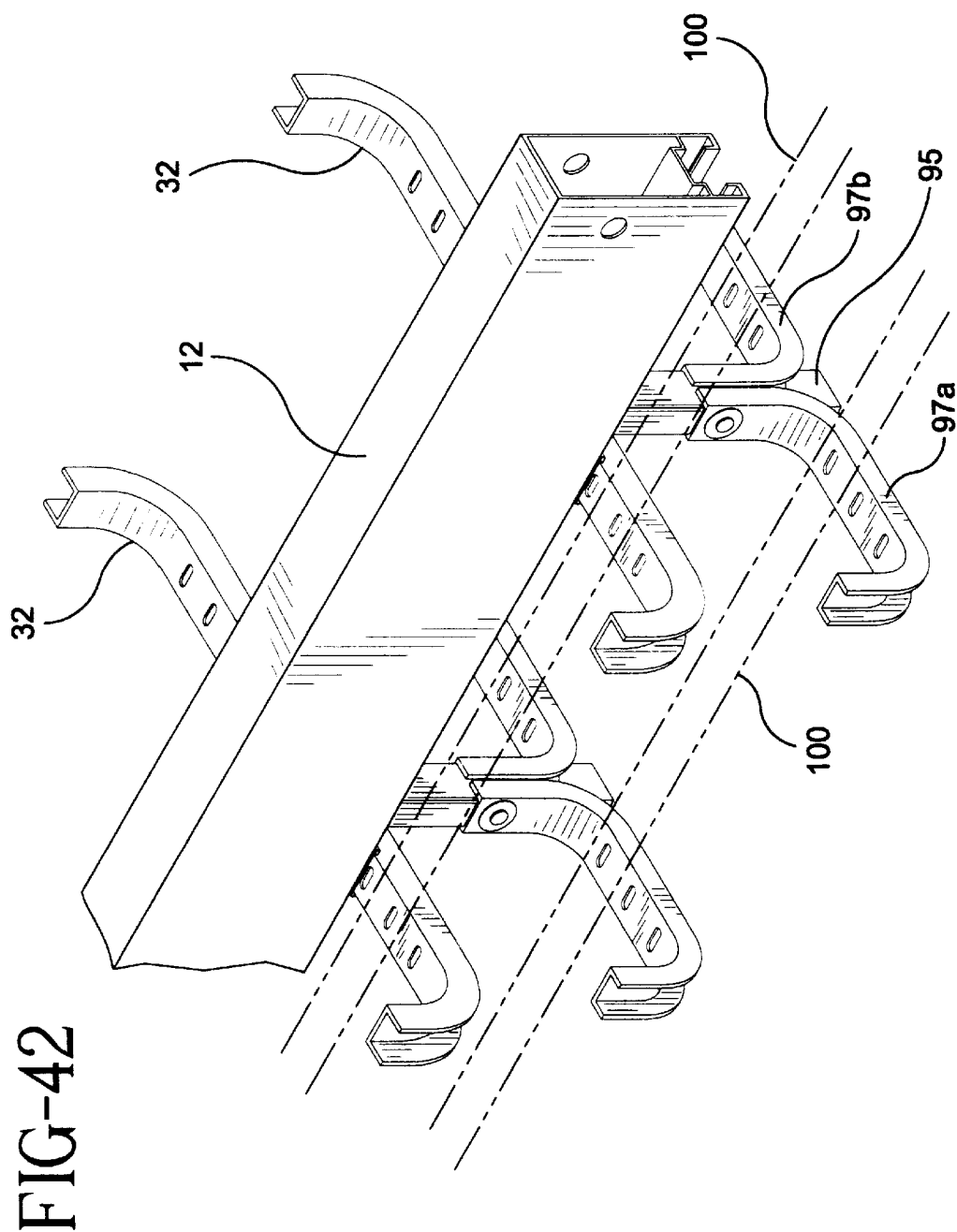
FIG. 42 is a perspective view of a rail having rung secured thereto to support cable at various elevations.

As shown in FIG. 39, a rung section may be employed on only one side of the trunk or may be employed on both sides of the trunk as shown in FIG. 42. Similarly, either straight rungs or rings with upturned edges may also be employed.

It is further contemplated that one set of rail sections 12a may employ rungs which are directly mounted to the rails as well as rungs which are supported at a vertically spaced relationship to the rails by use of trunk 95 as shown in FIG. 42. Trunks could also be produced in varying lengths to allow for support of cable 100 at various elevations. This intermixing of different levels of rungs allows wires and cables to be supported in parallel relationship but at different horizontal positions with respect to rail 12, thereby allowing a greater amount of cables and the like to be supported. Additionally, since each rung supports cable at only one level, an installer can customize the installation choosing just the components necessary to fit the application thereby eliminating the use of unnecessary rungs.

The use of the spring clip connectors shown in FIGS. 34–41 allows the trunk or rung to be attached to the open ended channel of the rail without the need for a. secondary installing operation. Also, the snap-in feature allows easier assembly so that the cable tray components can be shipped disassembled preventing damage thereto. Furthermore, rungs and/or trunks can be easily added to the cable tray assembly.

The present invention also contemplates the use of rails having various configurations. In an alternative embodiment shown in FIGS. 43–45, rail 110 may be similarly formed to rail 12 but may further include an open ended channel 112 on both the top and bottom portions of rail 110 having closed channel 114 disposed therebetween. In order to provide multi-layer support, rungs 32 may be positioned in both open channels 112 resulting in vertical spacing of the rungs 32. In this embodiment, rungs 32 are secured to open channels 112 by either attachment clip 38 or spring clips 93, 96 described hereinabove.

Figure 43:
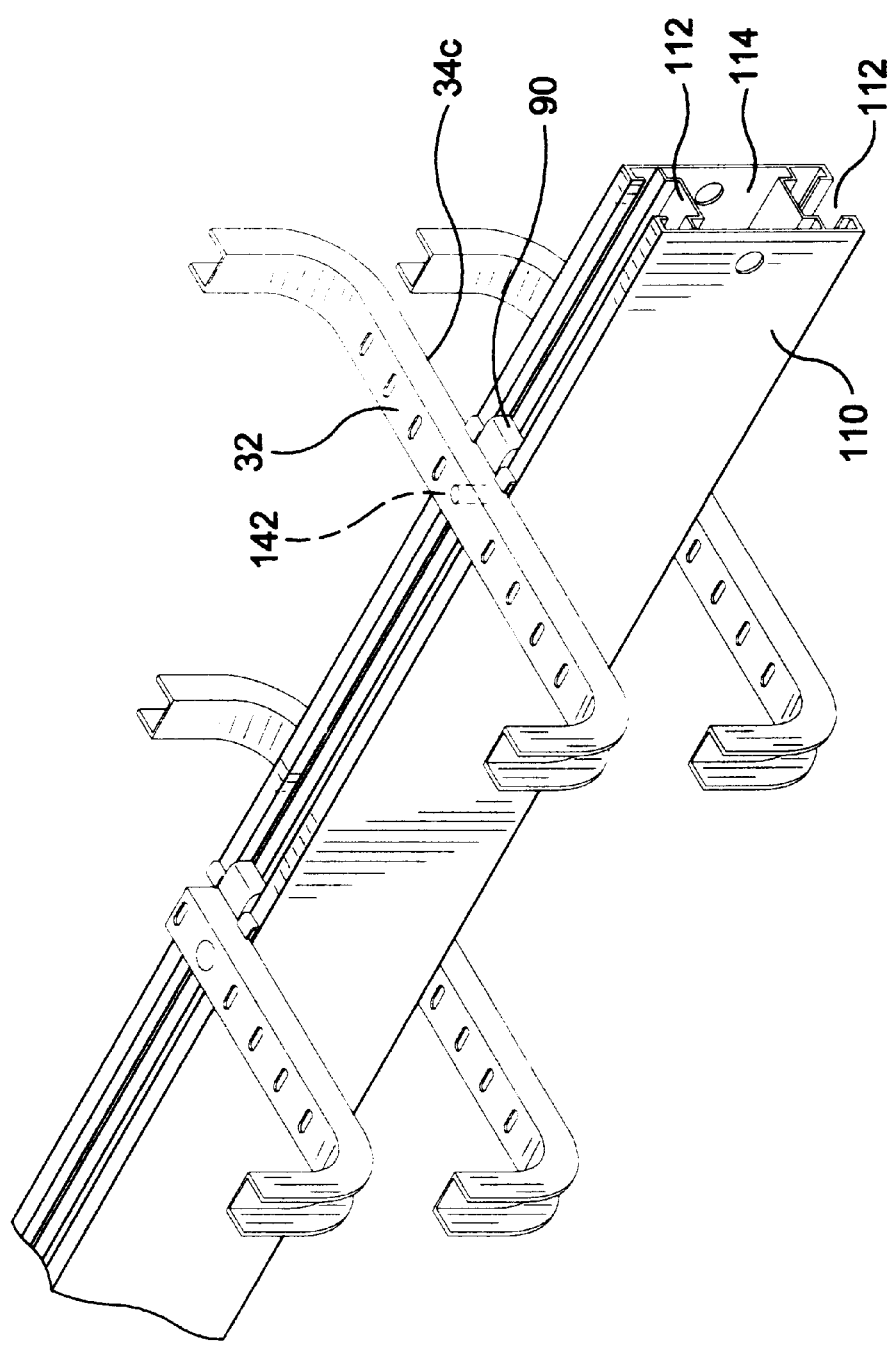
FIG. 43 is a perspective view of an alternative embodiment of the rail having open channels formed on both ends thereof.

It will be appreciated that connector 90 must be secured to a lower face 34c of rung 32 (opposite planar surface 34a) when such rung is to be connected to an upper open channel formed in rail 110 (see FIG. 43). In this embodiment, a collar 142 may be utilized to facilitate the attachment of connector 90 to the rung. It will not noted that torque-resisting fingers 140 still engage the sides of the rung even when the connector is secured to the lower face of the rung.

Figure 44:
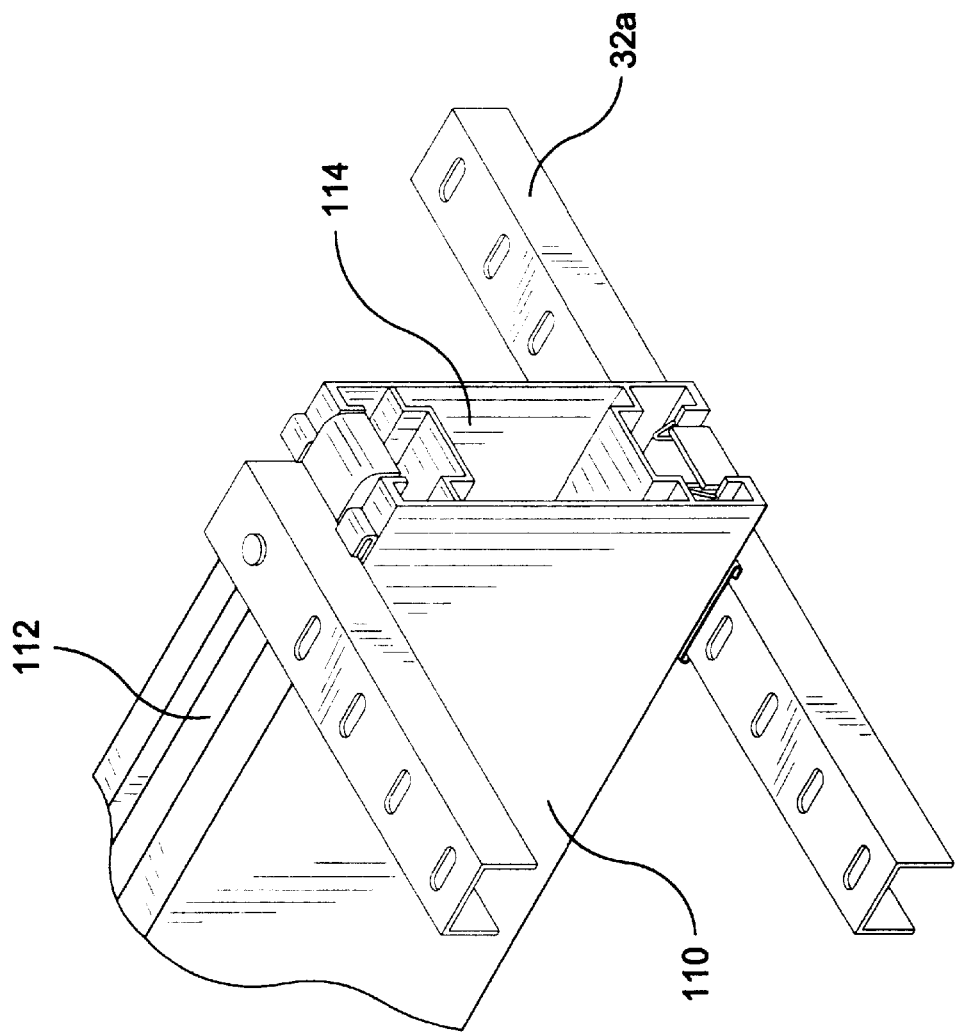
FIG. 44 is an elevational view of the rail of FIG. 43 including alternative embodiment of rungs.
Figure 45:
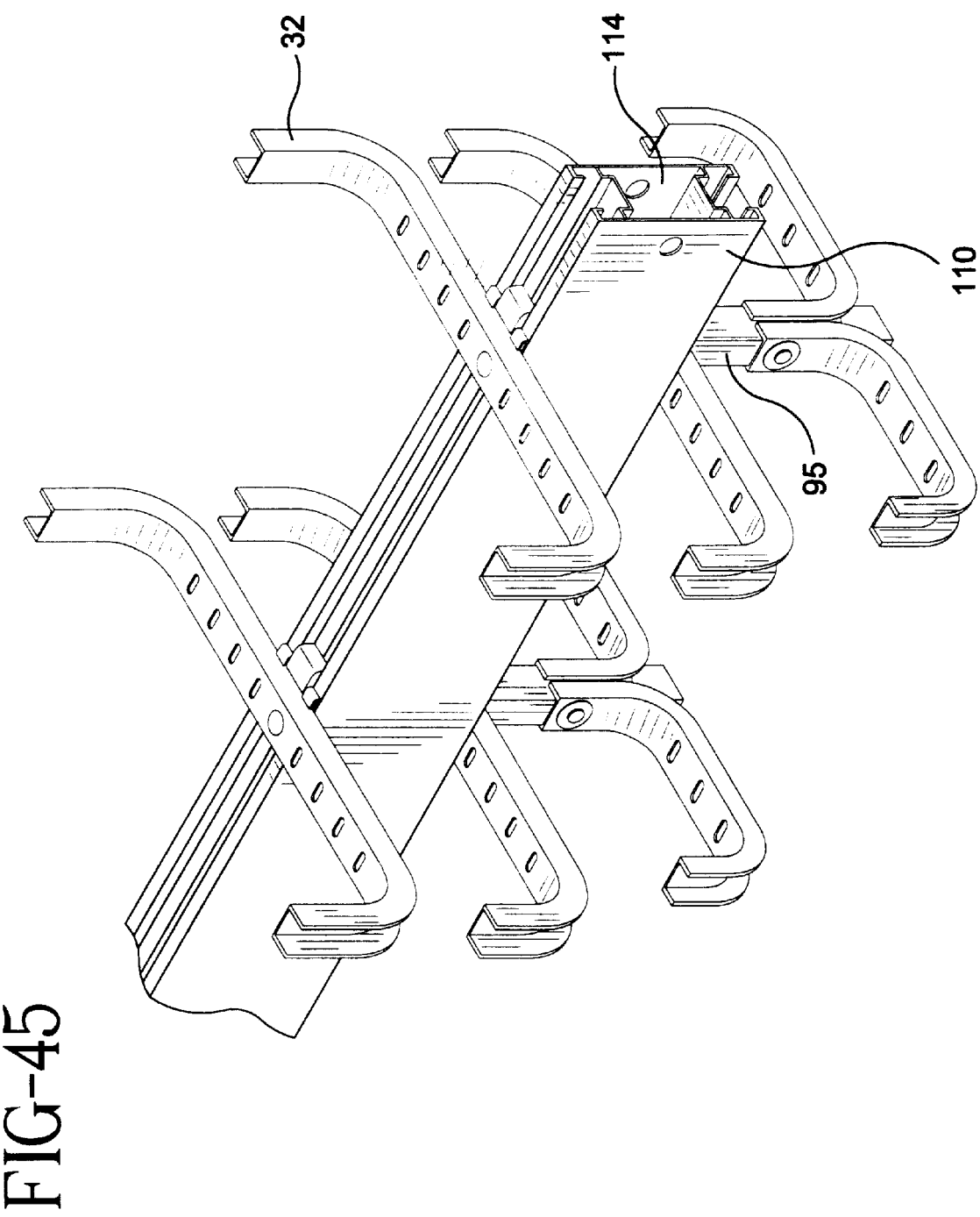
FIG. 45 is a perspective view of the rail of FIG. 43 having rungs secured thereto to support cable at various elevations.

Rungs having various configurations such as curved and straight rungs 32, 32a extending from both sides of rail 110, and curved and straight rungs 33, 33a extending from only one side of rail 110 may be fixed to rail 110 as shown in FIGS. 43–45. In addition, a third vertical level of support may be provided by employing a vertical trunk 95 having a rung 32 attached as shown in FIG. 45.

Figure 46:
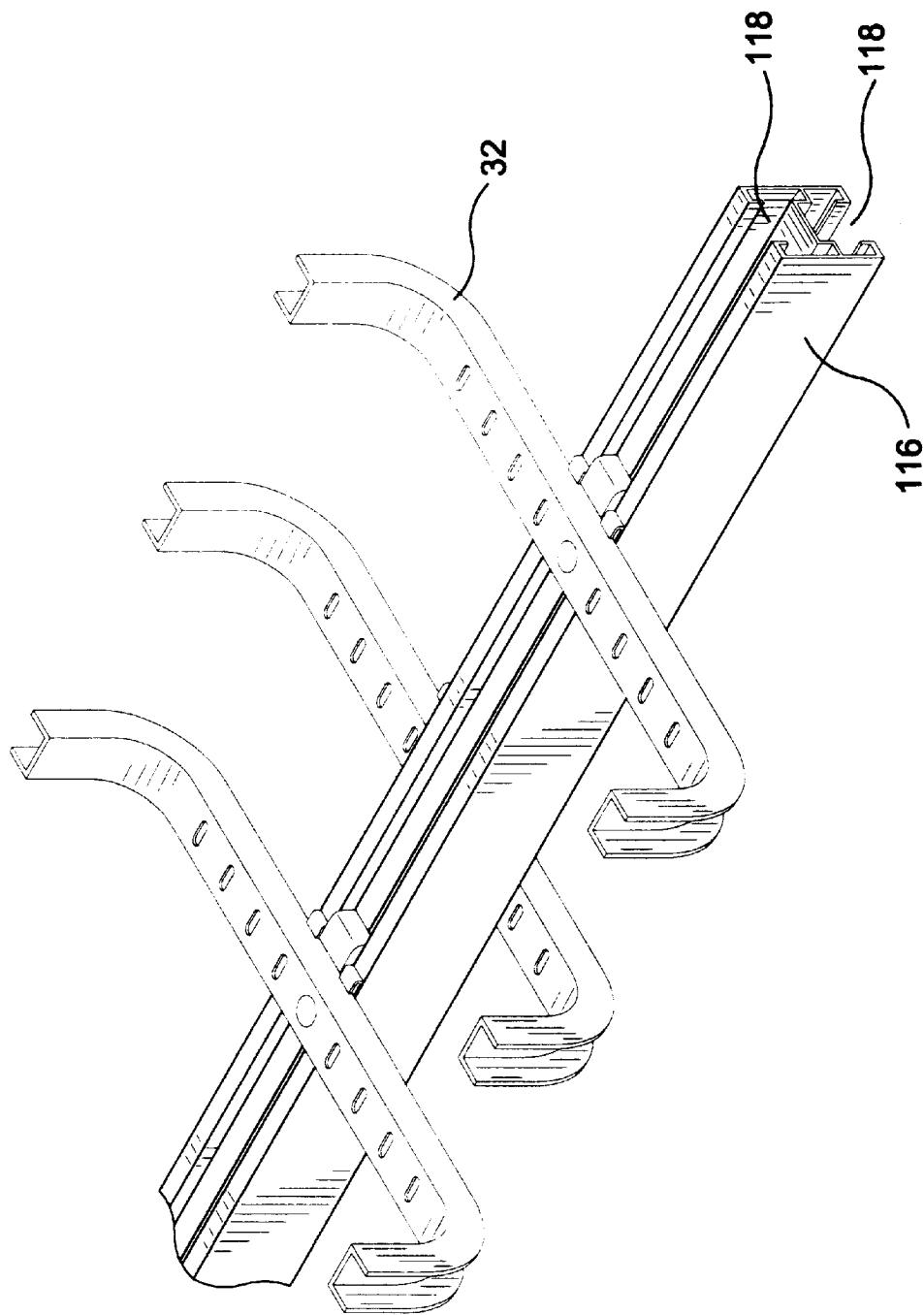
FIG. 46 is a perspective view of a further alternative embodiment of the rail.

A further alternative embodiment shown in FIG. 46, includes a channel 116 having two open channels 118 located back-to-back, thereby providing a mounting surface on the top and bottom of rail 116. In this embodiment the centrally disposed closed channel 14 is eliminated. As with the rails described above, all types of rungs may be secured along the length of rail 116.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendment and/or deviations be included within the scope of the followings claims.

What is claimed is:

1. A cable tray assembly for supporting cables and wires, comprising:

an elongate rail including an open channel extending along the length thereof, said rail including a pair of opposed sidewalls defining said channel;

at least one support member including at least one elongate arm extending away from said rail, and said arm including at least one elongate extent for supporting the cables and wires; and a locking connector cooperating with said support member, said connector being sized and configured for insertion into said open channel said connector engaging each of said sidewalls upon insertion of said connector into said channel, whereby insertion of said connector into said open channel simultaneously locates said support member at a position along said rail and fixedly secures said support member to said rail at said position in the absence of fastening hardware.

2. The assembly according to claim 1, wherein said channel defines a plane, and wherein said connector is configured for insertion into said channel in a direction perpendicular to said plane.

3. The assembly according to claim 1, wherein said connector includes at least one deflectable spring clip which engages at least one of said side walls upon insertion of said connector into said channel.

4. The assembly according to claim 3, wherein each of said side walls of said channel defines a top edge, and wherein said spring clip is formed with a generally inverted V-shaped profile and includes an engagement edge, and wherein said spring clip is sized to allow engagement between said engagement edge of said spring clip and at least one of said top edges when said connector is inserted into said channel.

5. The assembly according to claim 3, wherein said connector further includes at least one gripping element for resisting forces acting in a direction along the length of said rail.

6. The assembly according to claim 1, wherein each of said side walls defining a top edge; and wherein said connector includes a saddle body and a pair of deflectable spring clips, said saddle body defining a plane, said spring clips extending perpendicularly from said plane whereby insertion of said connector into said channel causes engagement between said spring clips and said side walls.

7. The assembly according to claim 6, wherein each of said spring clips includes a support leg extending perpendicularly from said plane, and wherein each of said support legs includes a pair of gripping element extending perpendicularly therefrom and being sized to engage said side walls when said connector is inserted into said channel.

8. The assembly according to claim 6, wherein each of said spring clips includes a support leg extending perpendicularly from said plane, a living hinge and a deflectable flange defining an engagement edge; and wherein said flanges are deflectable about said living hinges between a first deflected position which allows insertion of said connector into said channel and a second undefected position wherein said engagement edges engage said top edges of said side walls upon insertion of said connector into said channel; and wherein each of said support legs includes gripping elements extending perpendicularly therefrom for engagement with said side walls for resisting forces acting in a direction along the length of said rail.

9. The assembly according to claim 6, wherein each of said spring clips includes a support leg extending perpendicularly from said plane, and wherein said connector further includes at least one torque-resisting leg, said torque-resisting leg extending perpendicularly from said saddle body, said torque-resisting leg being oriented 90° from said support leg such that said torque-resisting leg is positioned perpendicular to said side walls when said connector is inserted into said channel.

10. The assembly according to claim 6, wherein said saddle body includes torque-resisting fingers for resisting relative rotational movement between said connector and said at least one support member.

11. The assembly according to claim 1, wherein each of said side walls defining a top edge; and further comprising a trunk for spacing said at least one support member a distance from said rail; and wherein said connector comprises a generally closed body having bottom and side walls thereby defining a trunk-receiving cavity for receipt of said trunk, said connector including opposing cantilevered spring clips sized to engage said side walls of said channel when said connector is inserted into said channel.

12. The assembly according to claim 11, wherein each of said spring clips includes a distal end, said spring clips being sized and configured to engage said top edges of said side walls of said channel.

13. The assembly according to claim 12, wherein each of said spring clips includes at least one gripping element located at said distal end thereof.

14. The assembly according to claim 12, wherein said connector further includes a pair of biasing tabs extending from opposing side walls of said body for engagement with said rail upon insertion of said connector into said channel whereupon said tabs urge said spring clips into engagement with said top edges of said channel side walls.

15. The assembly according to claim 1, wherein said rail is formed of a plurality of rail sections, each of said rail sections being joinable in longitudinal succession.

16. The assembly according to claim 1, wherein said rail includes a further open channel oppositely disposed from said other open channel, each of said open channels being configured to cooperate with said locking connector.

17. The assembly according to claim 1, further including a plurality of support members having locking connectors cooperating with said open channel, at least one of said plurality of support member being disposed adjacent to said rail and at least one other of said plurality of support members being spaced a distance from said rail thereby permitting said assembly to support cable at least two different elevations.

18. The assembly according to claim 1, wherein said support member includes a pair of elongate arms extending outwardly from said support member in opposite directions.

19. The assembly according to claim 1, further including a further support member fixedly securable to said rail, said further support member cooperating with a further locking connector being sized and configured for insertion into said open channel at a point spaced from said other support member whereby insertion of said further connector into said channel simultaneously locates said further support member on said rail and fixedly secures said further support member to said rail in the absence of fastening hardware.

20. A cable tray assembly for supporting cables and wires, comprising:

an elongate rail including an open channel extending along the length thereof, said channel including a pair of opposing side walls, each of said side walls defining a top edge;

at least one support member having a trunk for spacing said support member a distance from said rail; and a locking connector cooperating with said support member, said connector including a generally closed body having bottom and side walls thereby defining a trunk-receiving cavity for receipt of said trunk, said connector including, opposing cantilevered spring clips sized to engage said channel side walls when said connector is inserted into said open channel whereby insertion of said connector into said channel simultaneously locates said support member at a position along said rail and fixedly secures said support member to said rail in the absence of fastening hardware.

21. A cable tray assembly for supporting cables and wires, comprising:

an elongate rail including an open channel extending along the length thereof, said channel includes a pair of opposing side walls, each of said side walls defining a top edge:

at least one support member; and locking connector cooperating with said support member, said connector includes a body and a pair of deflectable spring clips, said body defining a plane, said spring clips extending perpendicularly from said plane, each of said spring clips including a support leg extending perpendicularly from said plane, a living hinge and a deflectable flange defining an engagement edge, said flanges being deflectable about said living hinges between a first deflected position allowing insertion of said connector into said channel and a second undetected position wherein said engagement edges engage said side walls upon insertion of said connector into said channel, and each of said support legs including gripping elements extending perpendicularly therefrom for engagement with said side walls for resisting forces acting in a direction along the length of said rail, whereby insertion of said connector into said channel causes engagement between said spring clips and said side walls and simultaneously locates said support member at a position along said rail and fixedly secures said support member to said rail at said position in the absence of fastening hardware.

22. A cable tray assembly for supporting cables and wires, comprising: an elongate rail including a first channel and a second channel each including an opening longitudinally extending along the length of said rail, and said first channel opening being spaced from said second channel opening;

a first support member including at least one elongate arm extending away from said rail and said arm including at least one elongate extent for supporting the cables and wires; and a locking connector cooperating with said support member, said connector being sized and configured for insertion into one of said first and second channel openings whereby insertion of said connector into said channel simultaneously locates said support member at a position along said rail and fixedly secures said support member to said rail at said position in the absence of fastening hardware.

23. The assembly according to claim 22, wherein said rail includes a third channel longitudinally extending channel disposed between and spacing said first open channel from said second open channel.

24. The assembly according to claim 23, wherein said first channel opening faces in a different direction from said second channel opening.

25. The assembly according to claim 22, wherein a back wall of said first channel abuts a back wall of said second channel such that said first channel opening faces a direction opposite to that of said second channel opening.

26. A cable tray assembly for supporting cables and wires, comprising:

an elongate rail including an open channel extending along the length thereof;

at least one support member including at least one elongate arm extending away from said rail, and said arm including at least one elongate extent for supporting the cables and wires; and a locking connector cooperating, with said support member, said connector being sized and configured for insertion into said open channel and including a resilient member which engages said rail upon insertion of said connector in said open channel whereby insertion of said connector into said open channel simultaneously locates said support member at a position along said rail and fixedly secures said arm to said support member at said position in the absence of fastening hardware.

27. A cable tray assembly for supporting cables and wires, comprising:

an elongate rail including an open channel extending along the length thereof, said channel includes a pair of opposing side walls, each of said side walls defining a top edge;

at least one support member; and a locking connector cooperating with said support member, said connector includes a body and a pair of deflectable spring clips, said body defining a plane, said spring clips extending perpendicularly from said plane whereby insertion of said connector into said channel causes engagement between said spring clips and said side walls and simultaneously locates said support member at a position along said rail and fixedly secures said support member to said rail at said position in the absence of fastening hardware, and each of said spring clips including a support leg extending perpendicularly from said plane, and said connector further including at least one torque-resisting leg, said torque-resisting leg extending perpendicularly from said body, said torque-resisting leg being oriented 90° from said support leg such that said torque-resisting leg is positioned perpendicular to said side walls when said connector is inserted into said channel.

28. A cable tray assembly for supporting cables and wires, comprising:

an elongate rail including an open channel extending along the length thereof, said rail being formed of a plurality of rail sections, each of said rail sections being joinable in longitudinal succession;

at least one support member including at least one elongate arm extending away from said rail, and said arm including at least one elongate extent for supporting the cables and wires; and a locking connector cooperating with said support member, said connector being sized and configured for insertion into said open channel whereby insertion of said connector into said open channel simultaneously locates said support member at a position along said rail and fixedly secures said support member to said rail at said position in the absence of fastening hardware.

29. The assembly according to claim 28, wherein said channel includes a pair of opposing side walls; and wherein said connector includes at least one deflectable spring clip which engages at least one of said side walls upon insertion of said connector into said channel.

30. The assembly according to claim 28, wherein said rail includes a pair of opposed sidewalls defining said channel, and wherein said connector engages each of said sidewalls upon insertion of said connector into said channel.

31. The assembly according to claim 28, wherein said channel defines a plane, and wherein said connector is configured for insertion into said channel in a direction perpendicular to said plane.

32. A cable tray assembly for supporting cables and wires, comprising:

an elongate rail including an open channel extending along the length thereof;

at least one support member including at least one elongate arm extending away from said rail, and said arm including at least one elongate extent for supporting the cables and wires;

a locking connector cooperating with said support member, said connector being sized and configured for insertion into said open channel whereby insertion of said connector into said open channel simultaneously locates said support member at a position along said rail and fixedly secures said support member to said rail at said position in the absence of fastening hardware; and said rail including a further open channel oppositely disposed from said other open channel, each of said open channels being configured to cooperate with said locking connector.

33. A cable tray assembly for supporting cables and wires, comprising:

an elongate rail including an open channel extending along the length thereof;

a plurality of support member each including at least one elongate arm extending away from said rail, and said arm including at least one elongate extent for supporting the cables and wires; at least one of said plurality of support member being disposed adjacent to said rail and at least one other of said plurality of support members being spaced a distance from said rail thereby permitting said assembly to support cable at least two different elevations; and a locking connector cooperating with said support member, said connector being sized and configured for insertion into said open channel whereby insertion of said connector into said open channel simultaneously locates said support member at a position along said rail and fixedly secures said support member to said rail at said position in the absence of fastening hardware.

34. A cable tray assembly for supporting cables and wires, comprising:

an elongate rail including an open channel extending along the length thereof, said rail including a pair of opposed sidewalls defining said channel;

at least one support member including at least one elongate arm extending away from said rail for supporting the cables and wires; and a locking connector cooperating with said support member, said connector including a saddle body and a pair of deflectable spring clips, said saddle body defining a plane, said spring clips extending perpendicularly from said plane, said connector being sized and configured for insertion into said open channel, whereby insertion of said connector into said open channel causes engagement between said spring clips and said side walls and simultaneously locates said support member at a position along said rail and fixedly secures said support member to said rail at said position in the absence of fastening hardware.

35. A cable tray assembly for supporting cables and wires, comprising:

an elongate rail including an open channel extending along the length thereof, said rail including a pair of opposed sidewalls defining said channel;

at least one support member including at least one elongate arm extending away from said rail for supporting the cables and wires; and a trunk spacing said at least one support member from said rail; and wherein said connector defines a trunk-receiving cavity for receipt of said trunk, said connector including opposing cantilevered spring clips sized to engage said channel side walls when said connector is inserted into said channel, whereby insertion of said connector into said open channel causes engagement between said spring clips and said side walls and simultaneously locates said support member at a position along said rail and fixedly secures said support member to said rail at said position in the absence of fastening hardware.

* * * * *

UNITED STATES PATENT AND TRADEMARK OFFICE
CERTIFICATE OF CORRECTION

PATENT NO.     : 6,354,542 B1
DATED          : July 19, 2002
INVENTOR(S)    : Meyer et al.

It is certified that error appears in the above-identified patent and that said Letters Patent is hereby corrected as shown below:

Column 1,
Line 21, now reads "running through modem facilities", should read -- running through modern facilities --;
Line 24, now reads "Traditional cable trays arc bulky", should read -- Traditional cable trays are bulky --;

Column 5,
Line 57, now reads "secured to splice connector 26", should read -- secured to splice connector 26' --;

Column 9,
Line 38, now reads "As shown in FIG. 34a", should read -- As shown in Figures 34a-37 --; and Column 11,
Line 9, now reads "rungs or rings", should read -- rungs or rungs --.

Column 13,
Line 2, now reads "undefected position wherein", should read -- undeflected position wherein --; and Column 14,
Lines 42-43, now reads "a second undetected position wherein", should read -- a second undeflected position wherein --.

Signed and Sealed this

Third Day of December, 2002

JAMES E. ROGAN
*Director of the United States Patent and Trademark Office*